United States Patent
Shundo

(10) Patent No.: US 7,300,604 B2
(45) Date of Patent: Nov. 27, 2007

(54) TETRAHYDROXYBENZENE TETRAESTER DERIVATIVE AND POLYMER THEREOF

(75) Inventor: Ryushi Shundo, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 129 days.

(21) Appl. No.: 11/355,147

(22) Filed: Feb. 16, 2006

(65) Prior Publication Data

US 2006/0180791 A1 Aug. 17, 2006

(30) Foreign Application Priority Data

Feb. 16, 2005 (JP) .............................. 2005-038993

(51) Int. Cl.
- C09K 19/34 (2006.01)
- C09K 19/20 (2006.01)
- C09K 19/38 (2006.01)
- G02B 5/30 (2006.01)
- C07D 303/12 (2006.01)
- C07D 305/06 (2006.01)
- C08G 59/00 (2006.01)

(52) U.S. Cl. .................. 252/299.61; 252/299.01; 252/299.67; 428/1.1; 428/1.31; 528/103; 549/510; 549/512; 549/554

(58) Field of Classification Search .............. 428/1.1, 428/1.31; 252/299.01, 299.61, 299.67; 549/510, 549/512, 554; 528/103; 560/76, 85

See application file for complete search history.

(56) References Cited

U.S. PATENT DOCUMENTS

| 2002/0162483 A1 | 11/2002 | Shimizu et al. |
| 2005/0031801 A1 | 2/2005 | Shundo et al. |

FOREIGN PATENT DOCUMENTS

| JP | 11092427 | * 4/1999 |
| JP | 2001-055573 | 2/2001 |
| JP | 2001-154019 | 6/2001 |
| JP | 2005-60373 | 3/2005 |

OTHER PUBLICATIONS

English abstract for JP 11092427, 1999.*
Bergmann et al., The Synthesis and Characterisation of Nematic NLO Polymer Networks, *Mol. Cryst. and Liq. Cryst.*, 2001, vol. 368, pp. 671-678.
Berg et al., Mesophase Behaviour of 2,5-dibenzoylxy-p-benzoquinone Derivatives and Tetrahydrobenzene Tetraesters, *Liquid Crystals*, 1991, vol. 9, No. 2, pp. 151-163.
Norbert et al., The Synthesis, Mesomorphic Behaviour and the Uniaxial Nature of 1, 2, 4, 5-Tetra(4-Alkoxybenzoyloxy) Benzenes, *Mol. Cryst. Liq. Cryst.*, 1995, vol. 260, pp. 339-350.

* cited by examiner

*Primary Examiner*—Shean C Wu
(74) *Attorney, Agent, or Firm*—Hogan & Hartson LLP

(57) ABSTRACT

The invention includes compounds represented by Formula (1):

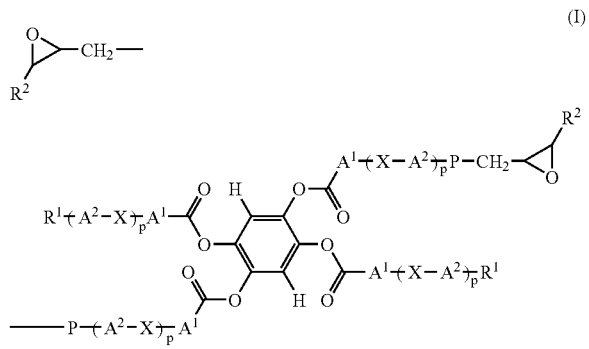

wherein $R^1$ is an alkyl having 1 to 20 carbon atoms; $A^1$ and $A^2$ are a 1,4-cyclohexylene or 1,4-phenylene; X is a single bond, —C≡C—, —COO—, —OCO—, —CH=CH—COO— or —OCO—CH=CH—; P is an alkylene having 1 to 20 carbon atoms; and p and q are 0, 1 or 2.

49 Claims, No Drawings

TETRAHYDROXYBENZENE TETRAESTER DERIVATIVE AND POLYMER THEREOF

BACKGROUND OF THE INVENTION

1. Field of the Invention

The invention relates to a novel tetrahydroxybenzene tetraester derivative having an oxirane ring or an oxetane ring, a composition containing the derivative, a polymer obtained from the derivative or the composition and uses of the polymer.

2. Background of the Invention

When a polymerizable liquid crystalline compound is polymerized in an aligned state, alignment of the molecules in the liquid crystal is fixed, and therefore a polymer having an optical anisotropy is obtained. Accordingly, in recent years, such polymerizable liquid crystalline compounds have been used for molded articles having an optical anisotropy such as polarizing plates and retardation plates (refer to, for example Japanese Patent Application Laid-Open No. 55573/2001).

Liquid crystal compounds having an acryl group are usually used as the polymerizable liquid crystalline compound described above since they have a high polymerization reactivity and the resulting polymers have a high transparency (refer to, for example Japanese Patent Application Laid-Open No. 154019/2001).

However, such liquid crystal compounds having an acryl group are polymerized by photoradical polymerization, and therefore they have to be polymerized under nitrogen atmosphere. When an optical compensation film in a retardation plate of a liquid crystal display is formed on a triacetyl cellulose (TAC) film, which is usually used as a supporting substrate, it is difficult to coat the acryl base liquid crystalline compound described above directly thereon because of an inferior wettability thereof. Further, when a film formed on the other supporting substrate is laminated on a TAC film, an adhesive has to be used since it has a low adhesive property and is liable to be peeled. Accordingly, involved therein are the problems that the production process can not be shortened and that a retardation plate obtained can not be reduced in thickness.

Accordingly, a liquid crystal compound is desired which is readily polymerized by irradiation with a UV ray in the air at room temperature under the presence of a suitable initiator and which is excellent in characteristics such as its coating property and the like.

An object of the invention is to provide a liquid crystal compound which is readily polymerized in the air at room temperature, has a broad temperature range of a liquid crystal phase, which is excellent in characteristics such as a chemical stability, a transparency, a solubility, a compatibility with other polymerizable compounds, a wettability to a supporting substrate, a polymer which is obtained from the liquid crystal compound, has an optical anisotropy, which is excellent in an adhesive property to a supporting substrate, a hardness, a transparency, a heat resistance and a weatherability, has a small photoelasticity (when a film is prepared from it, a change in a refractive index is small when bent) and uses thereof.

SUMMARY OF THE INVENTION

The invention relates to a compound represented by the following formula (1), (2) (3) or (4), a liquid crystal composition containing the compound, and a polymer obtained by polymerizing the compound or the composition:

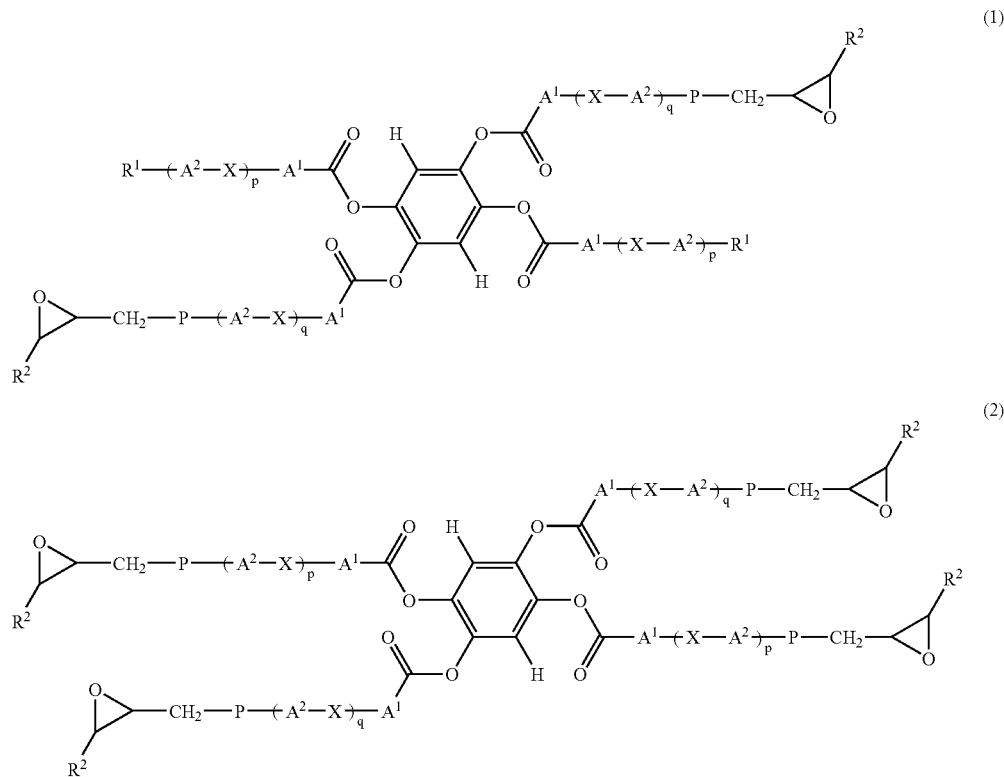

-continued

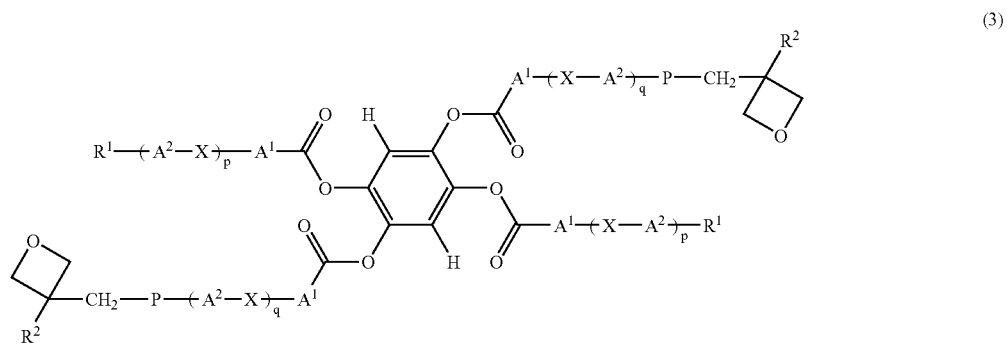

(3)

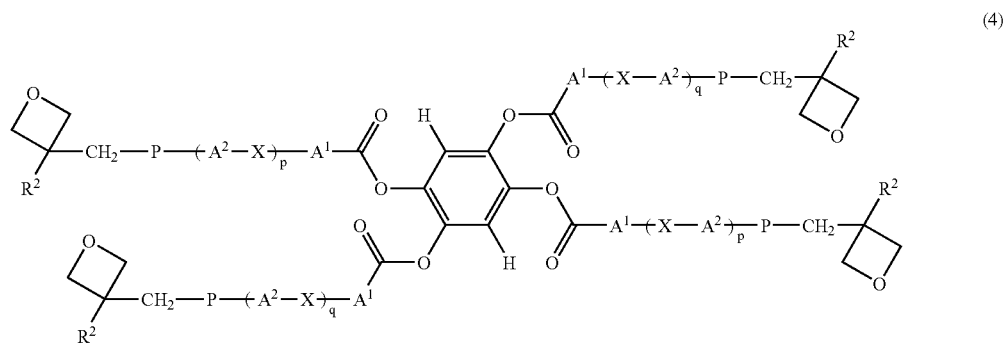

(4)

In Formulas (1) to (4): $R^1$ is a hydrogen atom, a fluorine atom, a chlorine atom, —CN, —NO$_2$ or an alkyl group having 1 to 20 carbon atoms; in the alkyl group, an optional hydrogen atom may be substituted with a fluorine atom or a chlorine atom, and optional one or two —CH$_2$— may be substituted with —O—, —S—, —COO—, —OCO—, —CO—, —CH=CH— or —C≡C—; $R^2$ is a hydrogen atom or an alkyl group having 1 to 8 carbon atoms, and an optional hydrogen atom in the alkyl group may be substituted with a fluorine atom or a chlorine atom; $A^1$ is independently a 1,4-cyclohexylene group, a 1,4-phenylene group, a 4,4'-biphenylene group, a 4,4'-terphenylene group, a pyridine-2,5-diyl group, a naphthalene-2,6-diyl group or a tetrahydronaphthalene-2,6-diyl group; in the 1,4-phenylene group, an optional hydrogen atom may be substituted with a fluorine atom or a chlorine atom, and optional one or two hydrogen atoms may be substituted with cyano, methyl, ethyl, methoxy, acetoxy, acetyl or trifluoromethyl; $A^2$ is independently a 1,4-cyclohexylene group, a 1,4-phenylene group, a 4,4'-biphenylene group, a 4,4'-terphenylene group, a pyridine-2,5-diyl group, a pyridazine-3,6-diyl group, a pyrimidine-2,5-diyl group, a fluorene-2,7-diyl group, a 9-methylfluorene-2,7-diyl group, a 9,9-dimethylfluorene-2,7-diyl group, a naphthalene-2,6-diyl group or a tetrahydronaphthalene-2,6-diyl group; in the 1,4-phenylene group, an optional hydrogen atom may be substituted with a fluorine atom or a chlorine atom, and optional one or two hydrogen atoms may be substituted with cyano, methyl, ethyl, methoxy, hydroxy, formyl, acetoxy, acetyl or trifluoromethyl; X is independently a single bond, —(CH$_2$)$_2$—, —CH=CH—, —C≡C—, —CH$_2$O—, —OCH$_2$—, —CF$_2$O—, —OCF$_2$—, —COO—, —OCO—, —CONH—, —NHCO—, —(CH$_2$)$_4$—, —(CH$_2$)$_2$COO—, —OCO(CH$_2$)$_2$—, —CH=CH—COO— or —OCO—CH=CH—; P is independently an alkylene group having 1 to 20 carbon atoms; in the alkylene group, an optional hydrogen atom may be substituted with a fluorine atom or a chlorine atom, optional —CH$_2$— may be substituted with —O—, optional one or two —CH$_2$— may be substituted with —COO— or —OCO—, and optional one —CH$_2$— may be substituted with —CH=CH— or —C≡C—; and p and q each are independently 0, 1 or 2.

DETAILED DESCRIPTION OF THE INVENTION

The invention includes the following:

1. A compound represented by the following Formula (1), (2), (3) or (4):

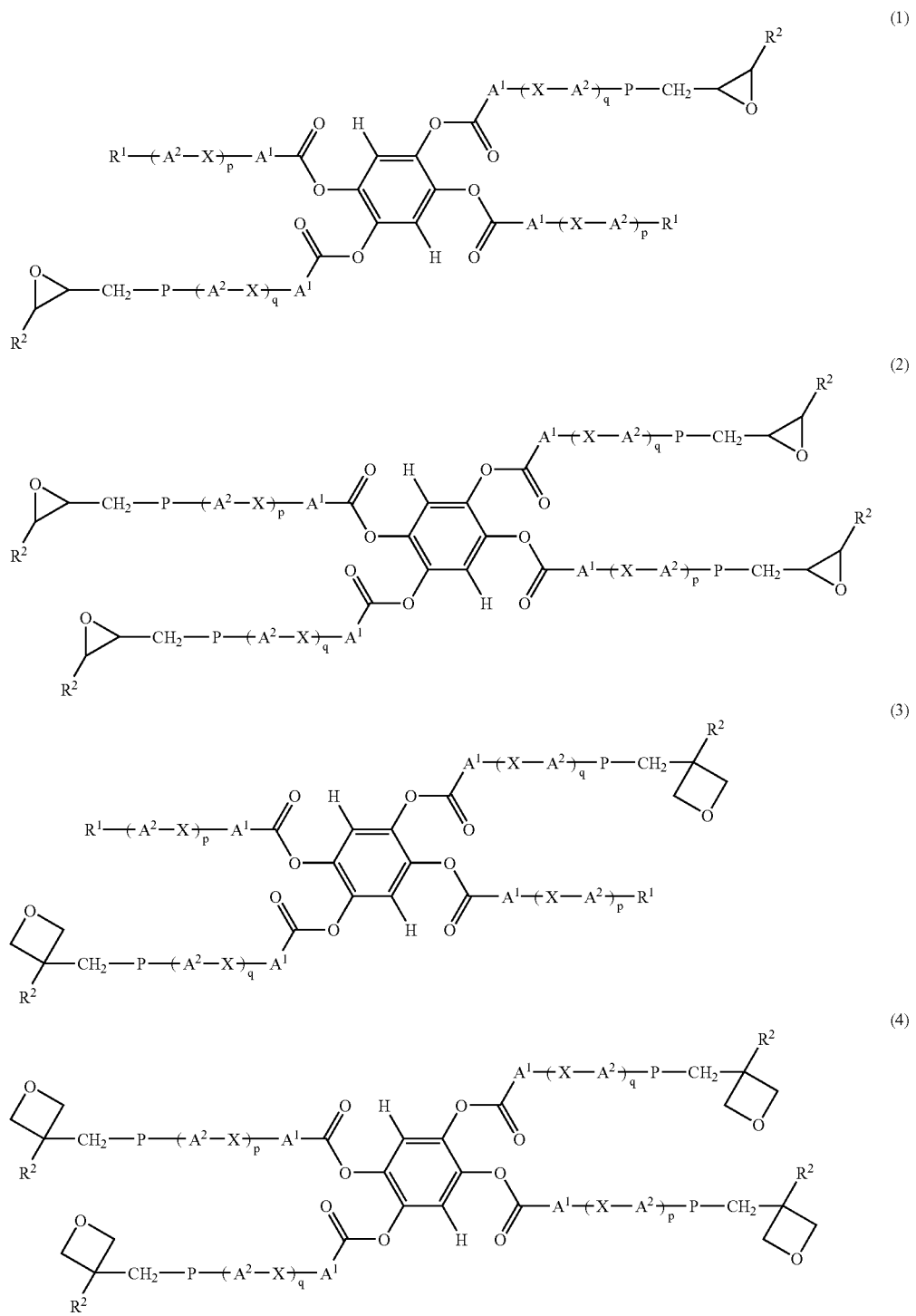

In Formula (1), codes such as X and P were used. Plural X's may be the same or different. This rule shall be applied to the other codes such as B, Q and Y, and it shall be applied as well in formulas other than Formula (1).

In Formulas (1) to (4), $R^1$ is a hydrogen atom, a fluorine atom, a chlorine atom, —CN, —NO$_2$ or an alkyl group having 1 to 20 carbon atoms. In the alkyl group, an optional hydrogen atom may be substituted with a fluorine atom or a chlorine atom, and optional one or two —CH$_2$— may be substituted with —O—, —S—, —COO—, —OCO—, —CO—, —CH=CH— or —C≡C—.

That is, $R^1$ contains alkyl in which a hydrogen atom is substituted with a fluorine atom or the like and in which —CH$_2$— is substituted with —O—. In this regard, the meaning of the phrase of "optional one or two —CH$_2$— in an alkyl group may be substituted with —O—, —CH=CH— or the like" shall be shown by one example. A group in which optional one or two —CH$_2$— in C$_4$H$_9$ is substituted with —O— or —CH=CH— includes, for example, C$_3$H$_7$O—, CH$_3$—O—(CH$_2$)$_2$—, CH$_3$—O—CH$_2$—O—, H$_2$C=CH—(CH$_2$)$_3$—, CH$_3$—CH=CH—(CH$_2$)$_2$— and CH$_3$—CH=CH—CH$_2$—O—. As shown above, "optional" means that they are selected at random. Considering a stability of the compound, CH$_3$—O—CH$_2$—O— in which oxygens are not adjacent to each other is more preferred than CH$_3$—O—O—CH$_2$— in which oxygens are adjacent to each other. The expression "may be substituted" has the meaning that the same shall apply in the other places.

Preferred R$^1$ is a hydrogen atom, a fluorine atom, a chlorine atom, —CN, —NO$_2$, —OCF$_3$, —OCF$_2$H, —OCFH$_2$, —CF$_2$CF$_2$H, —CF$_2$CHFCF$_3$, an alkyl group having 1 to 15 carbon atoms, an alkoxy group having 1 to 15 carbon atoms or an alkoxyalkyl group having 2 to 15 carbon atoms. Further preferred R$^1$ is a fluorine atom, a chlorine atom, —CN, —OCF$_{34}$, —OCF$_2$H, —OCFH$_2$, —CF$_2$CF$_2$H, —CF$_2$CHFCF$_3$, an alkyl group having 1 to 15 carbon atoms, an alkoxy group having 1 to 15 carbon atoms or an alkoxyalkyl group having 2 to 15 carbon atoms. Particularly preferred R$^1$ is an alkyl group having 1 to 10 carbon atoms.

R$^2$ is a hydrogen atom or an alkyl group having 1 to 8 carbon atoms, and an optional hydrogen atom in the alkyl group may be substituted with a fluorine atom or a chlorine atom.

Preferred R$^2$ is a hydrogen atom or an alkyl group having 1 to 5 carbon atoms. Further preferred R$^2$ is a hydrogen atom or an alkyl group having 1 to 4 carbon atoms. Particularly preferred R$^2$ is a hydrogen atom in Formulas (1) and (2) and methyl or ethyl in Formulas (3) and (4).

A$^1$ is independently a 1,4-cyclohexylene group, a 1,4-phenylene group, a 4,4'-biphenylene group, a 4,4'-terphenylene group, a pyridine-2,5-diyl group, a naphthalene-2,6-diyl group or a tetrahydronaphthalene-2,6-diyl group. In the 1,4-phenylene group, an optional hydrogen atom may be substituted with a fluorine atom or a chlorine atom, and optional one or two hydrogen atoms may be substituted with cyano, methyl, ethyl, methoxy, acetoxy, acetyl or trifluoromethyl.

Preferred A$^1$ is a 1,4-cyclohexylene group, a 1,4-phenylene group, a 4,4'-biphenylene group or a naphthalene-2,6-diyl group, and optional one or two hydrogen atoms in the 1,4-phenylene group may be substituted with a fluorine atom, a chlorine, trifluoromethyl or methyl.

Further preferred A$^1$ is a 1,4-cyclohexylene group, a 1,4-phenylene group, a 4,4'-biphenylene group, a 2-fluoro-1,4-phenylene group, a 2-methyl-1,4-phenylene group, a 2-trifluoromethyl-1,4-phenylene group, a 2-chloro-1,4-phenylene group, a 2,3-difluoro-1,4-phenylene group, a 2,5-difluoro-1,4-phenylene group or a 2,6-difluoro-1,4-phenylene group.

Particularly preferred A$^1$ is a 1,4-cyclohexylene group or a 1,4-phenylene group. Most preferred A$^1$ is a 1,4-phenylene group.

A$^2$ is independently a 1,4-cyclohexylene group, a 1,4-phenylene group, a 4,4'-biphenylene group, a 4,4'-terphenylene group, a pyridine-2,5-diyl group, a pyridazine-3,6-diyl group, a pyrimidine-2,5-diyl group, a fluorene-2,7-diyl group, a 9-methylfluorene-2,7-diyl group, a 9,9-dimethylfluorene-2,7-diyl group, a naphthalene-2,6-diyl group or a tetrahydronaphthalene-2,6-diyl group. In the 1,4-phenylene group, an optional hydrogen atom may be substituted with a fluorine atom or a chlorine atom, and optional one or two hydrogen atoms may be substituted with cyano, methyl, ethyl, methoxy, hydroxy, formyl, acetoxy, acetyl or trifluoromethyl.

Preferred A$^2$ is independently a 1,4-cyclohexylene group or a 1,4-phenylene group. In the 1,4-phenylene group, an optional hydrogen atom may be substituted with a fluorine atom, and optional one hydrogen atom may be substituted with methyl, ethyl, methoxy, acetoxy or acetyl. When A$^2$ is a 1,4-cyclohexylene group, a preferred steric configuration is trans rather than cis.

Further preferred A$^2$ is a 1,4-cyclohexylene group, a 1,4-phenylene group, a 2-fluoro-1,4-phenylene group, a 2,3-difluoro-1,4-phenylene group, a 2,5-difluoro-1,4-phenylene group, a 2,6-difluoro-1,4-phenylene group, a 2,3,5-trifluoro-1,4-phenylene group, a 2,3,5,6-tetrafluoro-1,4-phenylene group, a 2-methyl-1,4-phenylene group, a 2-acetoxy-1,4-phenylene group or a 2-methoxy-1,4-phenylene group.

Particularly preferred A$^2$ is a 1,4-cyclohexylene group, a 1,4-phenylene group, a 2-fluoro-1,4-phenylene group, a 2,3-difluoro-1,4-phenylene group, a 2,5-difluoro-1,4-phenylene group, a 2,6-difluoro-1,4-phenylene group or a 2-methyl-1,4-phenylene group. Most preferred A$^2$ is a 1,4-phenylene group.

X is independently a single bond, —(CH$_2$)$_2$—, —CH=CH—, —C≡C—, —CH$_2$O—, —OCH$_2$—, —CF$_2$O—, —OCF$_2$—, —COO—, —OCO—, —CONH—, —NHCO—, —(CH$_2$)$_4$—, —(CH$_2$)$_2$COO—, —OCO(CH$_2$)$_2$—, —CH=CH—COO— or —OCO—CH=CH—.

Preferred X is a single bond, —(CH$_2$)$_2$—, —C≡C—, —CH$_2$O—, —OCH$_2$—, —COO—, —OCO—, —(CH$_2$)$_4$—, —(CH$_2$)$_2$COO—, —OCO(CH$_2$)$_2$—, —CH=CH—COO— or —OCO—CH=CH—. Further preferred X is a single bond, —C≡C—, —COO— or —OCO—. Particularly preferred X is —COO— or —OCO—.

P is independently an alkylene group having 1 to 20 carbon atoms. In the alkylene group, an optional hydrogen atom may be substituted with a fluorine atom or a chlorine atom, optional —CH$_2$— may be substituted with —O—, optional one or two —CH$_2$— may be substituted with —COO— or —OCO—, and optional one —CH$_2$— may be substituted with —CH=CH— or —C≡C—.

Preferred P is an alkylene group having 1 to 15 carbon atoms. In the alkylene group, optional —CH$_2$— may be substituted with —O—, and optional one or two —CH$_2$— may be substituted with —COO— or —OCO—.

More preferred P is —O—, —(CH$_2$)$_r$—, —O—(CH$_2$)$_r$—, —(CH$_2$)$_r$—O—, —O—(CH$_2$)$_r$—O— or —O—(CH$_2$CH$_2$)$_s$—, and r is an integer of 1 to 10 and s is an integer of 2 to 5.

Further preferred P is —O—, —O—(CH$_2$)$_r$— or —O—(CH$_2$)$_r$—O—, and r is an integer of 2 to 10. Particularly preferred X is —O— or —O—(CH$_2$)$_r$—O—, and r is an integer of 2 to 10.

The terms p and q each are independently 0, 1 or 2.

2. The compound as described in the item [1], wherein in Formulas (1) to (4) described above:

R$^1$ is a hydrogen atom, a fluorine atom, a chlorine atom, —CN, —NO$_2$, —OCF$_3$, —OCF$_2$H, —OCFH$_2$, —CF$_2$CF$_2$H, —CF$_2$CHFCF$_3$, an alkyl group having 1 to 15 carbon atoms, an alkoxy group having 1 to 15 carbon atoms or an alkoxyalkyl group having 2 to 15 carbon atoms; R$^2$ is a hydrogen atom or an alkyl group having 1 to 5 carbon atoms; A$^1$ is independently a 1,4-cyclohexylene group, a 1,4-phenylene group, a 4,4'-biphenylene group or a naphthalene-2,6-diyl group, and optional one or two hydrogen atoms in the 1,4-phenylene group may be substituted with a fluorine atom, a chlorine atom, trifluoromethyl or methyl; A$^2$ is independently a 1,4-cyclohexylene group, a 1,4-phenylene group, a 4,4'-biphenylene group or a 4,4'-terphenylene group; in the 1,4-phenylene group, an optional hydrogen atom may be substituted with a fluorine atom, and optional one hydrogen atom may be substituted with methyl, ethyl, methoxy, acetoxy or acetyl; X is independently a single bond, —(CH₂)₂—, —C≡C—, —CH₂O —, —OCH₂—, —(CH₂)₂COO—, —OCO(CH₂)₂—, —CH═CH—COO—, —OCO—CH═CH—, —COO—, —OCO— or —(CH₂)₄—; P is independently an alkylene group having 1 to 15 carbon atoms; in the alkylene group, optional —CH₂— may be substituted with —O—, and optional one —CH₂— may be substituted with —COO— or —OCO—; and p and q each are independently 0, 1 or 2.

3. The compound as described in the item [1], wherein in Formulas (1) to (4) described above, P is —O—, —(CH₂)ᵣ—, —O—(CH₂)ᵣ—, —(CH₂)ᵣ—O—, —O—(CH₂)ᵣ—O—, —COO—(CH₂)ᵣ—O—, —O—(CH₂)ᵣ—OCO—, —OCO—(CH₂)ᵣ—O—, —O—(CH₂)ᵣ—COO— or —O—(CH₂CH₂O)ₛ—, and r is an integer of 2 to 10 and s is an integer of 2 to 5.

4. A compound represented by Formula (1) or (2) described above; in Formulas (1) and (2) described above: R¹ is a fluorine atom, a chlorine atom, —CN, —OCF₃, an alkyl group having 1 to 15 carbon atoms or an alkoxy group having 1 to 15 carbon atoms; R² is a hydrogen atom, methyl or ethyl; A¹ is independently a 1,4-cyclohexylene group, a 1,4-phenylene group, a 4,4'-biphenylene group, a 2-fluoro-1,4-phenylene group, a 2-methyl-1,4-phenylene group, a 2-trifluoromethyl-1,4-phenylene group, a 2-chloro-1,4-phenylene group, a 2,3-difluoro-1,4-phenylene group, a 2,5-difluoro-1,4-phenylene group or a 2,6-difluoro-1,4-phenylene group; A² is independently a 1,4-cyclohexylene group, a 1,4-phenylene group, a 4,4'-biphenylene group, a 4,4'-terphenylene group, a 2-fluoro-1,4-phenylene group, a 2-methyl-1,4-phenylene group, a 2-methoxy-1,4-phenylene group, a 2-trifluoromethyl-1,4-phenylene group, a 2-chloro-1,4-phenylene group, a 2-acetyl-1,4-phenylene group, a 2,3-difluoro-1,4-phenylene group, a 2,5-difluoro-1,4-phenylene group, a 2,6-difluoro-1,4-phenylene group, a 2,3,5-trifluoro-1,4-phenylene group or a 2,3,5,6-tetrafluoro-1,4-phenylene group; X is independently a single bond, —C≡C—, —COO—, —OCO—, —CH═CH—COO— or —OCO—CH═CH—; P is independently —O—, —(CH₂)ᵣ—, —O—(CH₂)ᵣ—, —(CH₂)ᵣ—O— or —O—(CH₂)ᵣ—O—, and r is an integer of 1 to 15; and p and q each are independently 0 or 1.

5. The compound as described in the item [4], wherein in Formulas (1) and (2) described above: R¹ is an alkyl group having 1 to 15 carbon atoms or an alkoxy group having 1 to 15 carbon atoms; R² is a hydrogen atom; A¹ is independently a 1,4-cyclohexylene group, a 1,4-phenylene group, a 2-fluoro-1,4-phenylene group or a 2-methyl-1,4-phenylene group; A² is independently a 1,4-cyclohexylene group or a 1,4-phenylene group; X is independently a single bond, —C≡C—, —COO—, —OCO—, —CH═CH—COO— or —OCO—CH═CH—; P is independently —O—, —(CH₂)ᵣ—, —O—(CH₂)ᵣ—, —(CH₂)ᵣ—O— or —O—(CH₂)ᵣ—O—, and r is an integer of 1 to 10; and p and q each are independently 0 or 1.

6. The compound as described in the item [4] or [5], wherein in Formulas (1) and (2) described above, X is —COO— or —OCO—.

7. The compound as described in any of the items [4] to [6], wherein in Formulas (1) and (2) described above, p is 0 and q is 0.

8. The compound as described in any of the items [4] to [6], wherein in Formulas (1) and (2) described above, p is 0, and q is 1.

9. The compound as described in any of the items [4] to [6], wherein in Formulas (1) and (2) described above, p is 1, and q is 0.

10. The compound as described in any of the items [4] to [6], wherein in Formulas (1) and (2) described above, p is 1, and q is 1.

11. A compound represented by Formula (3) or (4) described above; in Formulas (3) and (4) described above: R¹ is a fluorine atom, a chlorine atom, —CN, —OCF₃, an alkyl group having 1 to 15 carbon atoms or an alkoxy group having 1 to 15 carbon atoms; R² is methyl or ethyl; A¹ is independently a 1,4-cyclohexylene group, a 1,4-phenylene group, a 4,4'-biphenylene group, a 2-fluoro-1,4-phenylene group, a 2-methyl-1,4-phenylene group, a 2-trifluoromethyl-1,4-phenylene group, a 2-chloro-1,4-phenylene group, a 2,3-difluoro-1,4-phenylene group, a 2,5-difluoro-1,4-phenylene group or a 2,6-difluoro-1,4-phenylene group; A² is independently a 1,4-cyclohexylene group, a 1,4-phenylene group, a 4,4'-biphenylene group, a 4,4'-terphenylene group, a 2-fluoro-1,4-phenylene group, a 2-methyl-1,4-phenylene group, a 2-methoxy-1,4-phenylene group, a 2-trifluoromethyl-1,4-phenylene group, a 2-chloro-1,4-phenylene group, a 2-acetyl-1,4-phenylene group, a 2,3-difluoro-1,4-phenylene group, a 2,5-difluoro-1,4-phenylene group, a 2,6-difluoro-1,4-phenylene group, a 2,3,5-trifluoro-1,4-phenylene group or a 2,3,5,6-tetrafluoro-1,4-phenylene group; X is independently a single bond, —C≡C—, —COO—, —OCO—, —CH═CH—COO— or —OCO—CH═CH—; P is independently —O—, —(CH₂)ᵣ—, —O—(CH₂)ᵣ—, —(CH₂)ᵣ—O— or —O—(CH₂)ᵣ—O—, and r is an integer of 1 to 15; and p and q each are independently 0 or 1.

12. The compound as described in the item [11], wherein in Formulas (3) and (4) described above: R¹ is an alkyl group having 1 to 15 carbon atoms or an alkoxy group having 1 to 15 carbon atoms; R² is methyl or ethyl; A¹ is independently a 1,4-cyclohexylene group, a 1,4-phenylene group, a 2-fluoro-1,4-phenylene group or a 2-methyl-1,4-phenylene group; A² is independently a 1,4-cyclohexylene group or a 1,4-phenylene group; X is independently a single bond, —C≡C—, —COO—, —OCO—, —CH═CH—COO— or —OCO—CH═CH—; P is independently —O—, —(CH₂)ᵣ—, —O—(CH₂)ᵣ—, —(CH₂)ᵣ—O— or —O—(CH₂)ᵣ—O—, and r is an integer of 1 to 10; and p and q each are independently 0 or 1.

13. The compound as described in the item [11] or [12], wherein in Formulas (3) and (4) described above, X is —COO— or —OCO—.

14. The compound as described in any of the items [11] to [13], wherein in Formulas (3) and (4) described above, p is 0 and q is 0.

15. The compound as described in any of the items [11] to [13], wherein in Formulas (3) and (4) described above, p is 0 and q is 1.

16. The compound as described in any of the items [11] to [13], wherein in Formulas (3) and (4) described above, p is 1 and q is 0.

17. The compound as described in any of the items [11] to [13], wherein in Formulas (3) and (4) described above, p is 1 and q is 1.

18. A composition comprising at least one of the compounds as described in any of the items [4] to [10] as a first component.

19. A composition comprising at least one of the compounds as described in any of the items [11] to [17] as a first component.

20. The composition as described in the item [18] or [19], further comprising a polymerizable compound as a second component, which is different from the compounds as described in any of the items [4] to [17].

21. The composition as described in the item [20], wherein the second component described above is at least one compound selected from the group of compounds represented by the following Formulas (M1), (M2), (M3) and (M4):

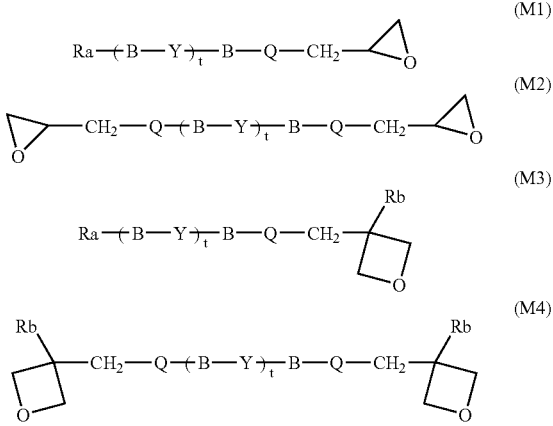

In Formulas (M1) to (M4): Ra is a hydrogen atom, a fluorine atom, a chlorine atom, —CN, —OCF$_3$, an alkyl group having 1 to 20 carbon atoms, an alkoxy group having 1 to 20 carbon atoms, an alkoxyalkyl group having 2 to 20 carbon atoms, an alkenyl group having 2 to 20 carbon atoms or an alkenyloxy group having 2 to 20 carbon atoms; Rb is a hydrogen atom or an alkyl group having 1 to 5 carbon atoms; B is independently a 1,4-cyclohexylene group or a 1,4-phenylene group; in the 1,4-phenylene group, an optional hydrogen atom may be substituted with a fluorine atom, and optional one or two hydrogen atoms may be substituted with methyl or trifluoromethyl; one of B may be a pyridine-2,5-diyl group, a pyrimidine-2,5-diyl group, a naphthalene-2,6-diyl group, a fluorene-2,7-diyl group, a 9-methylfluorene-2,7-diyl group, a 9-ethylfluorene-2,7-diyl group, a 9,9-dimethylfluorene-2,7-diyl group, a 9-chlorofluorene-2,7-diyl group or a 9,9-difluorofluorene-2,7-diyl group; Y is independently a single bond, —COO—, —OCO—, —(CH$_2$)$_2$— or —C≡C—; Q is independently a single bond or an alkylene group having 1 to 20 carbon atoms, and one or two —CH$_2$— in the alkylene group may be substituted with —O—; and t is 1 or 2.

22. The composition as described in the item [21], wherein in Formulas (M1) to (M4) described above: Ra is a fluorine atom, —CN, —OCF$_3$, an alkyl group having 1 to 20 carbon atoms or an alkoxy group having 2 to 20 carbon atoms; Rb is a hydrogen atom or an alkyl group having a carbon atom number of 1 to 2; B is independently a 1,4-cyclohexylene group or a 1,4-phenylene group; in the 1,4-phenylene group, an optional hydrogen atom may be substituted with a fluorine atom, and optional one or two hydrogen atoms may be substituted with methyl or trifluoromethyl; one of B may be a 9-methylfluorene-2,7-diyl group or a 9-ethylfluorene-2,7-diyl group; Y is independently a single bond, —COO—, —OCO— or —C≡C—; Q is independently a single bond or an alkylene group having 1 to 10 carbon atoms, and one or two —CH$_2$— in the alkylene group may be substituted with —O—; and t is 1 or 2.

23. The composition as described in the item [21], wherein the second component described above is at least one compound selected from the group of the compounds represented by Formulas (M1) and (M2) described above or at least one compound selected from the group of the compounds represented by Formulas (M3) and (M4) described above.

24. The composition as described in the item [21], wherein the second component described above is at least one compound selected from the group of the compounds represented by Formulas (M2) described above or at least one compound selected from the group of the compounds represented by Formulas (M4) described above.

25. A polymer obtained by polymerizing the compound as described in any of the items [1] to [17].

26. A polymer obtained by polymerizing the compound as described in any of the items [18] to [24].

27. A device comprising the polymer as described in the item [25] or [26].

28. An optical film comprising the polymer as described in the item [25] or [26].

29. A molded article having an optical anisotropy made from the polymer as described in the item [25] or [26].

The liquid crystal compound of the invention is readily polymerized in the air at room temperature and has a broad temperature range of a liquid crystal phase, and it satisfies plural characteristics at a good balance in characteristics such as a chemical stability, a transparency, a solubility, a compatibility with other polymerizable compounds and a wettability to a supporting substrate. A polymer obtained from the above liquid crystal compound has an optical anisotropy and a low photoelasticity, and it is excellent in a hardness, a transparency, a heat resistance, a weatherability and an adhesive property to a supporting substrate.

The compound (tetrahydroxybenzene tetraester derivative) according to the invention, a composition comprising the derivative, a polymer comprising the compound or the composition and uses thereof shall be explained below in details.

Terms in the specification shall be used in the following manners. The term "liquid crystal compound" is a general term for compounds having a liquid crystal phase and compounds which do not have a liquid crystal phase but are useful as components for liquid crystal compositions. The term "liquid crystal phase" is a nematic phase, a smectic phase and a cholesteric phase and means a nematic phase in many cases. The term "polymerizable" means the ability that a monomer is polymerized by means such as light, heat and a catalyst to provide a polymer. Compounds represented by Formula (1) and Formula (M1) shall be shown by the "compound (1)" and the "compound (M1)". Further, a polymer obtained from a composition comprising the "compound (1)" shall be shown by the [polymer (1)], and a polymer obtained from a composition comprising the "compound (2)" shall be shown by the "polymer (2)".

The compound of the invention is readily polymerized by irradiating with a UV ray in the air at room temperature under the presence of a suitable initiator, and it is excellent in a chemical stability, a transparency, a solubility in solvents, a compatibility with other polymerizable compounds, a wettability to a supporting substrate and the like. Further, the compound of the invention has a liquid crystallinity, and alignment of the molecules in this liquid crystal phase is maintained even by polymerization. That is, the alignment of the molecules is fixed by polymerization.

A liquid crystal compound having an acryl group is polymerized by photoradical polymerization, and therefore it has to be carried out under nitrogen atmosphere. The compound of the invention can be subjected to photoradical polymerization in the air, and it is readily polymerized as well by irradiating with a UV ray of a small integrated luminous energy.

The compound of the invention is chemically stable and therefore excellent in a storage stability. Also, it has a good compatibility with other polymerizable compounds and therefore can provide compositions having various compositions. Further, it is liable to be wet to a supporting substrate and therefore can provide an even paint film.

Among them, the characteristics that it can readily be polymerized in the air and that an even paint film is liable to be obtained are important.

A polymer obtained from the above compound of the invention has the following physical properties; it has an optical anisotropy; it is less liable to be peeled off from a supporting substrate; it has a satisfactory hardness; it has a large heat resistance; it is colorless and transparent; it has a large weatherability; and it has a small photoelasticity. The above polymer is excellent as well in an impact resistance, a processability, electric characteristics and a solvent resistance. Among them, the characteristics that it is less liable to be peeled off from a supporting substrate and has a satisfactory hardness and that it has a large heat resistance are important.

The compounds (1) and (2) are liquid crystal compounds having an oxirane ring, and the compounds (3) and (4) are liquid crystal compounds having an oxetane ring. These compounds have polymerizability and are stable under ordinary handling conditions, and they are readily subjected to cationic photopolymerization at room temperature even under aerial atmosphere by irradiating with a UV ray or the like under the presence of a cationic photopolymerization catalyst. The reasons therefor are that the compounds (1) and (2) quickly initiate reaction and that the compounds (3) and (4) have a large polymerization rate. The compounds (1) to (4) are readily aligned by an alignment film. Accordingly, a polymer having no or less defects of alignment can be obtained.

The compounds (1) to (4) can be controlled in physical properties such as a dielectric anisotropy, an optical anisotropy and a viscosity by suitably selecting the side chains $R^1$ and $R^2$, the rings $A^1$ and $A^2$, the bonding group X and the connecting group P.

When $R^1$ is a fluorine atom, a chlorine atom, —CN or —OCF$_3$, the compound (1) or (3) tends to be lowered in a melting point. When $R^1$ is an alkyl group, a temperature range of the liquid crystal phase can be controlled by the carbon number. When R is an alkyl group, a polymer obtained from a monomer having less carbon atoms tends to have improved heat resistance.

When A or A is a 1,4-cyclohexylene group, the monomer has a small optical anisotropy. When $A^1$ or $A^2$ is a 1,4-phenylene group, the monomer has a large optical anisotropy. When at least one of X is —COO— or —OCO—, the compounds (1) to (4) have improved liquid crystallinity. When at least one of X is —C≡C—, the compounds (1) to (4) have a larger optical anisotropy. When P has —O—, the monomer has a larger optical anisotropy.

The compounds (1) to (4) may contain isotopes such as $^2$H (heavy hydrogen) and $^{13}$C in a larger proportion than in a proportion in which they are present in the nature. The compounds are not different in physical properties to a large extent even in such case.

The physical properties of the compounds (1) to (4) are reflected on the physical properties of the polymers (1) to (4). Among the physical properties, the optical anisotropy is particularly important for the object of the invention. When a composition containing the (1), (2), (3) or (4) compound of the invention is polymerized on a supporting substrate, a polymer which is less liable to be peeled from the supporting substrate can be obtained.

Next, the synthetic processes of the compounds (1) to (4) shall be explained.

The compounds of the invention can be synthesized by suitably combining synthetic processes described in Houben Wyle, Methoden der Organischen Chemie, Georg Thieme Verlag, Stuttgart; Organic Reactions, John Wily & Sons Inc.; Organic Syntheses, John Wily & Sons Inc.; Comprehensive Organic Synthesis, Pergamon Press and New Experimental Chemical Course, Maruzen.

An oxirane ring can be formed by epoxidation reaction of olefin by peroxide. For example, hydrogen peroxide, peracetic acid and m-chloroperacetic acid can be used as the peroxide.

An oxetane ring can be formed by using 3-alkyl-3-oxetanemethanol as a starting material. 3-Ethyl-3-oxetanemethanol and 3-methyl-3-oxetanemethanol are commercially available as 3-alkyl-3-oxetanemethanol. The chain length can be extended by reacting the above compounds with α,ω-dibromomethylene such as 1,2-dibromoethane, 1,4-dibromobutane, 1,6-dibromohexane and 1,8-dibromoethane according to Macromolecules, 24, p. 4531-37 (1991).

A method for forming the bonding group X is described in Japanese Patent Application Laid-Open No. 277359/2003.

An example of the synthetic scheme of the compound (1) is given below:

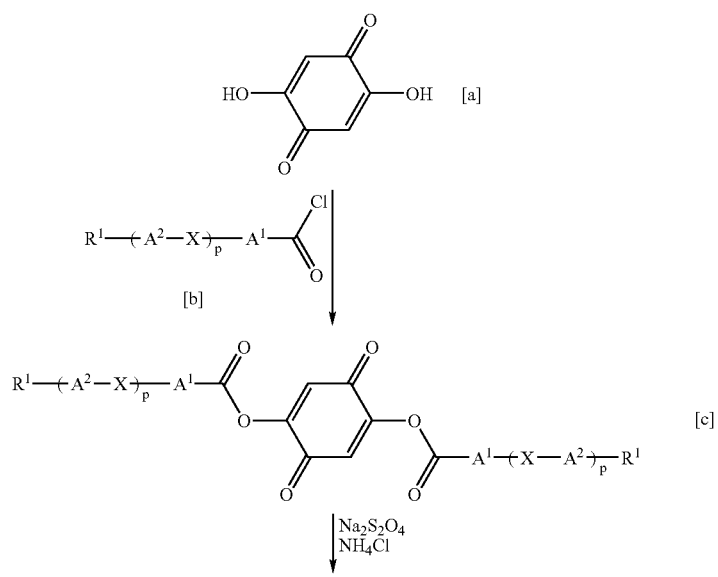

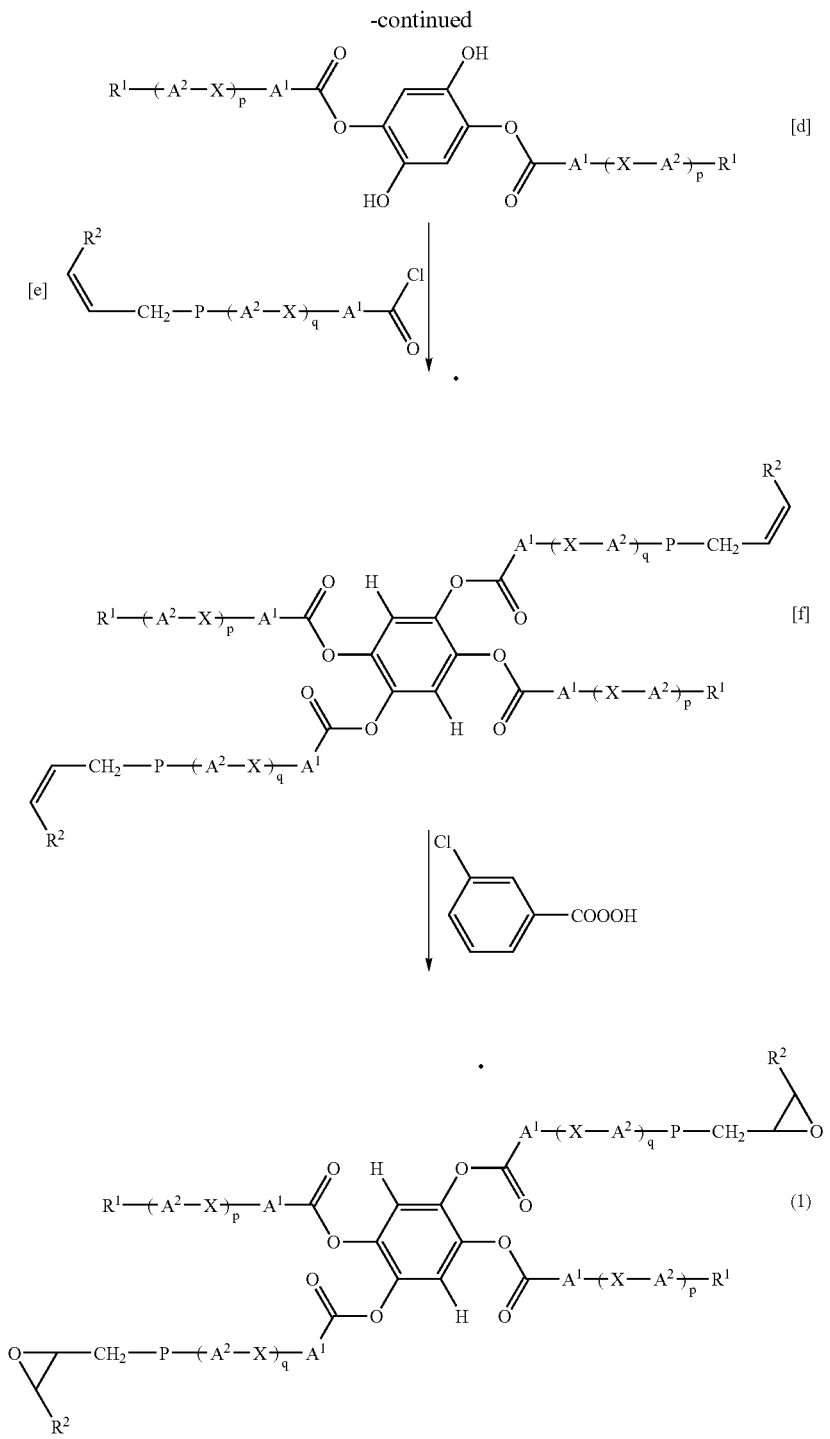

In synthesizing the compound (1), 2,5-dihydroxy-p-benzoquinone [a] and 2 equivalents of acid chloride [b] are first esterified to thereby obtain a 2,5-benzoyloxy-p-benzoquinone derivative [c]. When adding a base in the esterification, the base used includes, for example, pyridine, triethylamine and piperidine. Then, the 2,5-benzoyloxy-p-benzoquinone derivative [c] is reduced to obtain a 2,5-benzoyloxy-p-hydroquinone derivative [d]. A reducing agent used for the reduction includes, for example, sodium dithionite, tin and zinc. The 2,5-benzoyloxy-p-hydroquinone derivative [d] is reacted with 2 equivalents of acid chloride [e] to obtain a tetraester derivative [f]. This tetraester derivative [f] is oxidized by peroxide to thereby obtain the compound (1). The peroxide includes, for example, aqueous hydrogen peroxide, performic acid, peracetic acid, perbenzoic acid and m-chloroperbenzoic acid.

Next, an example of the synthetic scheme of the compound (2) is given below:

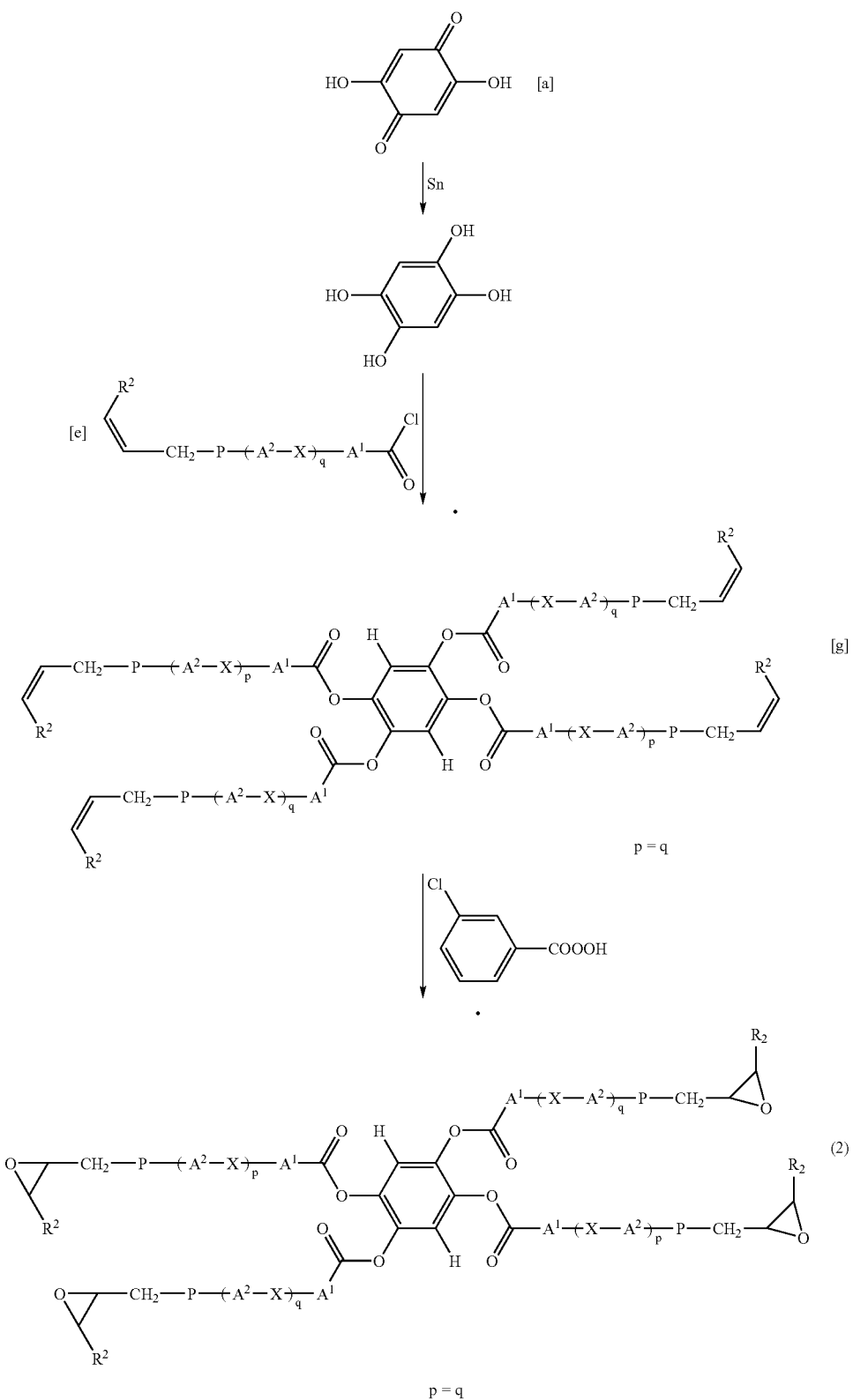

In synthesizing the compound (2) in which p is the same as q, 2,5-dihydroxy-p-benzoquinone [a] is first reduced by zinc or the like to be turned into 1,2,4,5-tetrahydroxybenzene. This 1,2,4,5-tetrahydroxybenzene and 4 equivalents of acid chloride [e] are esterified to thereby obtain a tetraester derivative [g]. This tetraester derivative [g] is oxidized by peroxide to thereby obtain the compound (2). The peroxide includes, for example, aqueous hydrogen peroxide, performic acid, peracetic acid, perbenzoic acid and m-chlorobenzoic acid.

Next, an example of the compound (3) is given below:

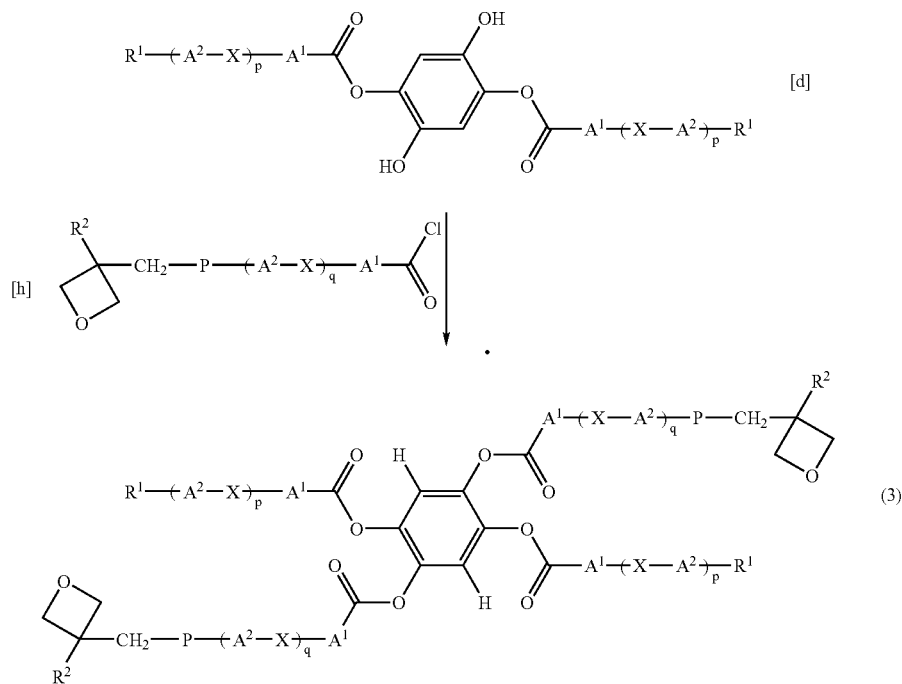

The 2,5-benzoyloxy-p-hydroquinone derivative [d] obtained by the method described above and 2 equivalents of acid chloride [h] are esterified to thereby obtain the compound (3).

Next, an example of the synthetic scheme of the compound (4) is given below.

1,2,4,5-Tetrahydroxybenzene obtained in the manner described above and 4 equivalents of acid chloride [g] are esterified to thereby obtain the compound (4).

The examples of the compounds (Compounds No. 1 to No. 38) synthesized by the above methods are shown below.

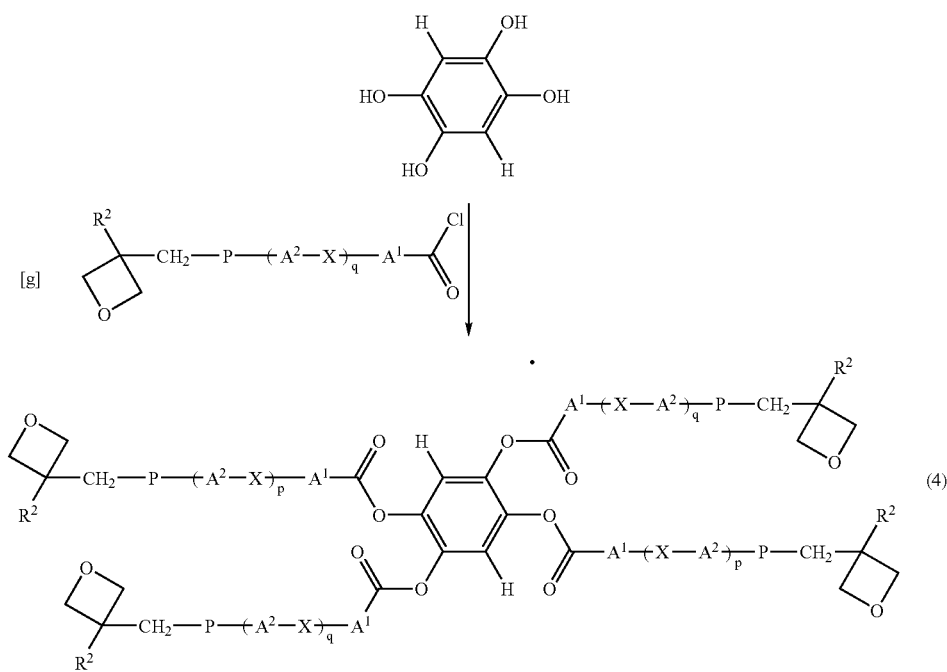

The structures of the compounds synthesized in the manner described above can be confirmed, for example, by a proton NMR spectrum.
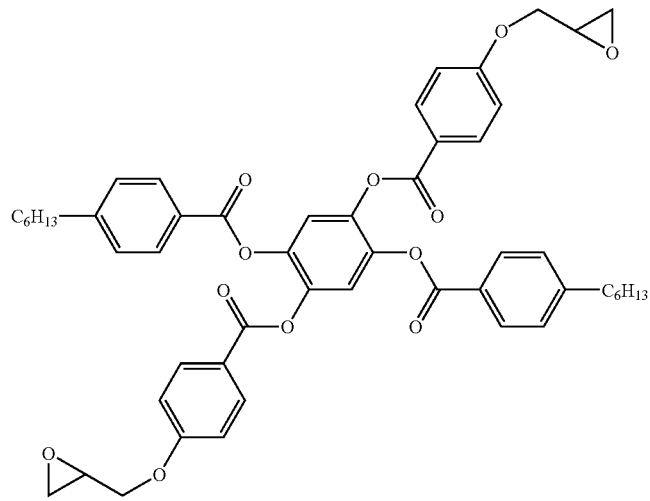
No. 1
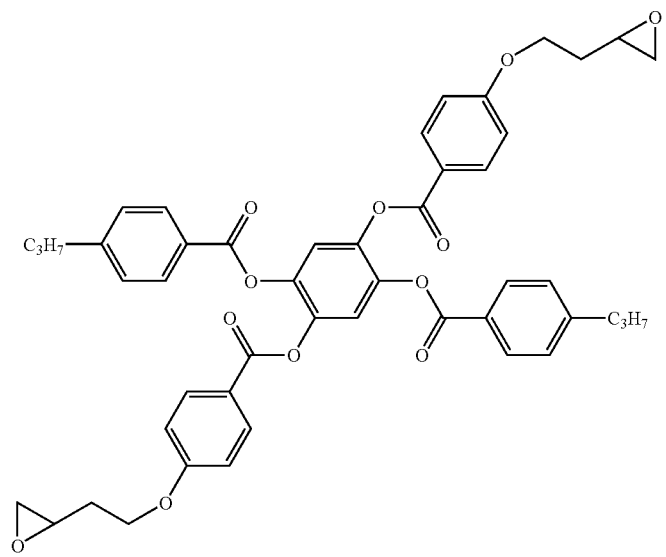
No. 2
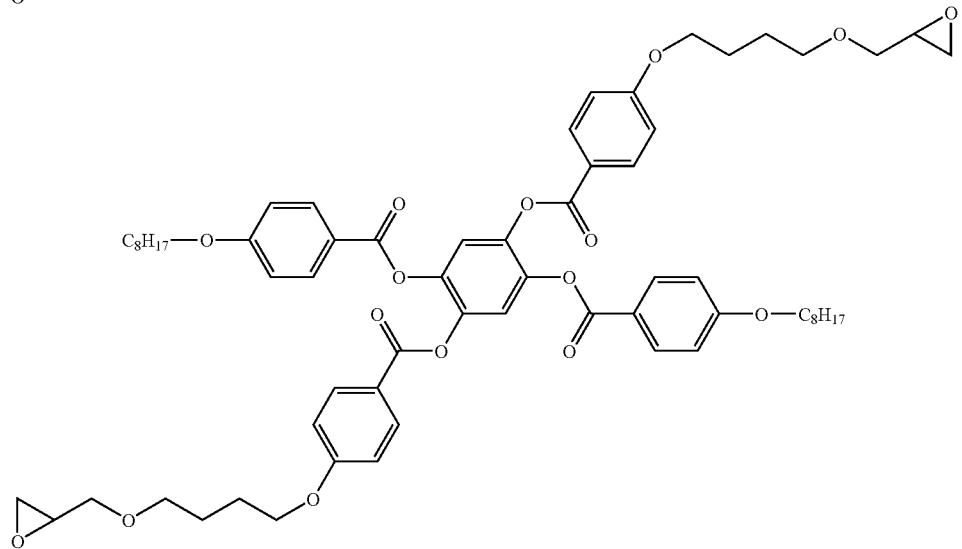
No. 3

-continued
No. 4
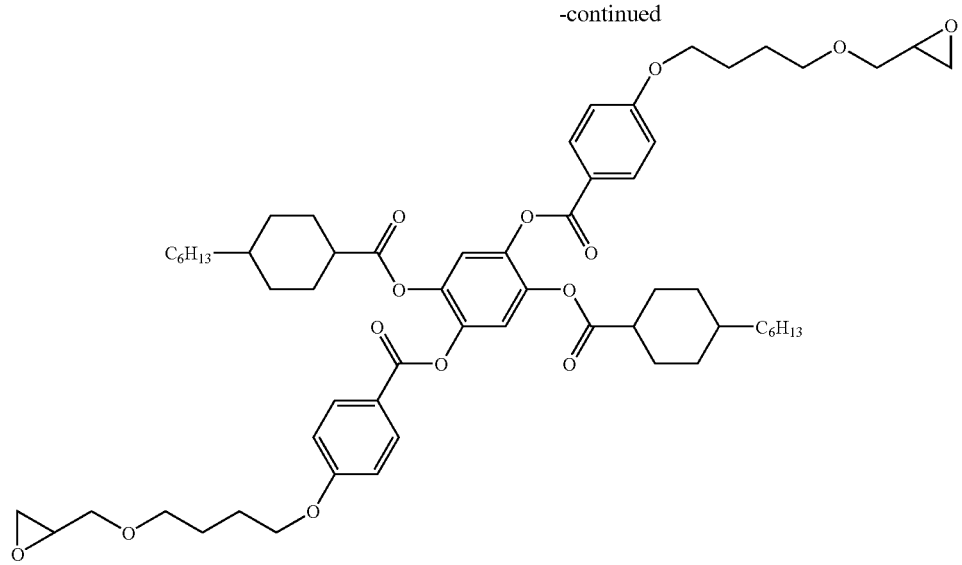
No. 5
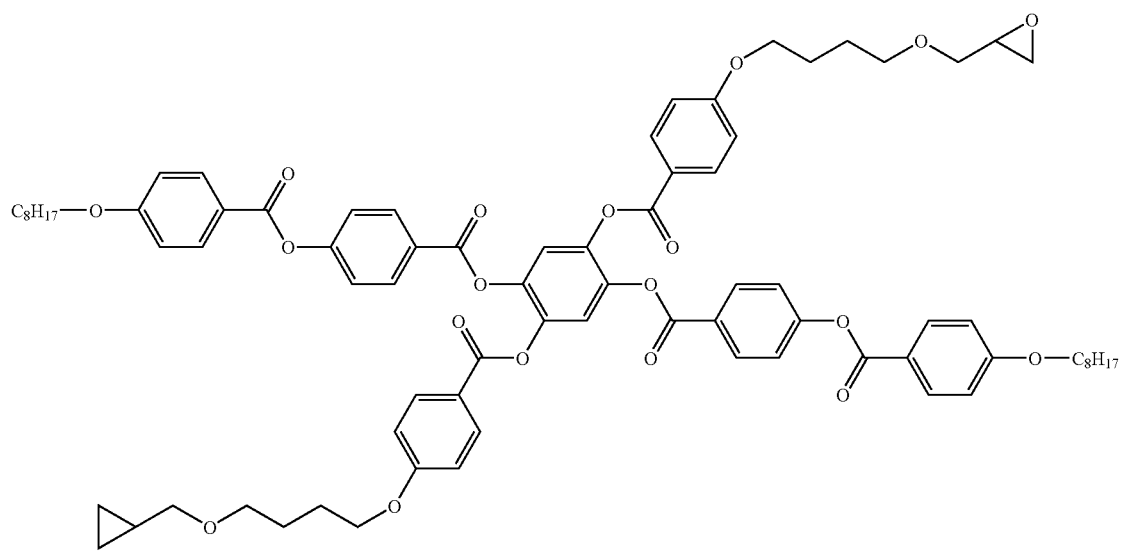
No. 6
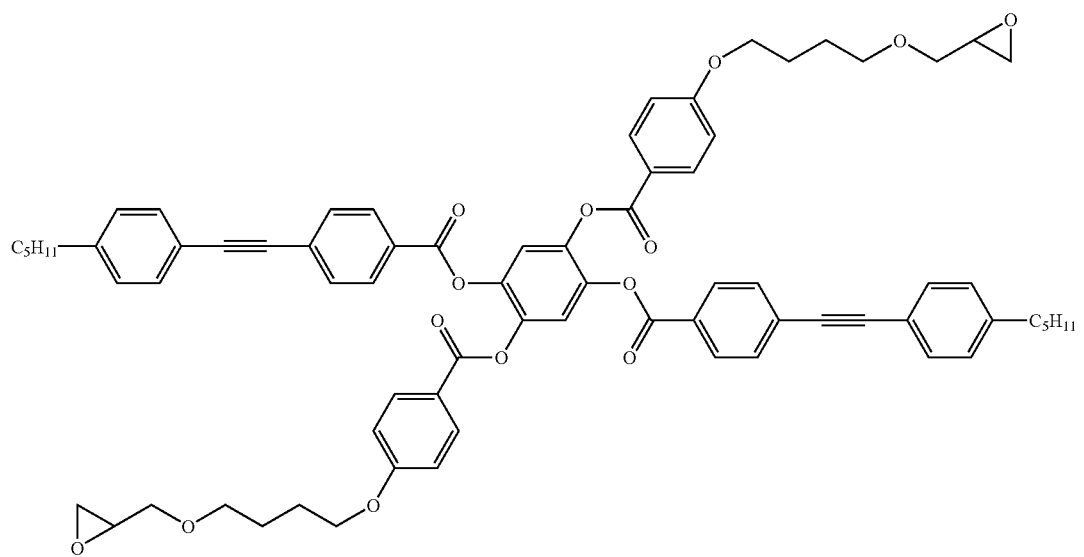

No. 7
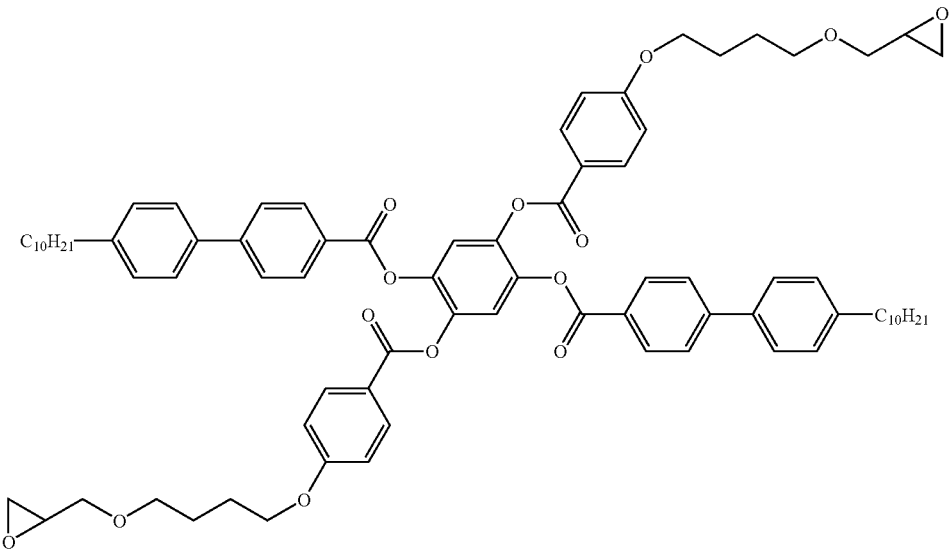
No. 8
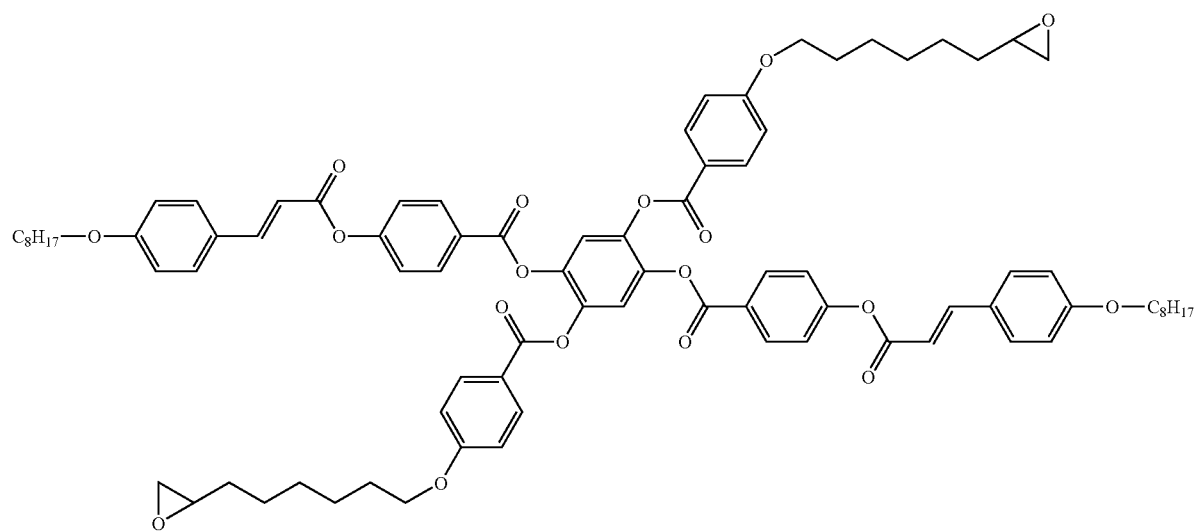
No. 9
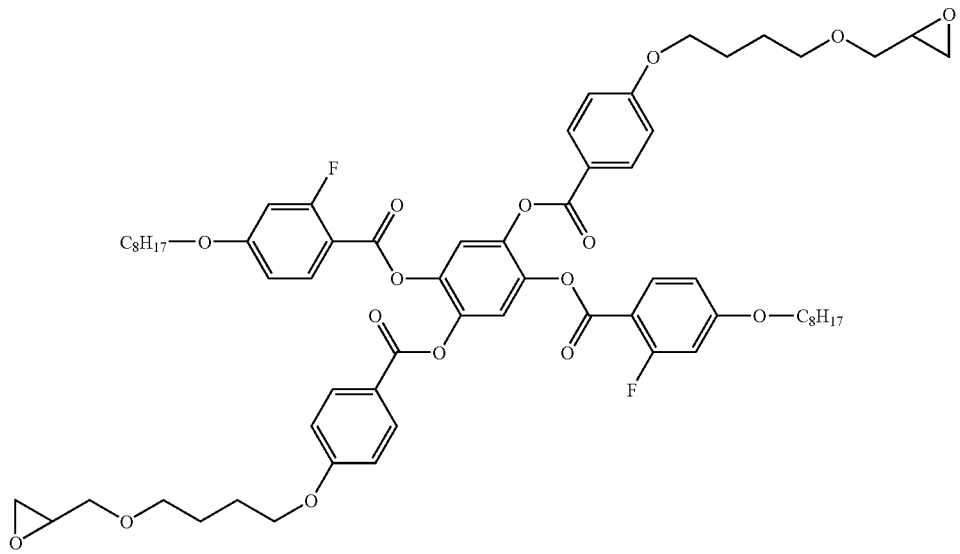

-continued
No. 10
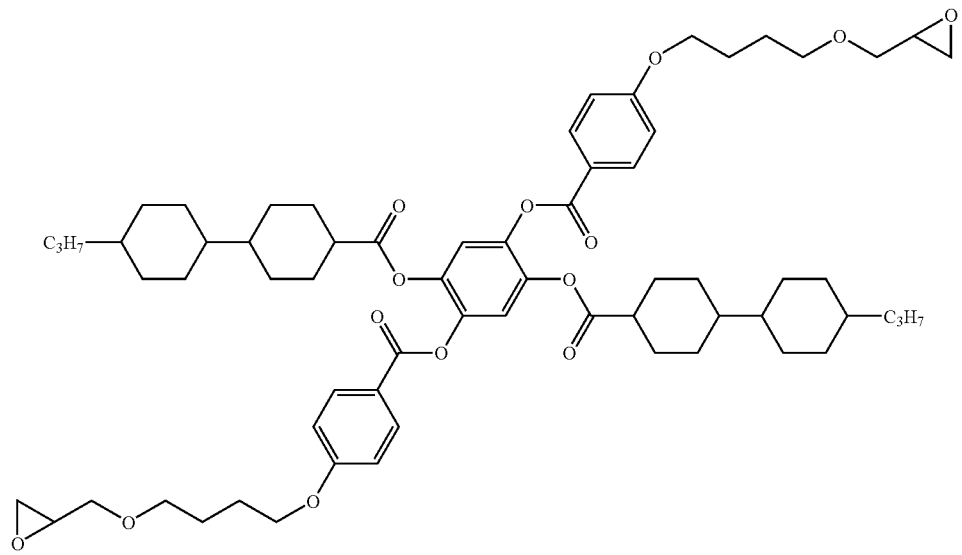
No. 11
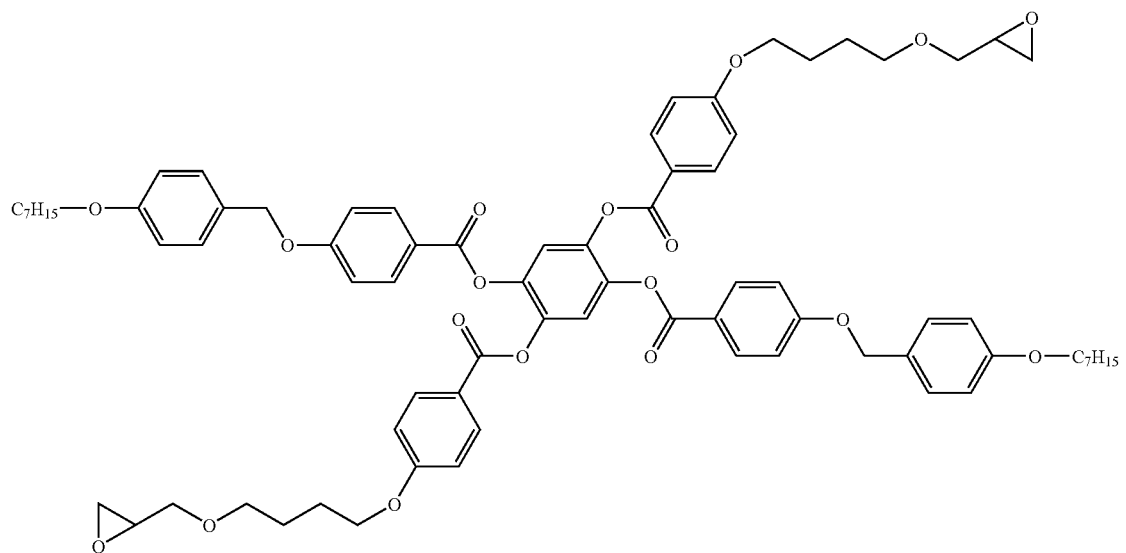
No. 12
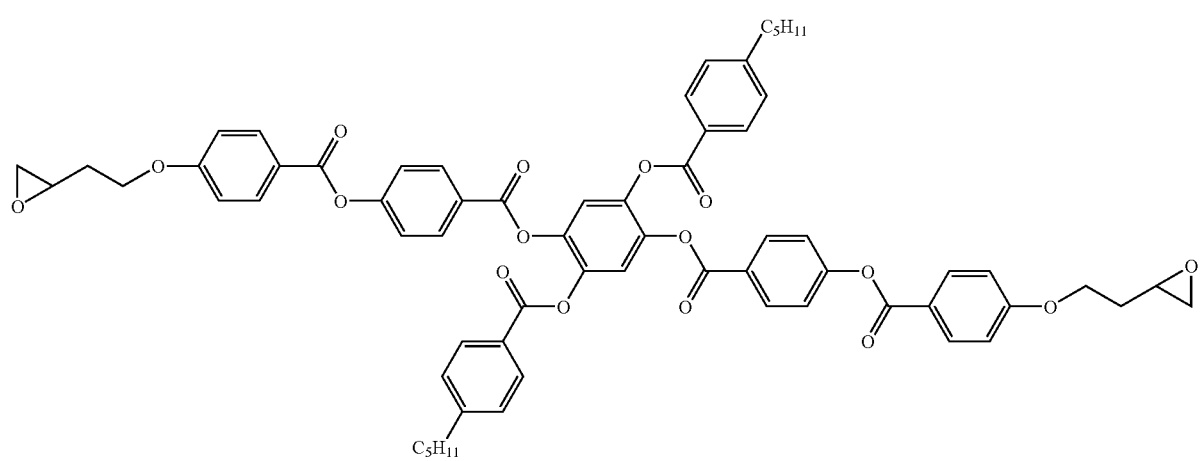

-continued
No. 13
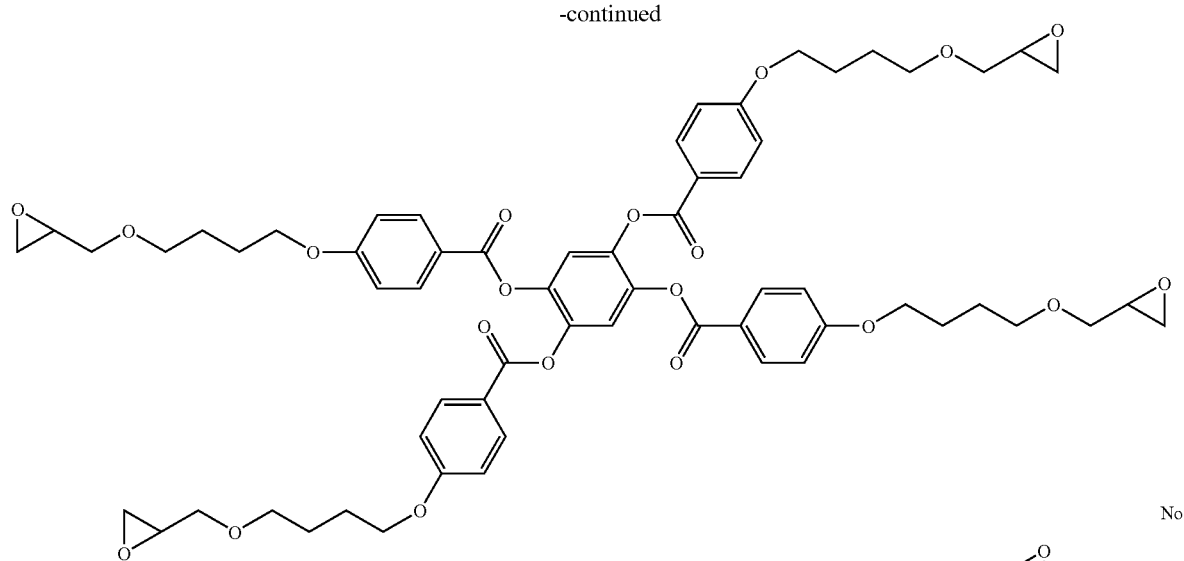
No. 14
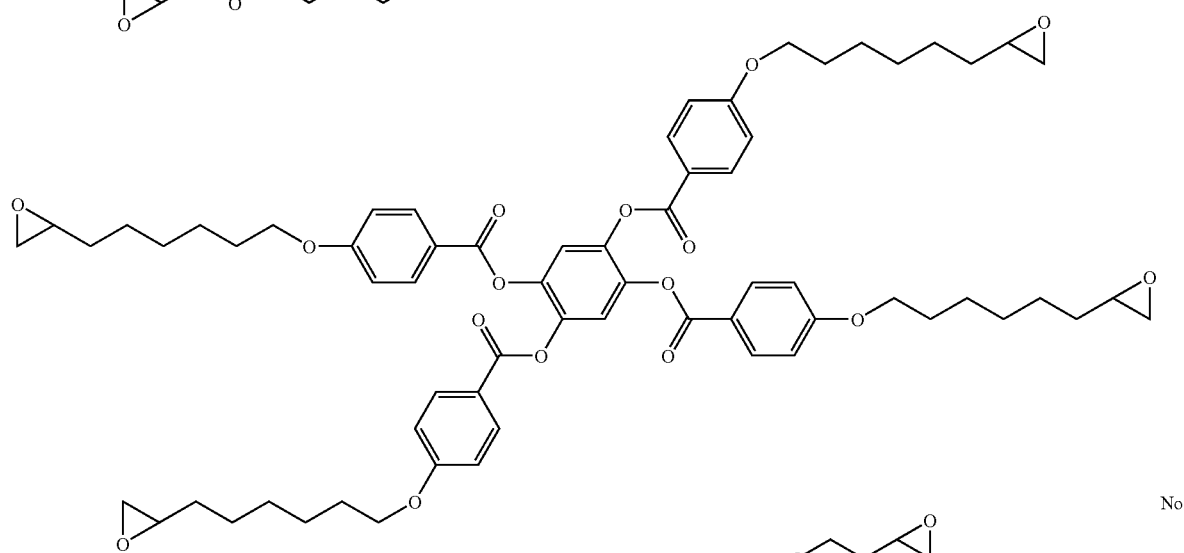
No. 15
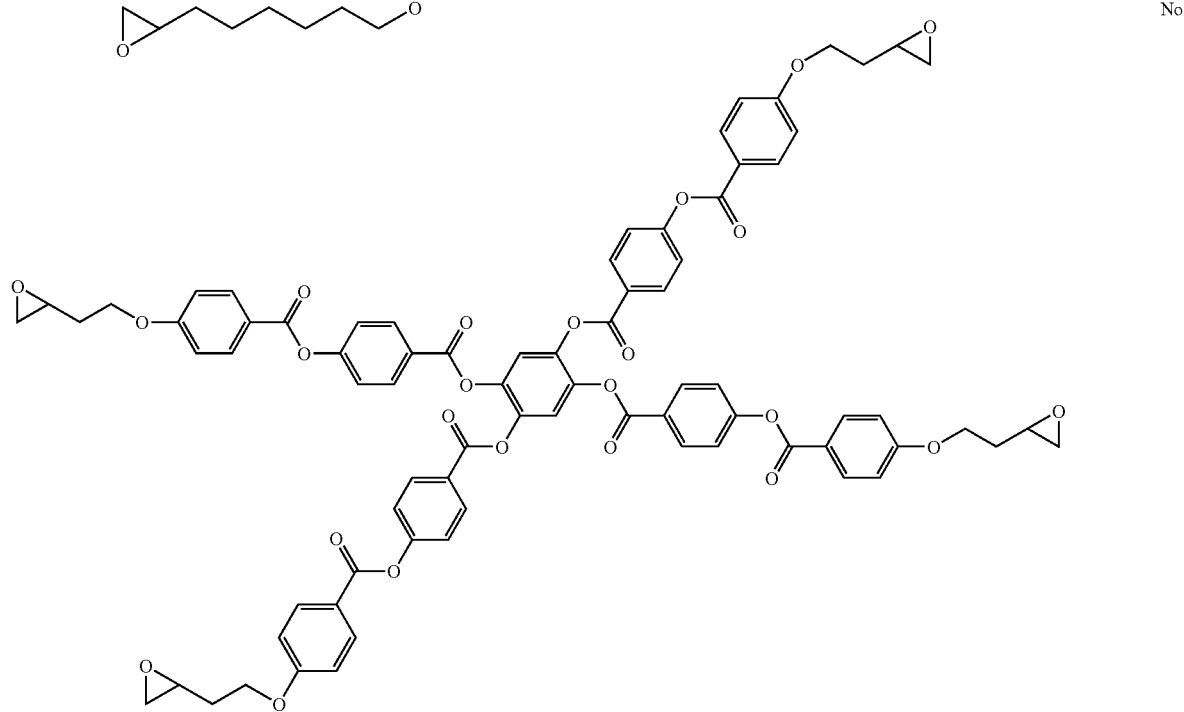

-continued
No. 16
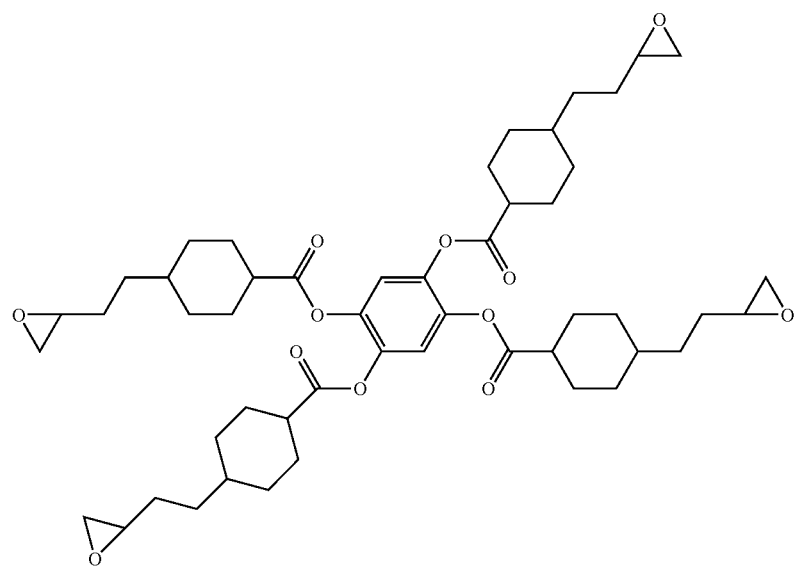
No. 17
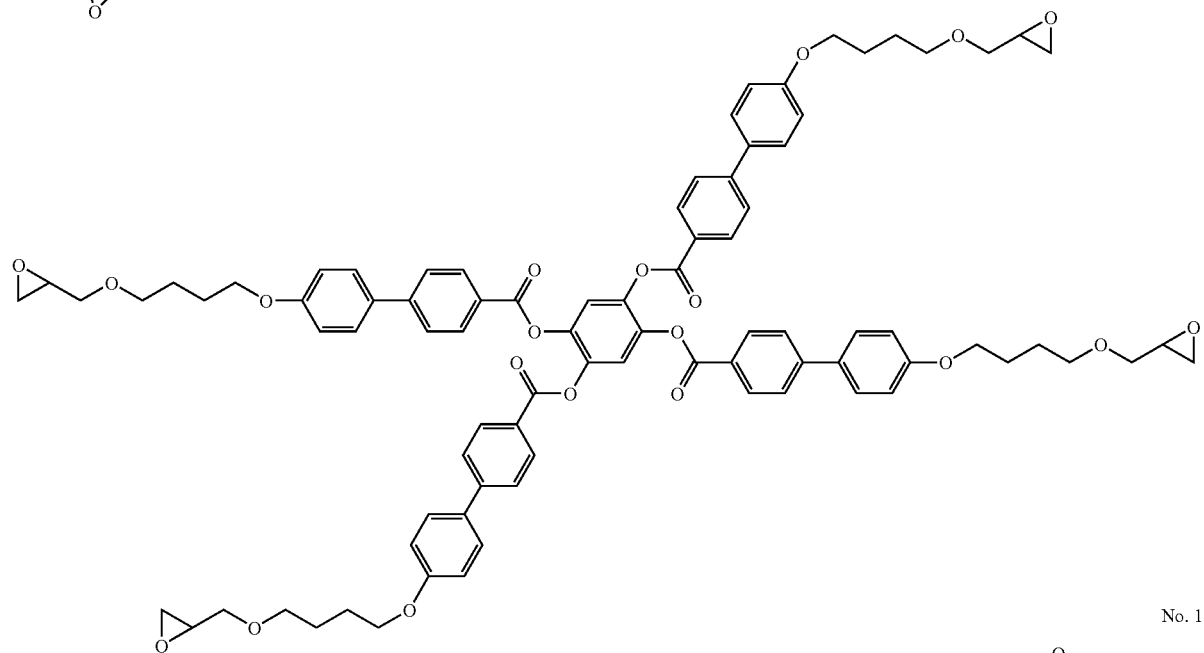
No. 18
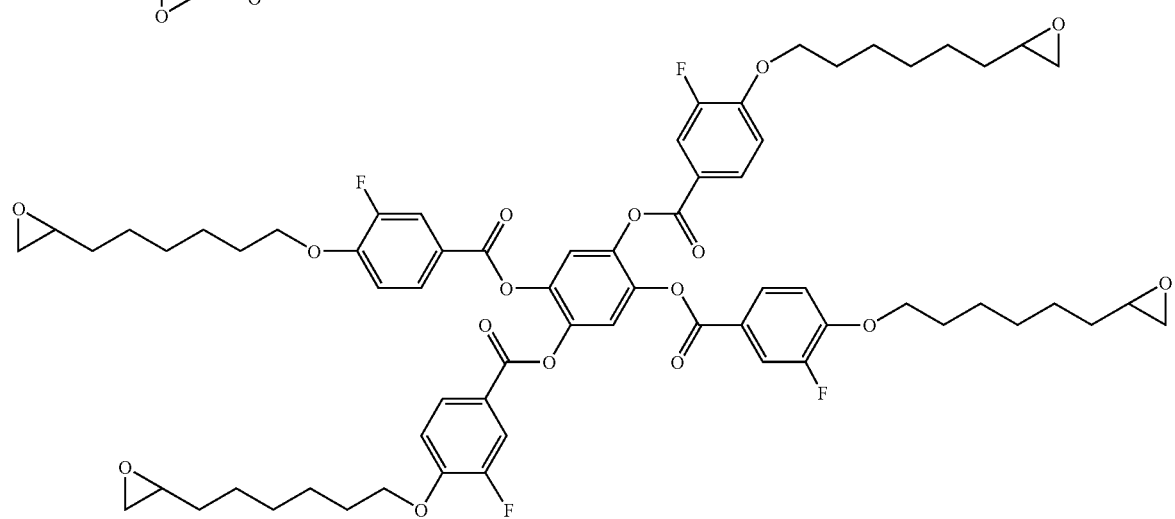

-continued
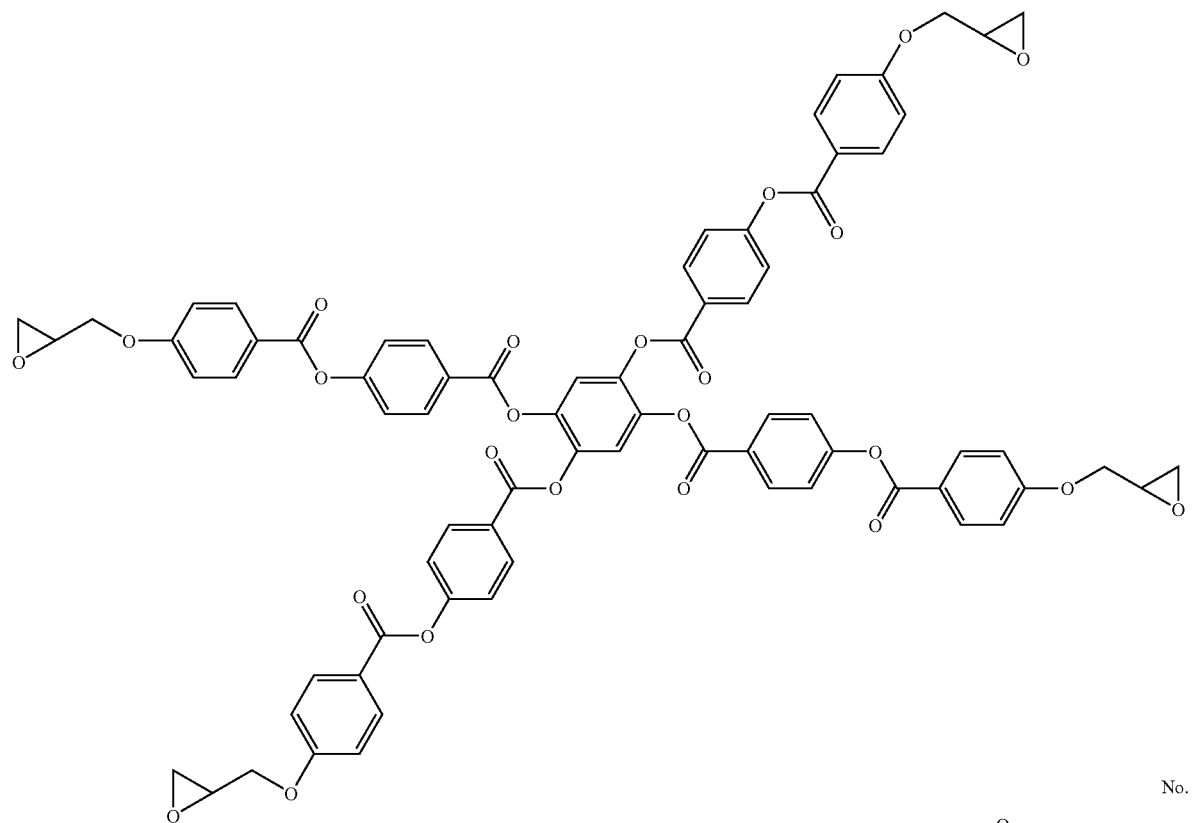
No. 19
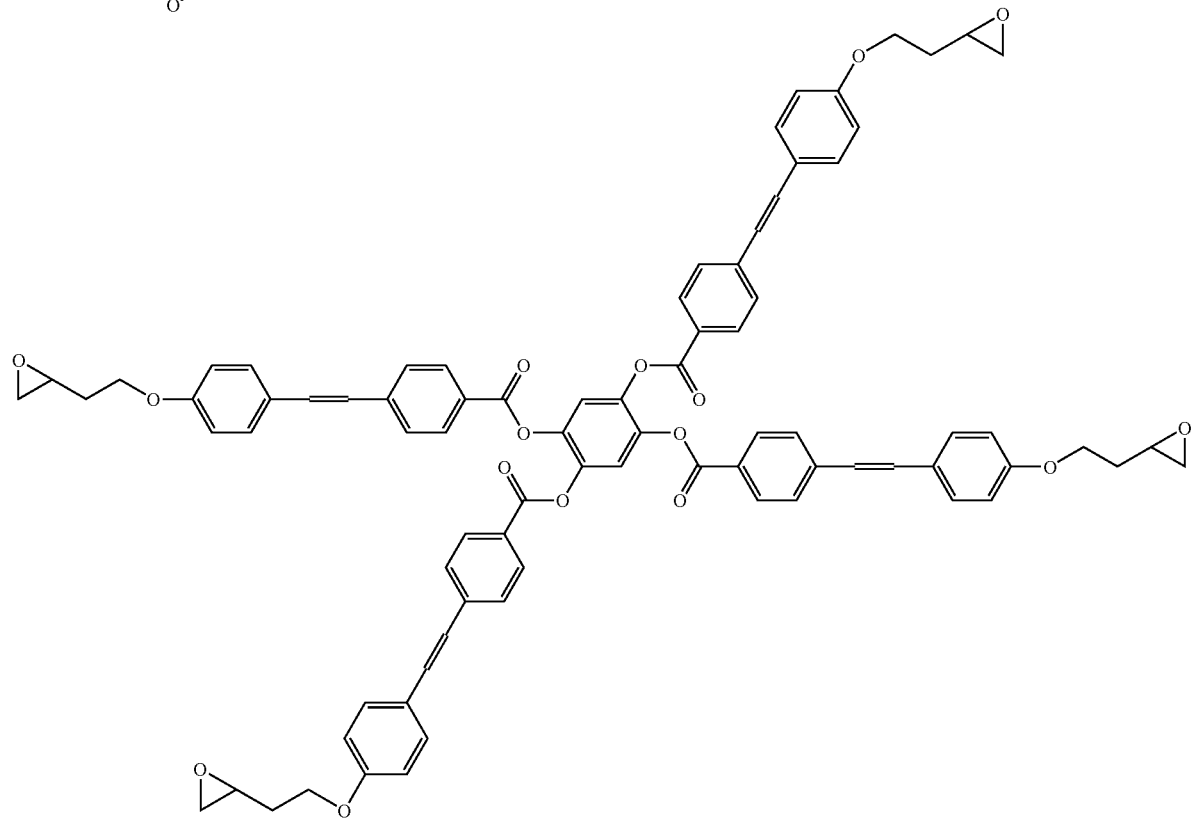
No. 20

-continued
No. 21
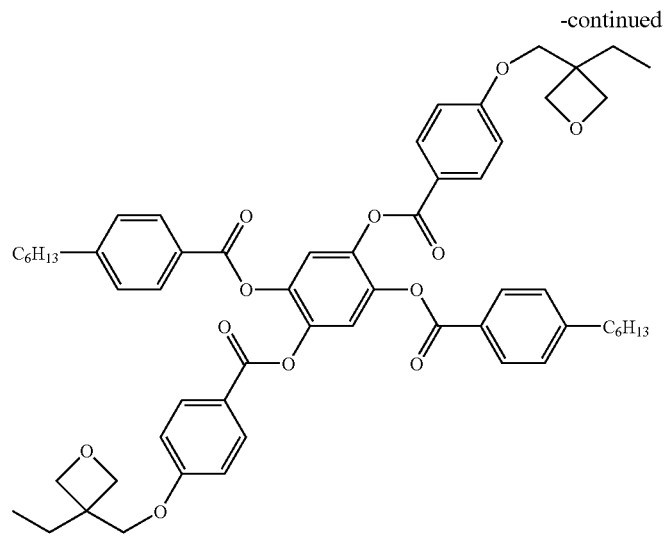
No. 22
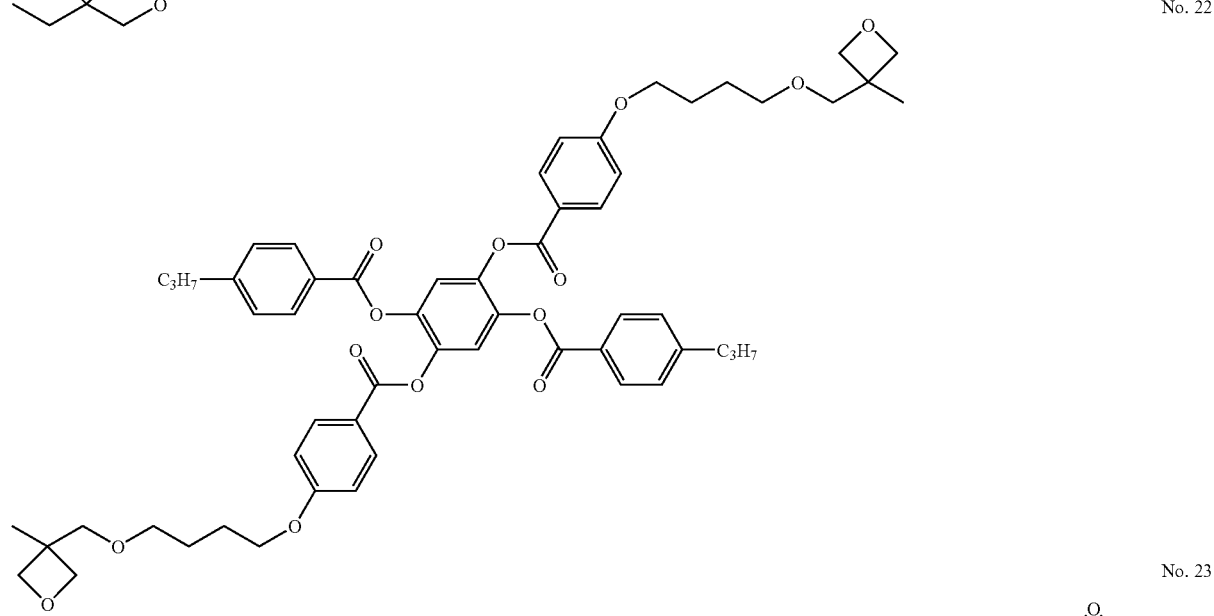
No. 23
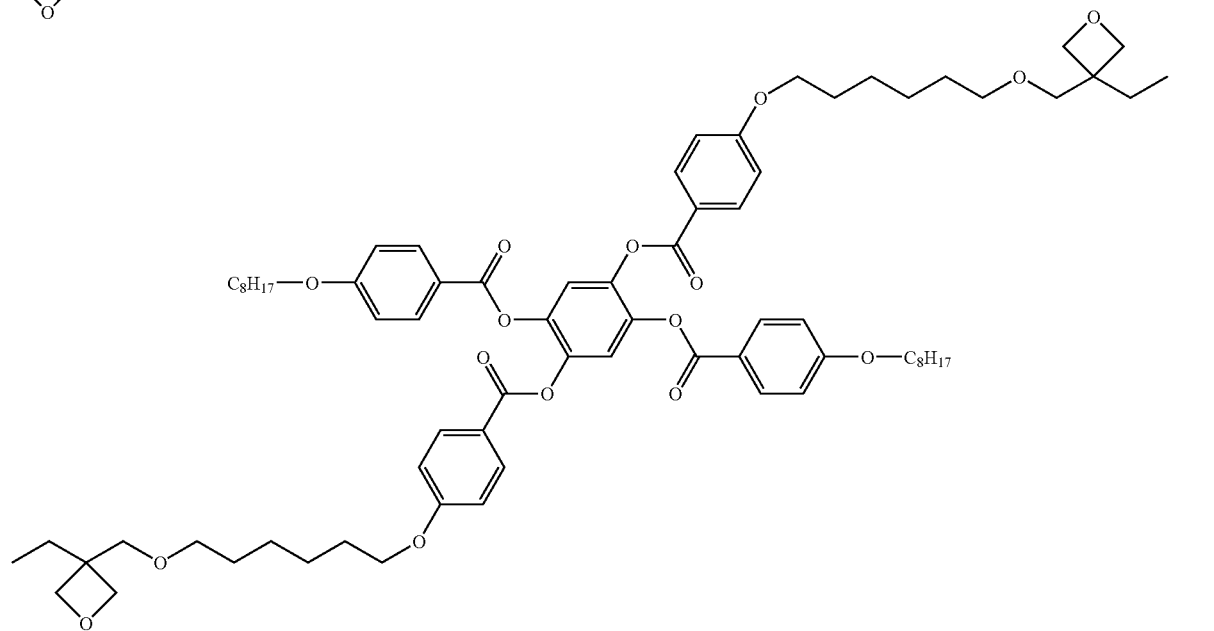

-continued
No. 24
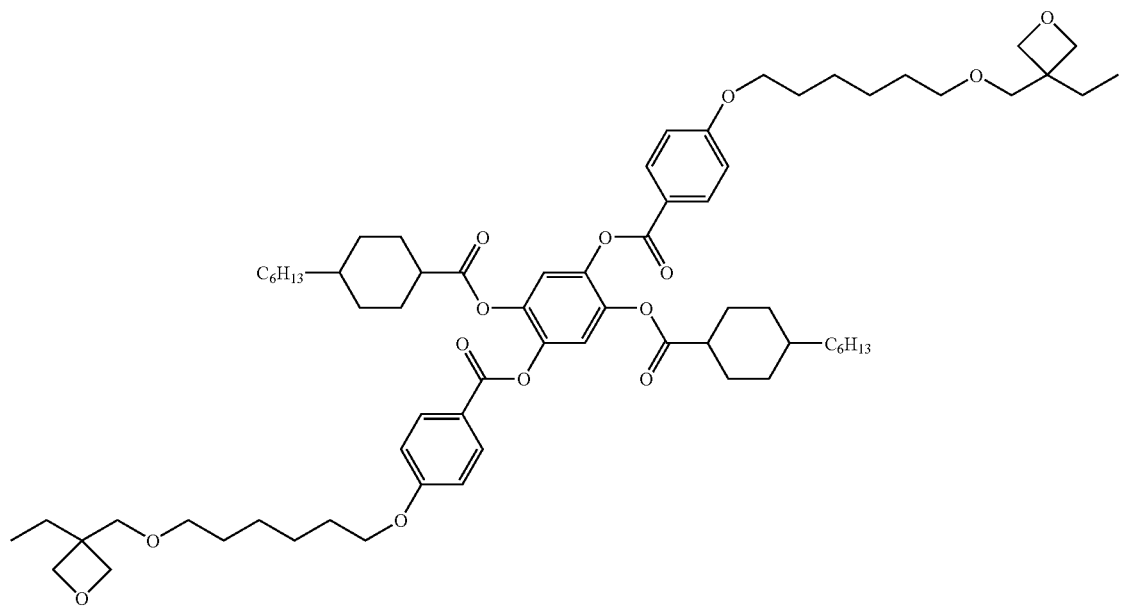
No. 25
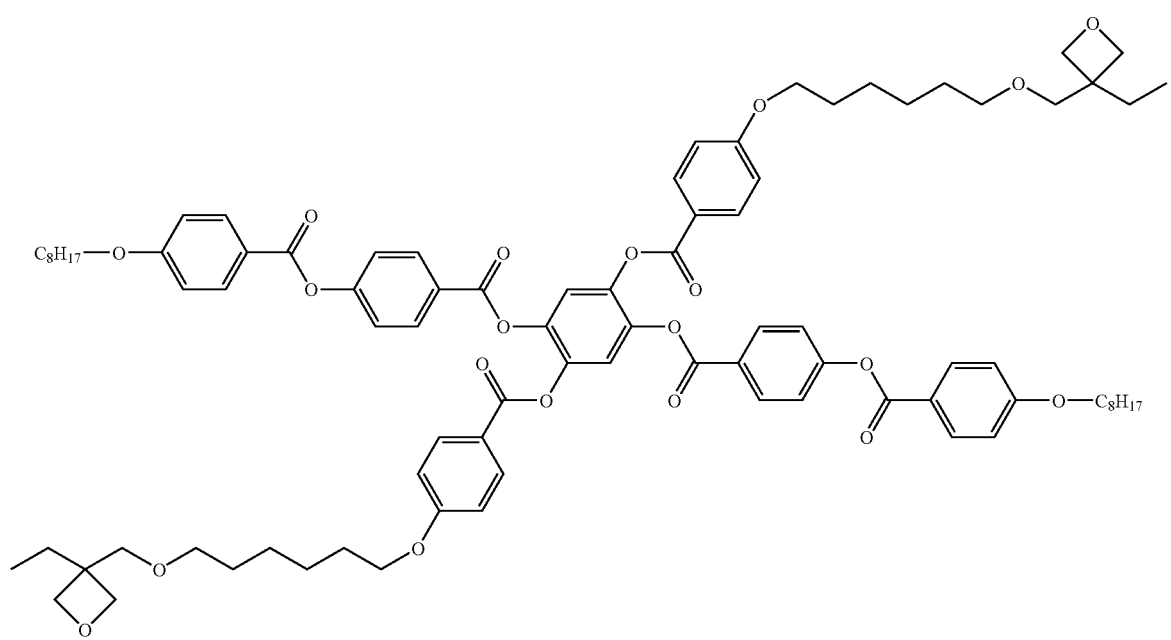

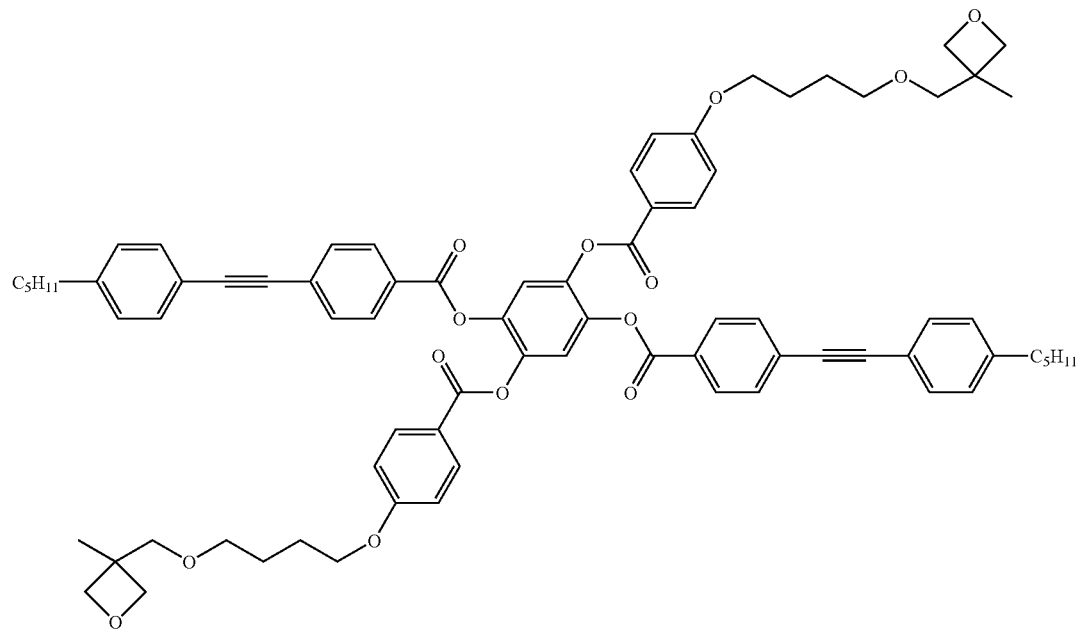
No. 26
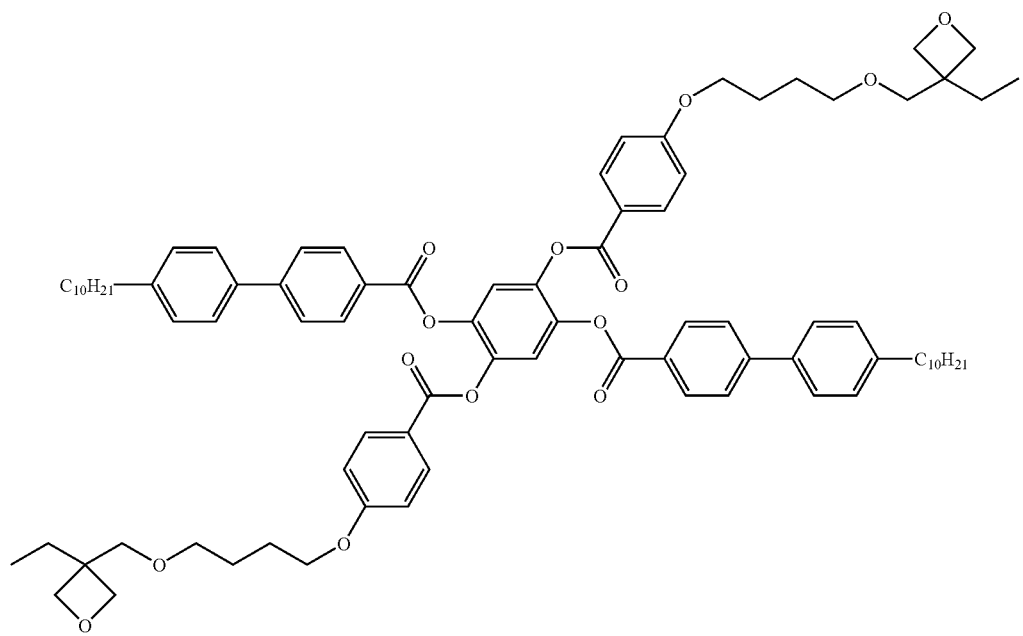
No. 27

No. 28
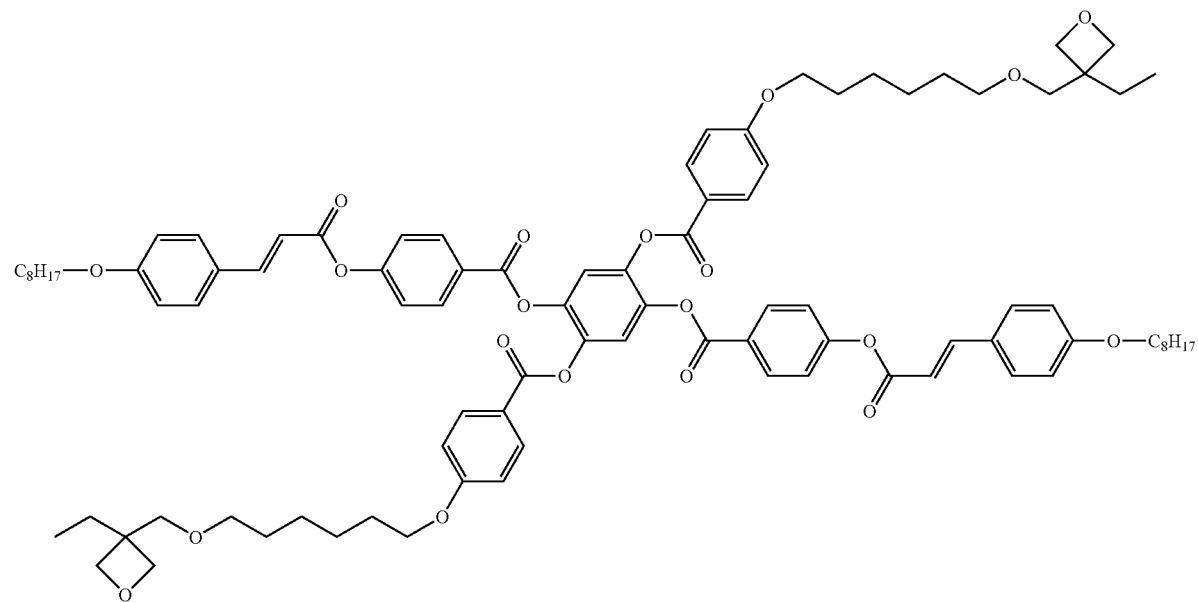
No. 29
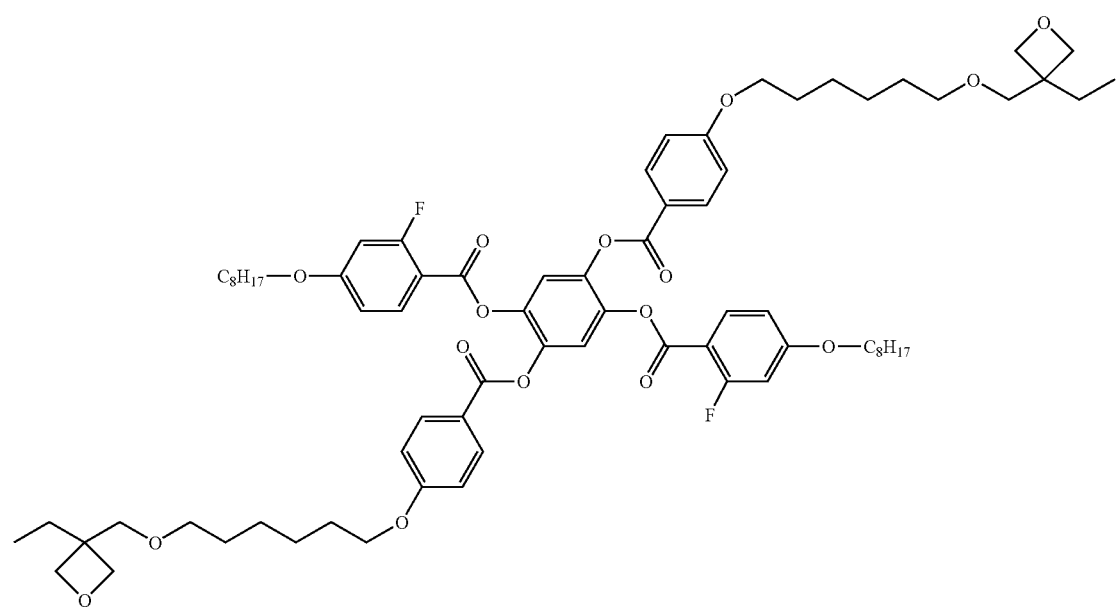

No. 30
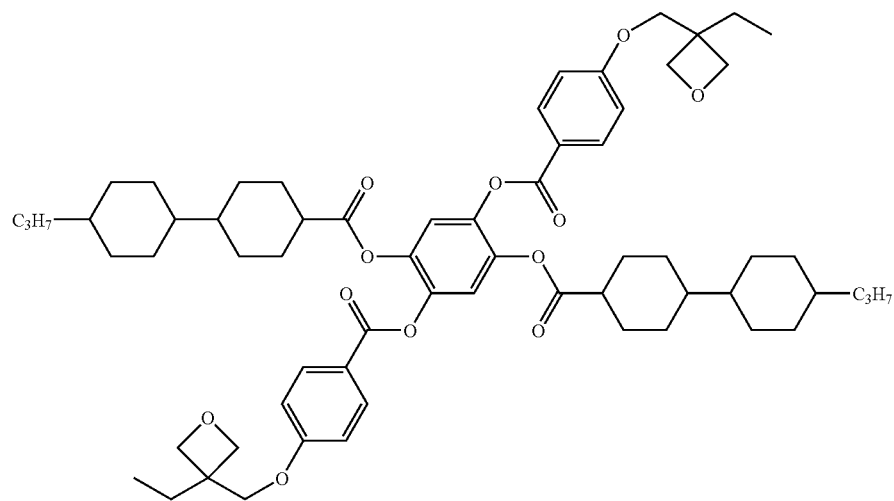
No. 31
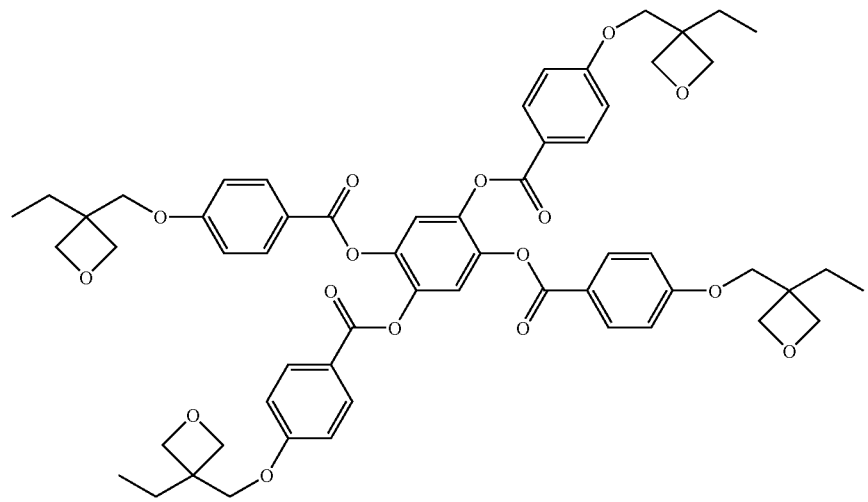
No. 32
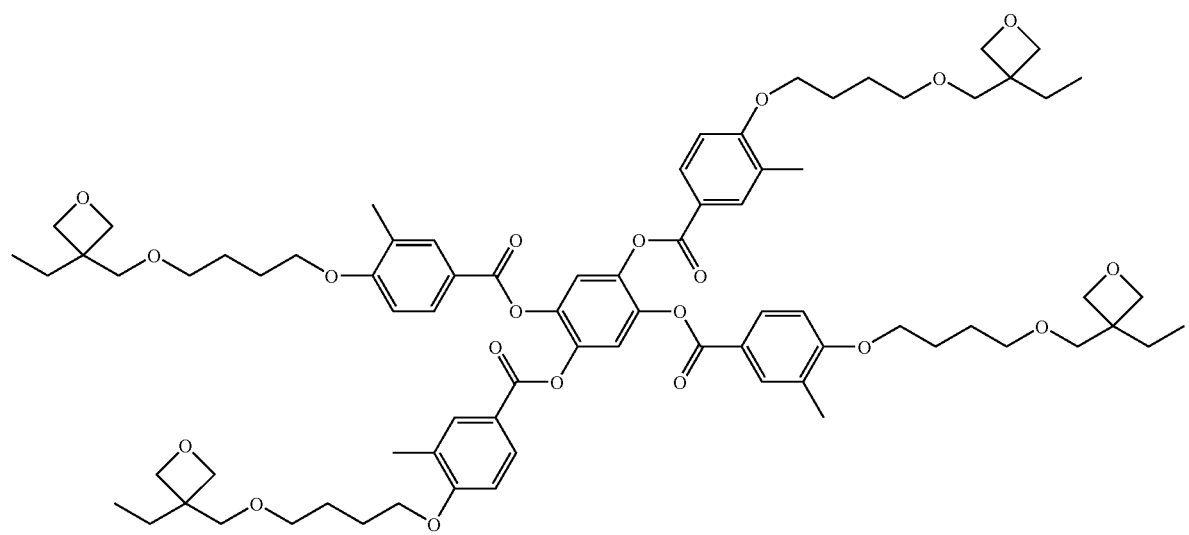

-continued
No. 33
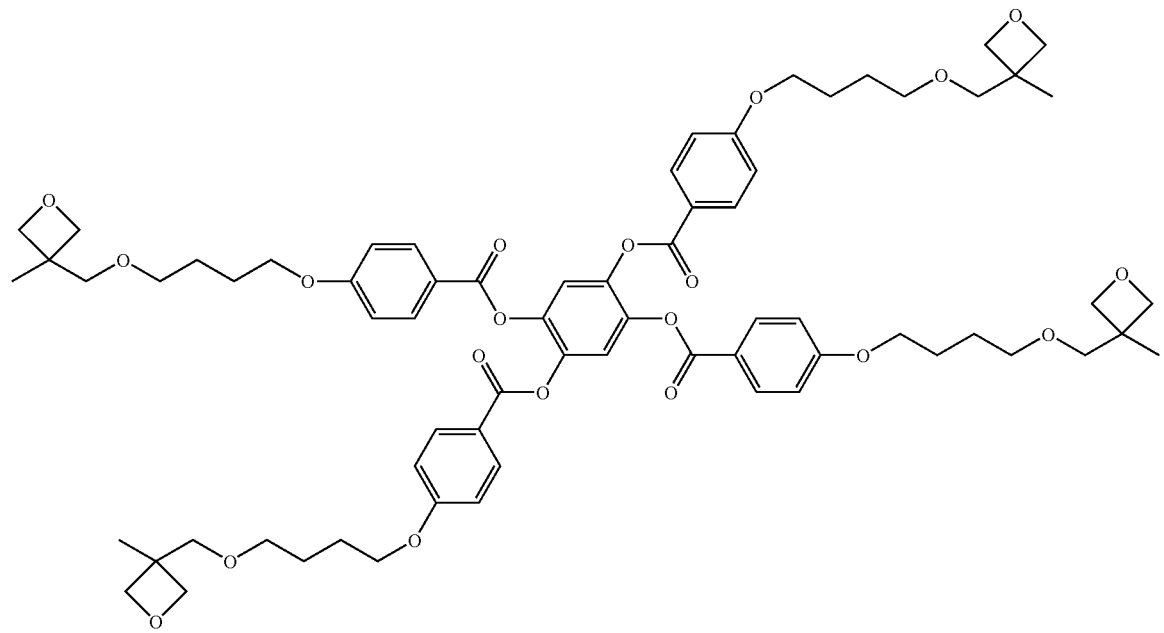
No. 34
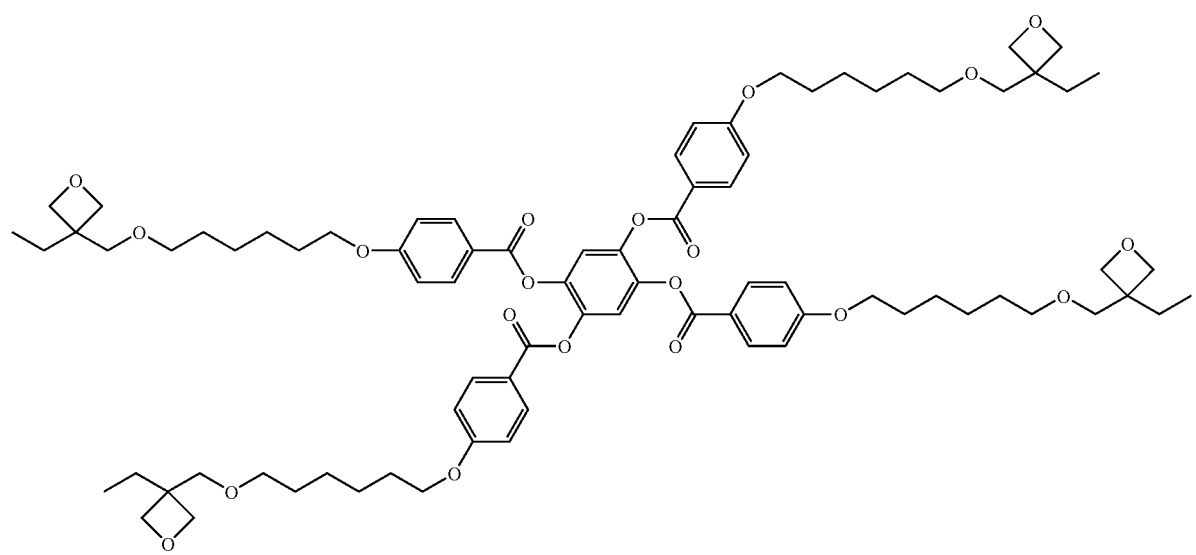

No. 35
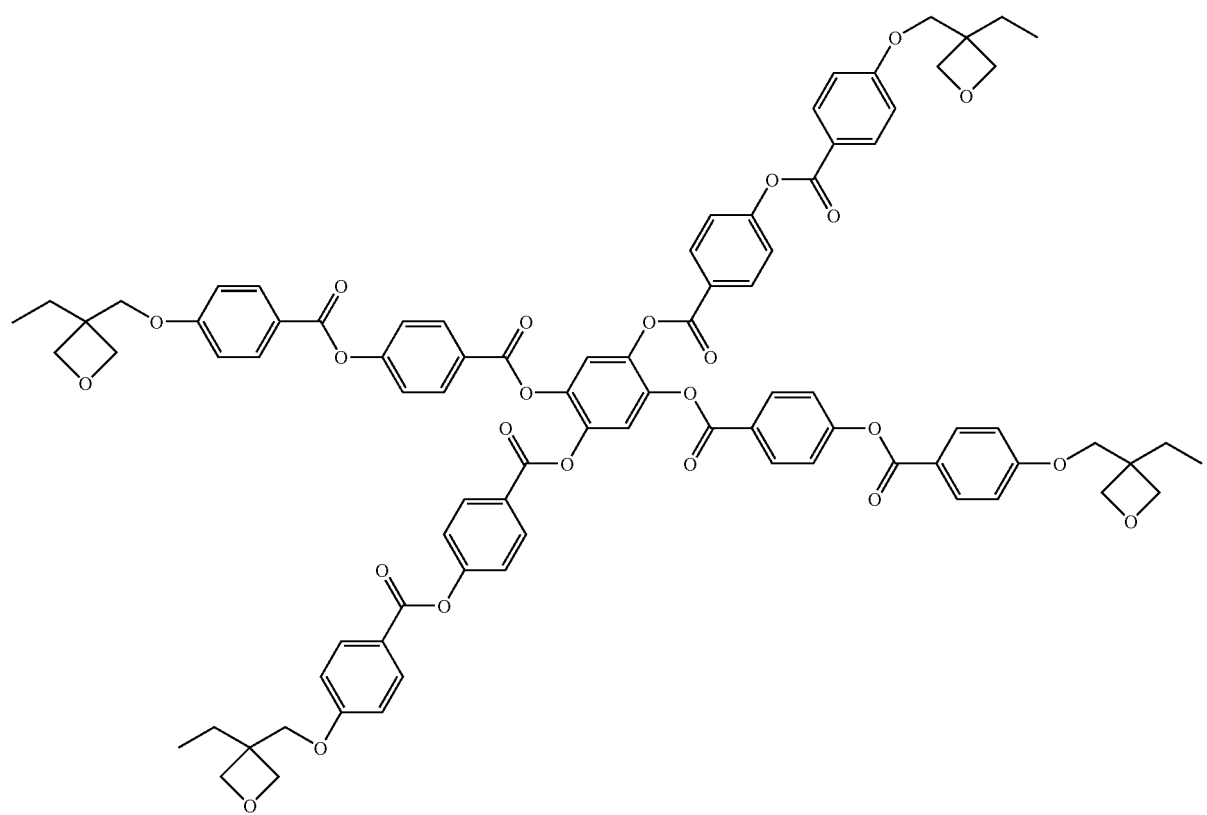
No. 36
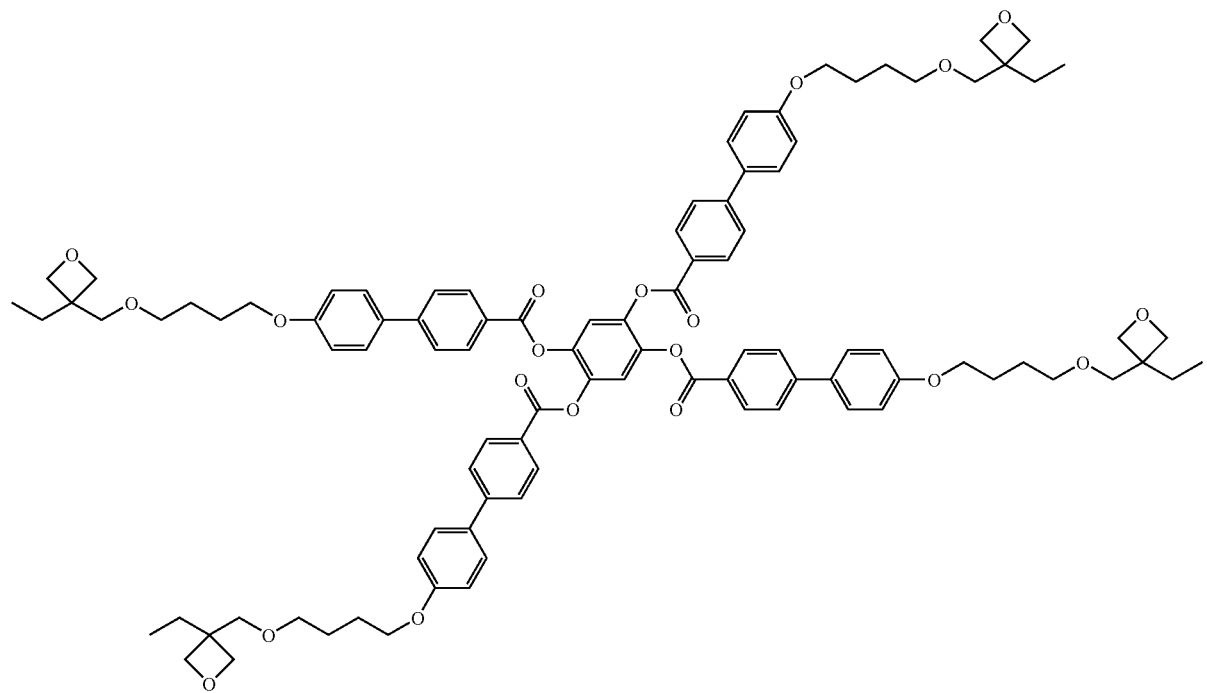

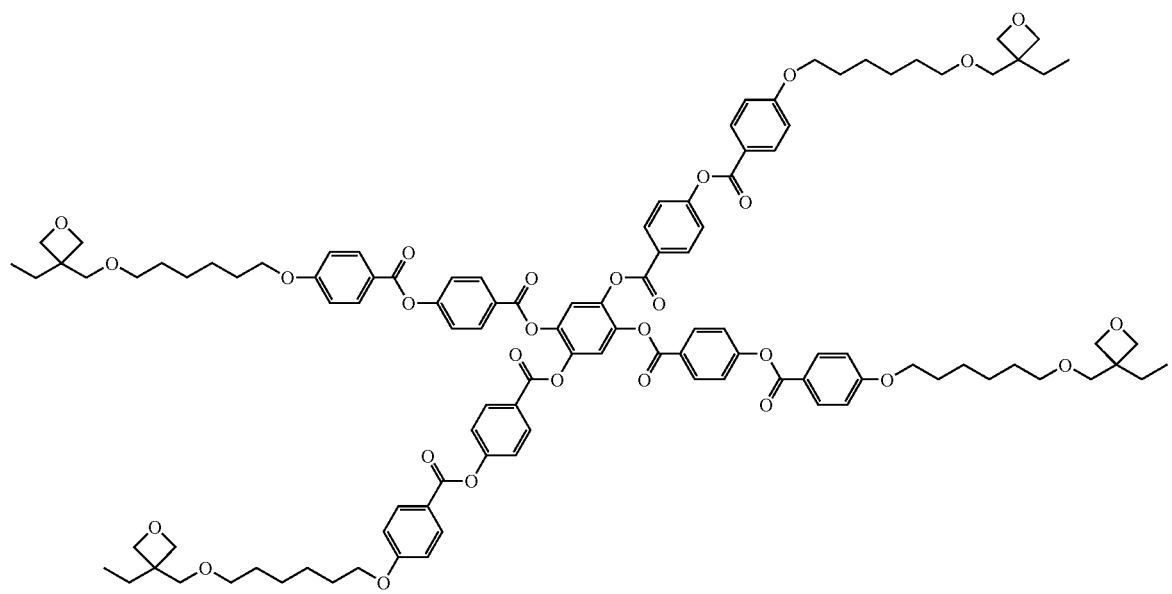

No. 37

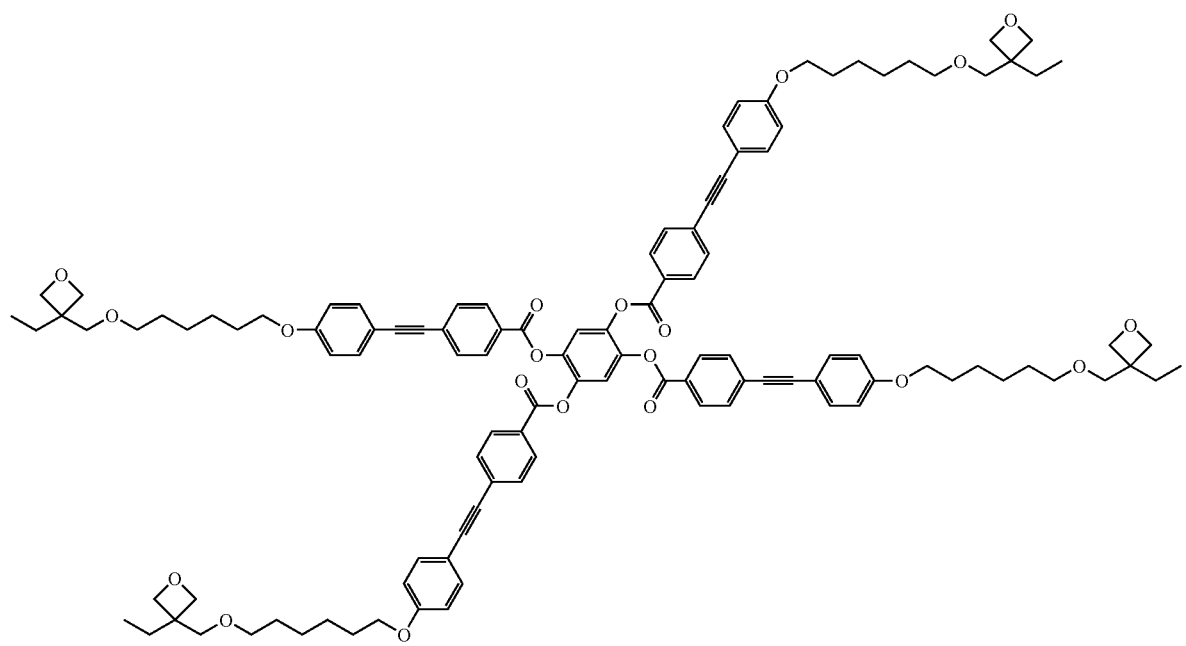

No. 38

Next, the composition of the invention shall be explained.

The composition of the invention contains at least one compound selected from the group of the compounds (1) to (4) described above as the first component. This composition usually means a mixture of plural compounds, but it shall be the composition if it contains one compound (1) or one compound (2). A polymer having an optical anisotropy is obtained by polymerizing the composition of the invention. The polymerizable compound may comprise only the first component. The composition of the invention is classified into the following compositions A, B, C and D.

The composition A contains one compound selected from the group of the compounds (1) to (4).

The composition B contains at least two compounds selected from the group of the compounds (1) to (4).

The composition C contains at least one compound selected from the group of the compounds (1) to (4) as the first component and at least one compound selected from the group of the other polymerizable compounds as the second component.

The composition D further contains a non-polymerizable compound in the compositions A, B and C described above.

The "other polymerizable compounds" described above are polymerizable compounds (monomers) which are different from the compounds (1) to (4). Such other polymerizable compounds are useful for improving and modifying the characteristics of the polymers obtained. The other polymerizable compounds may be optically active or may be optically inactive.

The preferred examples of the optically inactive polymerizable compounds are compounds having an oxiranyl group, compounds having an oxetanyl group, compounds having a vinyloxy group, compounds having a vinyl group, compounds having an acryl group and compounds having a methacryl group. Examples of these compounds are described in Japanese Patent Application Laid-Open No. 3111/1996.

The preferred second component in the composition C is the compounds (M1) to (M4) described above. The compounds (M1) to (M4) are convenient for controlling a temperature range of a liquid crystal phase, a viscosity and alignment of the liquid crystal phase in the composition and a film-forming property, a mechanical strength and an adhesive property to a supporting substrate in the polymer.

The composition C may further contain compounds such as ethyl vinyl ether, hydroxybutyl monovinyl ether, t-amyl vinyl ether, cyclohexanedimethanolmethyl vinyl ether, 3-ethyl-3-hydroxymethyloxetane, 3-methyl-3-hydroxymethyloxetane, di(3-ethyl-oxeta-3-ylmethyl) and 3-ethyl-3-(2-ethylhexyloxymethyl)oxetane. These compounds are suited for controlling a viscosity of the composition and have a large effect of making a thickness of a paint film uniform in coating the composition.

Compounds which induce a helical structure in a liquid crystal phase and which have a large helical twist power are preferred as the optically active polymerizable compounds. The preferred examples of the optically active polymerizable compounds include compounds represented by the following Formulas (OP1) to (OP13):

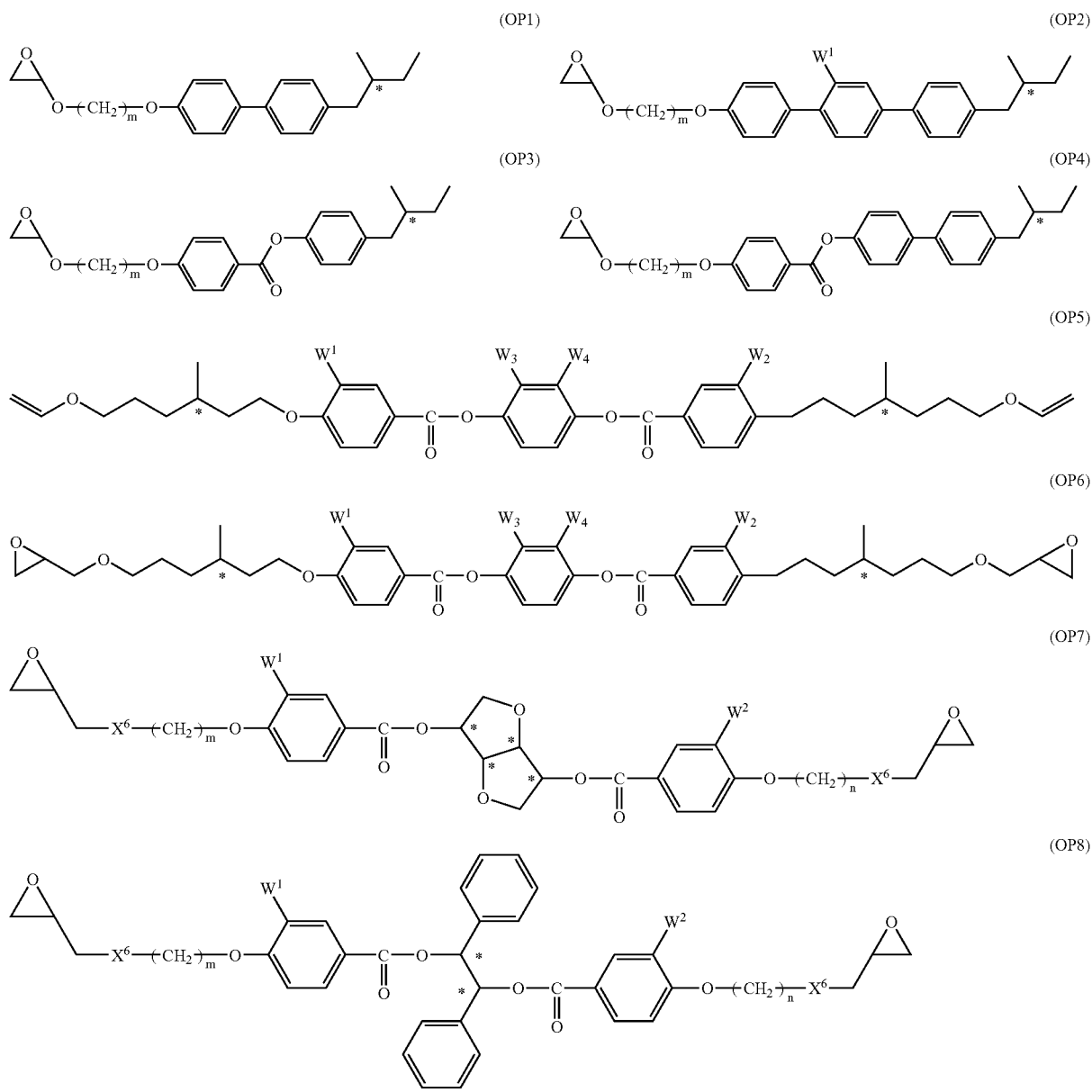

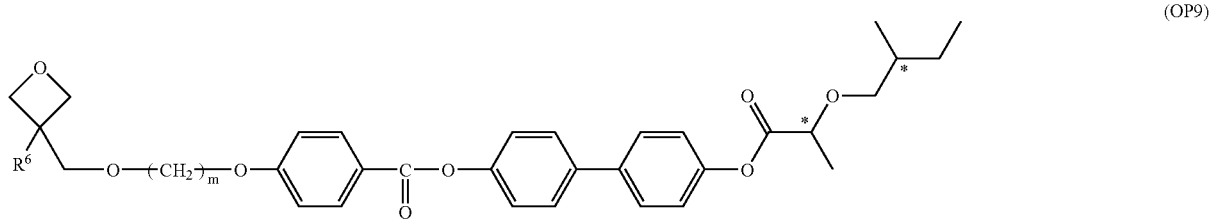

(OP9)

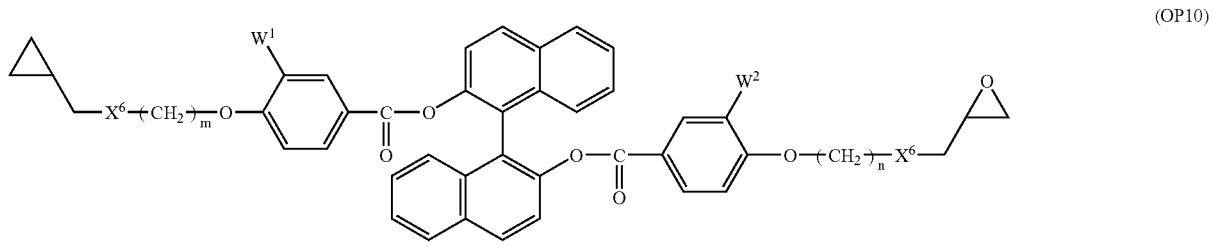

(OP10)

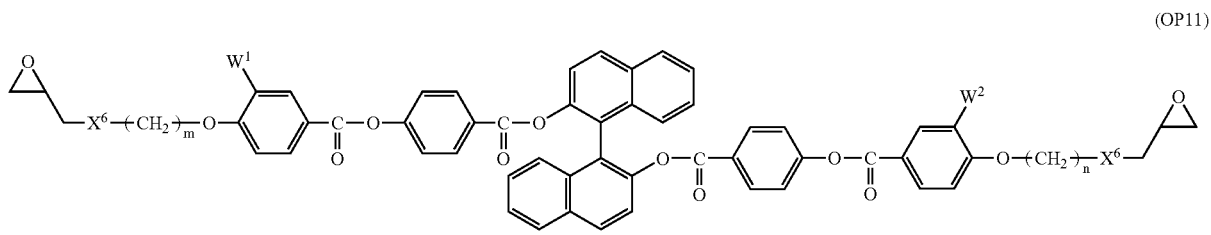

(OP11)

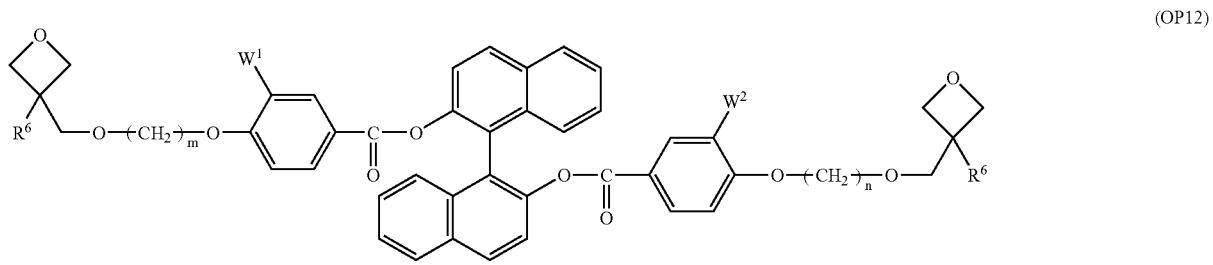

(OP12)

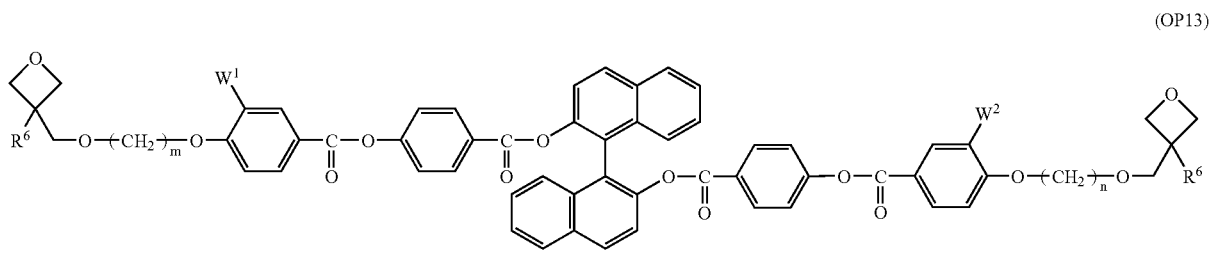

(OP13)

In the formulas described above, $R^6$ is a hydrogen atom, methyl or ethyl; $W^1$ and $W^2$ are independently a hydrogen atom or a fluorine atom; $X^6$ is a single bond or —O—; m and n are independently an integer of 1 to 10; and "*" is asymmetric carbon. The compounds (OP10) to (OP13) are axially asymmetric compounds.

The composition D contains a non-polymerizable compound, for example, a non-polymerizable liquid crystal compound and an optically active compound. The non-polymerizable liquid crystal compound is described in a liquid crystal compound data base (LiqCryst®) marketed by Fujitsu Kyushu Engineering Co., Ltd. Such non-polymerizable compounds can be expected to play roles such as controlling a viscosity of the composition and a temperature range of the liquid crystal phase and controlling the pitches of the optically active compound and the composition.

The preferred composition of the invention contains at least one compound selected from the group of the compounds (1) to (4) as the first component and at least one compound selected from the group of the compounds (M1) to (M4) as the second component. The compounds of the second component have a polymerizable group suited for copolymerizing with the compounds (1) to (4). The preferred compounds (M1) to (M4) are compounds represented by the following Formulas (M1a) to (M4c):

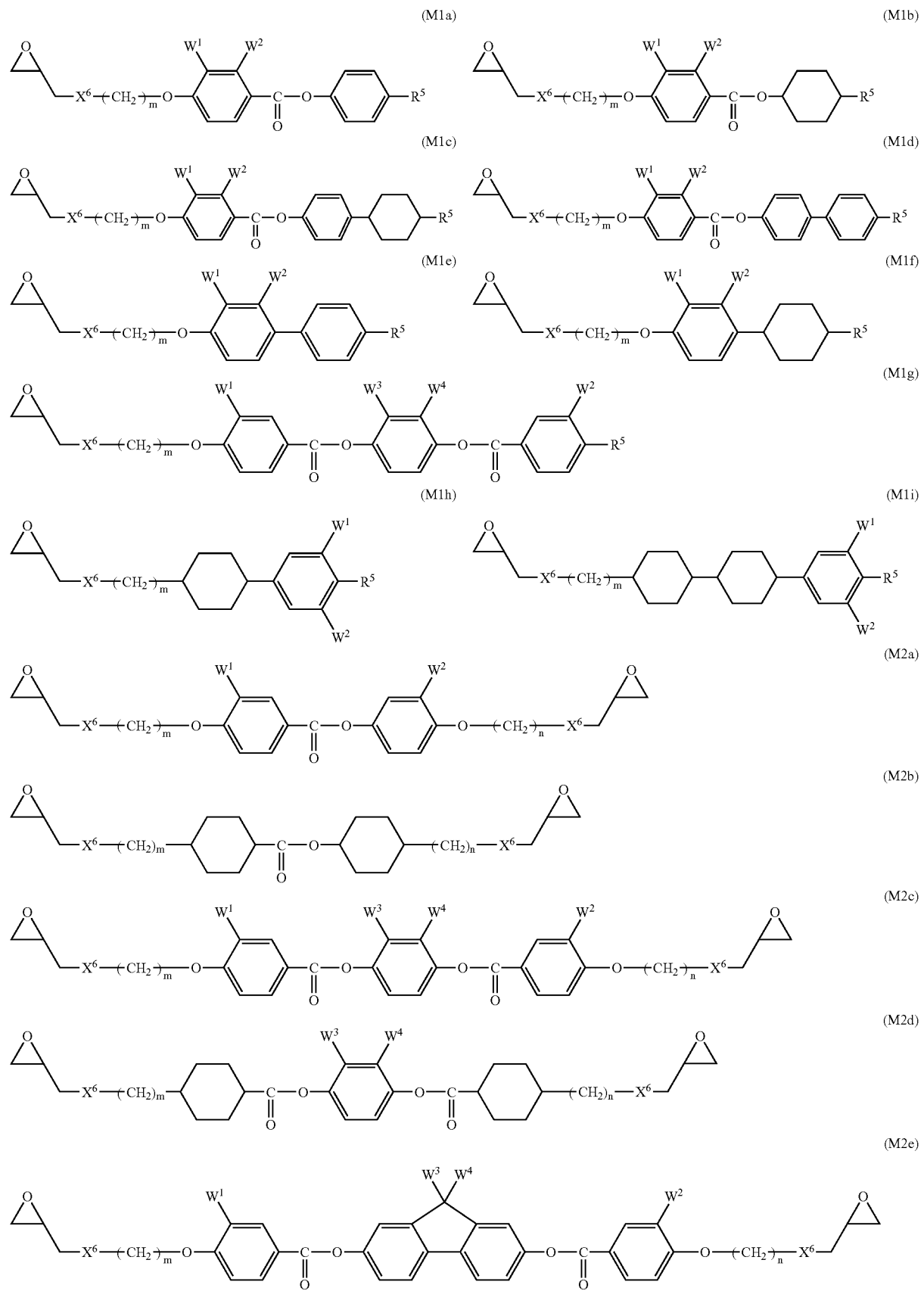

-continued
(M2f)
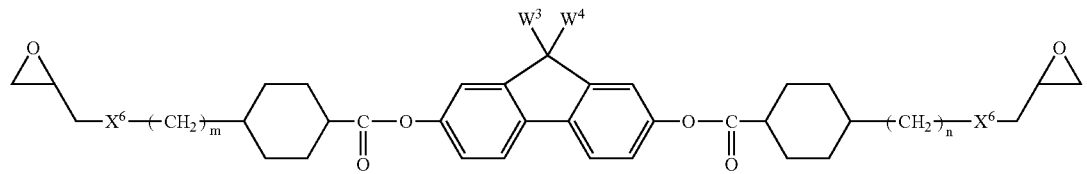
(M3a) (M3b)
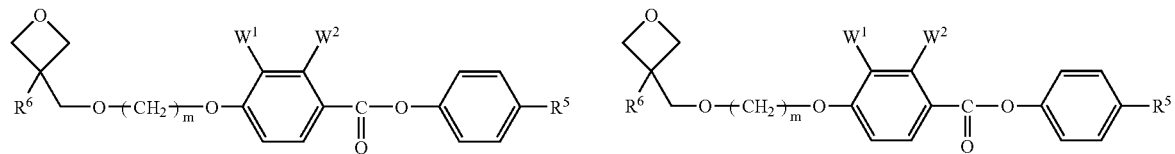
(M3c) (M3d)
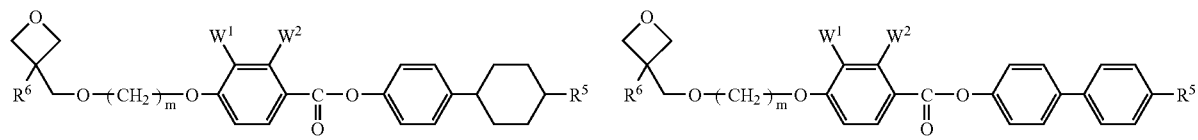
(M3e) (M3f)
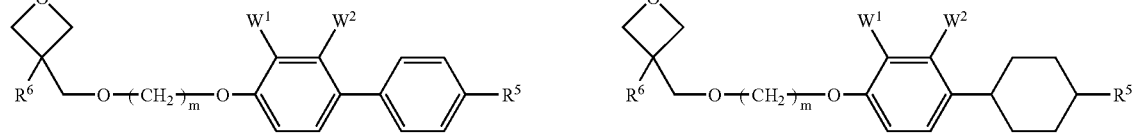
(M3g)
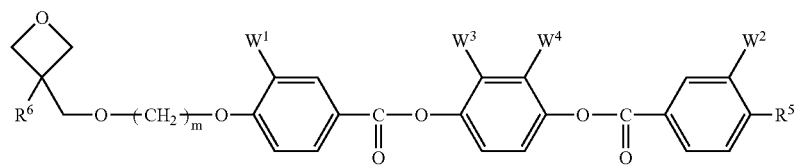
(M3h) (M3i)
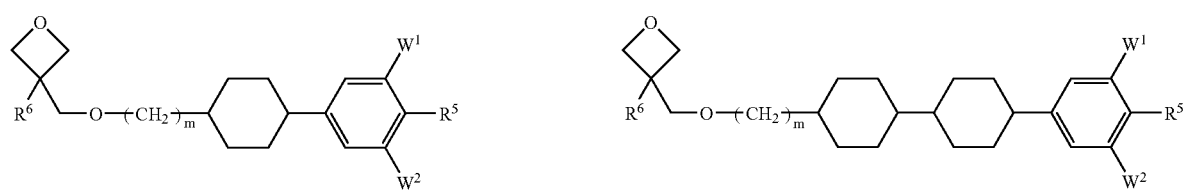
(M4a)
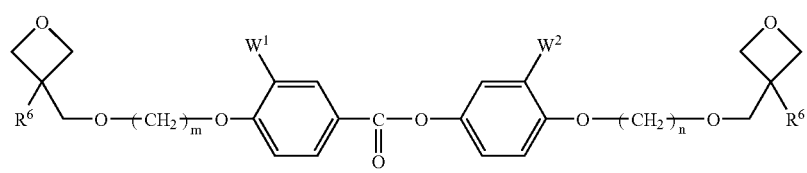
(M4b)

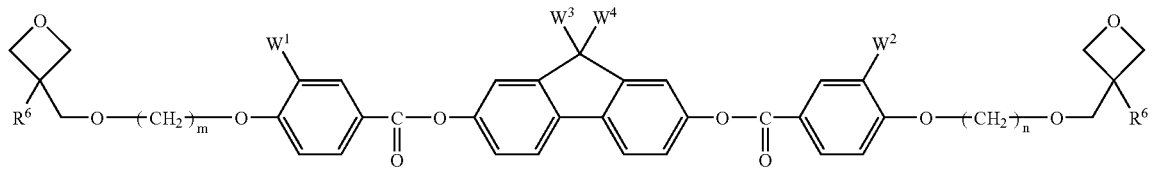

(M4c)

In the formulas described above, $R^5$ is a fluorine atom, a chlorine atom, —$OCF_3$, an alkyl group having 1 to 20 carbon atoms or an alkoxy group having 2 to 20 carbon atoms; $R^6$ is a hydrogen atom, methyl or ethyl; $W^1$ and $W^2$ are independently a hydrogen atom or a fluorine atom; $W^3$ and $W^4$ are independently a hydrogen atom, a fluorine atom, methyl or trifluoromethyl; $X^5$ and $X^6$ are independently a single bond or —O—; and m and n are independently an integer of 1 to 10.

The examples of preferred combinations in a case where the first component is at least one compound selected from the group of the compounds (1) to (4) and where the second component is at least one compound selected from the group of the compounds (M1) to (M4) are compositions (C1) to (C12) shown in the following Table 1. A content of the first component is approximately 1% to approximately 99% by weight, preferably approximately 5% to approximately 95% by weight, and a content of the second component is approximately 1% to approximately 99% by weight, preferably approximately 5% to approximately 95% by weight.

TABLE 1

Examples of Preferred Compositions

| Composition | Compound of 1st Component | Compound of 2nd Component |
|---|---|---|
| Composition C1 | (1) or (2) | (M1) |
| Composition C2 | (1) or (2) | (M2) |
| Composition C3 | (1) or (2) | (M1) or (M2) |
| Composition C4 | (1) or (2) | (M3) |
| Composition C5 | (1) or (2) | (M4) |
| Composition C6 | (1) or (2) | (M3) or (M4) |
| Composition C7 | (3) or (4) | (M1) |
| Composition C8 | (3) or (4) | (M2) |
| Composition C9 | (3) or (4) | (M1) or (M2) |
| Composition C10 | (3) or (4) | (M3) |
| Composition C11 | (3) or (4) | (M4) |
| Composition C12 | (3) or (4) | (M3) or (M4) |

The preferred compositions (C1) to (C12) have the following characteristics:

1. A polymer is readily obtained by irradiating the composition with a UV ray under the presence of a suitable cationic photopolymerization catalyst.
2. The photopolymerization proceeds not only under the atmosphere of nitrogen but also in the air.
3. When a polymer (film) is formed from the composition, curing shrinkage is small.

The particularly preferred examples of the compositions (C1) to (C12) are the compositions (C4), (C5), (C6), (C7), (C8) and (C9). These compositions have the following characteristics:

1. The polymerization is fast, and a film having a high molecular weight is obtained for short time.
2. A film having an excellent dimensional stability is obtained.
3. A film having an excellent heat resistance is obtained.

The compositions A to D may further contain, if necessary, additives and may contain an organic solvent in order to dilute the compositions. Additives for controlling the characteristics of the polymer include, for example, surfactants, antioxidants, UV absorbers and fine particles. Additives for polymerizing the monomer include, for example, polymerization initiators and brightening agents. An amount of the additives is preferably such a small amount as an extent of achieving a purpose thereof.

A surfactant has the effects of making it easy to coat the composition on a supporting substrate and controlling alignment of the liquid crystal phase. Such surfactant includes, for example, quaternary ammonium salts, alkylamine oxide, polyamine derivatives, polyoxyethylene-polyoxypropylene condensation products, polyethylene glycol and esters thereof, sodium laurylsulfate, ammonium laurylsulfate, laurylsulfuric acid amines, alkyl-substituted aromatic sulfonates, alkylphosphates, perfluoroalkylsulfonates, perfluoroalkylcarboxylates, perfluoroalkyl ethylene oxide adducts and perfluoroalkyl trimethylammonium salts. An amount of the surfactant is varied depending on the kind of the surfactant and a composition ratio of the composition, and it falls in a range of approximately 100 ppm to approximately 5% by weigh, preferably approximately 0.1 to approximately 1% by weigh based on the weight of the photopolymerizable liquid crystal composition.

The preferred antioxidant includes hydroquinone, 2,6-di-t-butyl-p-cresol, 2,6-di-t-butyl-p-phenol, triphenyl phosphite and trialkyl phosphite, and preferred commercial products include "Irganox 245" and "Irganox 1035" manufactured by Ciba Specialty Chemicals Co., Ltd.

The preferred UV absorbers include "Tinuvin PS," "Tinuvin 213," "Tinuvin 109," "Tinuvin 328," "Tinuvin 384-2" and "Tinuvin 327" manufactured by Ciba Specialty Chemicals Co., Ltd.

Fine particles may be added in order to control the optical anisotropy and raise a strength of the polymer. The preferred materials of the fine particles are inorganic substances, organic substances and metals.

The preferred inorganic substances include ceramics, fluorophlogopite, tetrasilicon fluoride mica, teniolite, vermiculite fluoride, hectorite fluoride, hectorite, saponite, stevensite, montmorillonite, beidellite, kaolinite, flipontite, $ZnO$, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$ and $Zr(OH)_4$. Fine particles of needle crystal of calcium carbonate have an optical anisotropy and therefore can control an optical anisotropy of the polymer.

The preferred organic substances include carbon nanotubes, fullerene, dendrimer, polyvinyl alcohol, polymethacrylate and polyimide.

A particle diameter of the fine particles described above is approximately 0.001 μm to approximately 0.1 μm, preferably approximately 0.001 μm to approximately 0.05 μm. Although depending on the material, the small particle diameter and the sharp distribution of the particle diameter are preferred, in order to prevent coagulation phenomenon.

The preferred addition amount is approximately 0.1% to approximately 30% by weight. The smaller proportion is preferred as long as the purpose of addition is achieved.

The preferred polymerization initiator is an initiator for cationic photopolymerization. This initiator is particularly suited to the compositions (C1) to (C12) described above. The preferred initiators are diaryliodonium salts (hereinafter abbreviated as "DAS") and triarylphosphonium salts (hereinafter abbreviated as "TAS").

DAS includes, for example, diphenyliodonium tetrafluoroborate, diphenyliodonium hexafluorophosphonate, diphenyliodonium hexafluoroarsenate, diphenyliodonium tetra(p-entafluorophenyl)borate, 4-methoxyphenylphenyliodoniumtetra fluoroborate, 4-methoxyphenylphenyliodonium hexafluorophosphonate, 4-methoxyphenyl phenyliodonium hexafluoroarsenate, bis (4-tert-butylphenyl)iodonium diphenyl iodonium tetrafluoroborate, bis(4-tert-butylphenyl)iodoniumdiphenyliodoniumhexa fluoroacetate and bis(4-tert-butylphenyl) iodoniumdiphenyliodonium trifluoromethanesulfonate.

DAS is preferably combined with a photosensitizer. Such photosensitizer includes, for example, thioxanthone, phenothiazine, chlorothioxanthone, xanthine, anthracene, diphenylanthracene and rubrene.

TAS includes, for example, triphenylsulfonium hexafluorophosphonate, triphenylsulfonium hexafluoroarsenate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenyl sulfoniumtriphenylsulfonium tetra(pentafluorophenyl)borate, 4-phenylthiophenyldiphenyl sulfonium tetrafluoroborate, 4-phenylthiophenyldiphenylsulfonium hexafluorophosphonate and 4-phenylthiophenyldiphenylsulfonium hexafluoroarsenate.

Commercially available initiators used for cationic photopolymerization include, for example, "DTS-102" manufactured by Midori Kagaku Co., Ltd., "Cylacure UVI-6990," "Cylacure UVI-6974" and "Cylacure UVI-6992" manufactured by UCC Co., Ltd., "Adekaoptomer SP-150, SP-152, SP-170, SP-172" manufactured by Asahi Denka Co., Ltd., "PHOTOINITIATOR 2074" manufactured by Rhodia Co., Ltd., "Irgacure 250" manufactured by Ciba Specialty Chemicals Co., Ltd. and "UV-9380C" manufactured by GE Silicons Co., Ltd.

The solvent includes, for example, benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, tetrachloroethylene, trichloroethylene, chlorobenzene, t-butyl alcohol, diacetone alcohol, glycerin, monoacetin, ethylene glycol, triethylene glycol, hexylene glycol, ethylene glycol monomethyl ether, ethyl cellosolve, butyl cellosolve and mixtures thereof. The solvents described above may be used alone or in a mixture of two or more kinds thereof.

Next, the polymer of the invention shall be explained.

The polymer of the invention is obtained by polymerizing the composition containing at least one of the compounds (1) to (4) each having a polymerizable group. The polymer obtained has an optical anisotropy. The kinds of the polymerization reaction are radical polymerization, anion polymerization, cation polymerization, coordination polymerization and living polymerization. Considering the property of the polymerizable group, the cation polymerization is preferred, and in order to obtain the polymer which is excellent in alignment, the cation polymerization carried out by irradiation with light is further preferred. The reason therefor is that it is easy to carry out the polymerization under the condition that the composition has a liquid crystal phase.

The kinds of the preferred light are UV rays, visible rays and infrared rays, and electromagnetic waves such as electron beams and X rays may be used. Usually, UV rays or visible rays are used. The wavelength falls in a range of 150 nm to 500 nm, preferably 250 nm to 450 nm and particularly preferably 300 nm to 400 nm. Capable of being used as the light source are a low pressure mercury lamp (a bactericidal lamp, a fluorescent chemical lamp and a black light), a high pressure discharge lamp (a high pressure mercury lamp and a metal halide lamp) and a short arc discharge lamp (a ultrahigh pressure mercury lamp, a xenon lamp and a mercury xenon lamp), and the ultrahigh pressure mercury lamp is preferred.

The composition may be irradiated with light coming from the light source as it is or may be irradiated with a specific wavelength (or a specific wavelength region) selected through a filter. The irradiation energy density falls in a range of approximately 2 mJ/cm$^2$ to approximately 5000 mJ/cm$^2$, preferably approximately 10 mJ/cm$^2$ to approximately 3000 mJ/cm$^2$ and particularly preferably approximately 100 mJ/cm$^2$ to approximately 2000 mJ/cm$^2$. The illuminance falls in a range of approximately 0.1 mW/cm$^2$ to approximately 5000 mW/cm$^2$, preferably approximately 1 mW/cm$^2$ to approximately 2000 mW/cm$^2$.

Temperature in irradiating with light is set up so that the composition is provided with a liquid crystal phase, and it is preferably approximately 100° C. or lower. If it exceeds 100° C., polymerization is likely to be caused by heat, and the good alignment is not obtained in a certain case.

A homopolymer is obtained by polymerizing the composition A. This homopolymer comprises one structural unit. A copolymer is obtained by polymerizing the composition B or the composition C. This copolymer has at least two structural units. The configuration of the structural units in the copolymer may be any of random, block and alternation. A polymer containing unevenly a non-polymerizable compound and having at least one structural unit is obtained by polymerizing the composition D.

The above homopolymer and copolymer have a three-dimensional cross-linking structure, and therefore it is not dissolved in solvents and not molten, so that a molecular weight thereof can not be measured. The preferred second component in the copolymerization is the compound (M3) or (M4) when the first component is the compound (1) or (2), and it is the compound (M1) or (M2) when the first component is the compound (3) or (4).

The form of the polymer is a film and a plate. Also, the polymer may be molded. In general, a supporting substrate is used in order to obtain a filmy polymer. A film having an optical anisotropy is obtained by coating the composition on a supporting substrate and polymerizing a paint film having a liquid crystal phase. A preferred thickness of the polymer is varied depending on a value of an optical anisotropy of the polymer and uses thereof, and therefore a range thereof can not strictly be decided. The thickness falls in a range of, for example, approximately 0.05 μm to approximately 50 μm, preferably approximately 0.1 μm to approximately 20 μm and more preferably approximately 0.5 μm to approximately 10 μm. The above filmy polymer has a haze value (cloudiness) of usually approximately 1.5% or less and a transmission of usually approximately 80% or more in a visible ray region. Accordingly, the filmy polymer described above is suited as an optically anisotropic thin film used for liquid crystal display devices.

A monoaxially oriented film and a biaxially oriented film can be used as the supporting substrate. The material of the supporting substrate includes, for example, triacetyl cellulose, polyvinyl alcohol, polyimide, polyester, polyallylate, polyetherimide, polyethylene terephthalate and polyethylene naphthalate. The commercial products include, for example, "Arton" manufactured by JSR Corporation, "Zeonex" and "Zeonor" manufactured by Zeon Corporation and "Apel" manufactured by Mitsui Chemicals Inc. The preferred supporting substrate is a triacetyl cellulose (TAC) film or Zeonor. A TAC film may be used as it is without subjecting to pretreatment and may be subjected, if necessary, to surface treatment such as saponification treatment, corona discharge treatment and ozone oxidation treatment. Zeonor may be used as it is without subjecting to pretreatment and may be subjected, if necessary, to hydrophilicity treatment such as corona discharge treatment and ozone oxidation treatment. Allowed to be used as the supporting substrate other than those described above are, for example, supporting substrates made of metals such as aluminum, iron, copper and the like and supporting substrates made of glasses such as alkali glass, boro-silicate glass, flint glass and the like.

A paint film may be formed by coating the composition of the invention as it is on the supporting substrate or may be formed by coating the composition dissolved in a suitable solvent and then removing the solvent. The coating method includes, for example, spin coating, roll coating, curtain coating, flow coating, printing, microgravure coating, gravure coating, wire bar coating, dip coating, spray coating, meniscus coating and a flow casting film-forming method.

Factors for determining the alignment of the liquid crystal composition depend on (1) the chemical structure of the polymerizable compound, (2) the kind of the supporting substrate and (3) a method for aligning treatment. The factor (1) depends on the kinds of a side chain, a ring, a bonding group and a polymerizable group of the polymerizable compound. The factor (2) depends on the material of the supporting substrate such as a polymer, glass and metal. The method for aligning treatment in the factor (3) includes, for example, a method of rubbing along one direction with a rayon cloth and the like, a method of obliquely depositing silicon oxide and a method of carrying out etching processing in a slit form. The rubbing treatment may be carried out by rubbing directly the supporting substrate or by coating the supporting substrate with a thin film of polyimide, polyvinyl alcohol or the like and then rubbing this thin film. Also, known as well is a specific thin film which provides good alignment without carrying out the above rubbing treatment.

The classification of alignment in the liquid crystal compound includes homogeneous (parallel), homeotropic (vertical), hybrid, tilt and twist. The homogeneous alignment means the state that an aligning vector is parallel to a substrate and stays in one direction. The homeotropic alignment means the state that an aligning vector is vertical to a substrate. The hybrid alignment means the state that an aligning vector stands up vertically from a parallel state as the aligning vector separates from a substrate. The tilt alignment means the state that an aligning vector stands up in a fixed gradient angle to a substrate. These alignments are observed in compositions having a nematic phase. On the other hand, the twist alignment is observed in compositions having a chiral nematic phase and a cholesteric phase. The twist alignment means the state that an aligning vector is parallel to a substrate but gradually twisted as the aligning vector separates from the substrate. This twist is produced by virtue of the action of an optically active group.

Next, the uses of the polymer of the invention shall be explained.

The polymer of the invention can be used in the form of a molded article having an optical anisotropy. Such molded article can be utilized for various devices such as liquid crystal display devices, optical devices and the like, and it can be used as an optical film in, for example, retardation plates (½ wavelength plates, ¼ wavelength plates and the like), reflection reducing films, selective reflection films, viewing angle compensation films and the like. The polymers having homogeneous, hybrid and homeotropic alignments can be used for retardation plates, polarizing devices, liquid crystal alignment films, reflection reducing films, selective reflection films and viewing angle compensation films. The polymers having twist alignment can be used for retardation plates, polarizing devices, selective reflection films and viewing angle compensation films. As described above, the polymer of the invention can be used for retardation plates and viewing angle compensation films in liquid crystal displays for the purpose of optical compensation. Further, the polymer of the invention can be used as well for high temperature conductive epoxy resins, adhesives, synthetic high polymers having a mechanical anisotropy, cosmetics, ornaments, non-linear optical materials, information storage materials and the like.

A retardation plate has a function to convert a polarization state, and, for example, a ½ wavelength functional plate has a function to rotate a vibrating direction of linearly polarized light by 90 degrees. In order to obtain such ½ wavelength functional plate, the composition is first coated on a supporting plate so that an equation of $d=\lambda(2\times\Delta n)$ is satisfied, wherein d is a thickness of the composition; $\lambda$ is a wavelength; and $\Delta n$ is an optical anisotropy. Next, the composition coated in the manner described above is aligned and then photopolymerized, whereby a ½ wavelength functional plate is obtained. On the other hand, a ¼ wavelength functional plate has a function to convert linearly polarized light to circularly polarized light or convert circularly polarized light to linearly polarized light. In order to obtain the above ¼ wavelength functional plate, a paint film of the composition may be prepared so that a condition of $d=\lambda(4\times\Delta n)$ is satisfied.

A thickness (d) of the polymer is controlled in the following manner. In a method in which the composition is diluted with the solvent and then coated on the supporting substrate, a paint film having the intended thickness can be obtained by suitably selecting a concentration of the composition, a coating method and coating conditions. A method using a liquid crystal cell is preferred as well. A liquid crystal cell has an aligning membrane of polyimide or the like and therefore is convenient. When the composition is injected into a liquid crystal cell, a thickness of the paint film can be controlled by a space between the liquid crystal cells.

The polymer having a twist alignment is useful for a retardation plate. When a pitch of the spiral is 1/n (n is an average refractive index of the polymer) of a wavelength, light of this wavelength is reflected according to a Bragg's law and converted to circularly polarized light. A direction of the circularly polarized light depends on a direction of the spirals, that is, a steric configuration of the optically active compound. The direction of the circularly polarized light can be determined by suitably selecting the steric configuration of the optically active compound. Such polymer is useful for a circularly polarized light-separating function device.

The polymer of the invention is useful as well for a luminance-improving film. According to a method disclosed in, for example, Japanese Patent Application Laid-Open No. 281814/1994, a polymer in which a spiral pitch is continuously extended to a thickness direction is obtained. Such polymer can reflect light of a broad wavelength region according to the pitch. It can selectively reflect, for example, light of a region falling in a wavelength of approximately 100 nm to approximately 350 nm (or a wavelength of approximately 350 nm to approximately 750 Nm). It will be apparent to those skilled in the art that various modifications and variations can be made in the present invention and specific examples provided herein without departing from the spirit or scope of the invention. Thus, it is intended that the present invention covers the modifications and variations of this invention that come within the scope of any claims and their equivalents.

EXAMPLES

The invention shall specifically be explained below with reference to examples, but the invention shall not be restricted to these examples. Thus, the following examples are for illustrative purposes only and are not intended, nor should they be interpreted to, limit the scope of the invention.

The physical properties were measured by the following measuring methods:

Compound Structure: The structures of the compounds synthesized were confirmed by measuring proton ($^1$H) NMR of 90 MHz.

Phase Transition Temperature: The sample was put on a hot plate of a melting point measuring apparatus equipped with a polarization microscope, and it was heated at a rate of 1° C./minute to measure temperature at which the liquid crystal phase was transited. "C" means crystal; "N" means a nematic phase; and "I" means an isotropic liquid. An "NI" point is an upper limit temperature of the nematic phase or a transition temperature from the nematic phase to the isotropic liquid. For example, "C50N631" shows that transition from crystal ("C") to the nematic phase ("N") is caused at 50° C. and that transition from the nematic phase ("N") to the isotropic liquid ("I") is caused at 63° C.

Sellotape® Peeling Test: Measured according to a test method of JIS Standard (i.e., JIS-K-5400, 8.5, adhesive property (8.5.2, cross-cut tape method)). That is, the result was evaluated by the number of cross-cuts which were not peeled out of 100 cross-cuts.

Pencil Hardness: Measured according to a method of JIS Standard (i.e., JIS-K-5400, 8.4, pencil scratch test). The result was shown by a hardness of a lead of a pencil.

Heat Resistance Test: A heat resistance test was carried out on the condition of 100° C. and 500 hours, and the result thereof was evaluated by a variation in retardation. To be specific, polyamic acid ("PIA5310" manufactured by Chisso Corporation) was first coated on a glass substrate and heated at 210° C. for 30 minutes to obtain a supporting substrate. The surface of polyimide produced by heating was rubbed with a rayon cloth. The composition of the sample was diluted with a mixed solvent (2:1 in terms of a weight ratio) of toluene and cyclopentanone to prepare a solution of 30% by weight. This solution was coated on the supporting substrate by means of a spin coater and heated at 70° C. for 30 minutes, and then a paint film formed was irradiated with a UV ray at 60° C. for 10 seconds by means of a ultrahigh pressure mercury lamp (250 W/cm). A retardation of the polymer thus obtained was measured at 25° C. Next, the polymer was heated at 100° C. for 500 hours, and then the retardation was measured again at 25° C. The values before and after heated were compared to evaluate the heat resistance. The retardation was measured at a wavelength of 550 nm by means of a Senarmont compensator according to a method described in Awaya, H., INTRODUCTION FOR POLARIZA- TION MICROSCOPE OF HIGH MOLECULAR MATERIAL, published by Agune Technical Center (2001), p. 94.

Optical Anisotropy (Δn): The value of a retardation (25° C.) of the polymer was measured according to a method of the heat resistance test, and a thickness (d) of the polymer was further measured. The value of the optical anisotropy was calculated from the relation of: Retardation=Δn×d.

Aligning State: Observed under a polarization microscope. A polymer was prepared on a TAC film (supporting substrate) subjected to saponification treatment. This sample was interposed between two polarizing plates disposed in cross nicols. The kinds of the alignment were judged from an angle dependency of the transmitted light intensity.

Example 1

First stage: (1) Octyloxybenzoic acid chloride 100 g was dropwise added to a solution prepared by dissolving 27 g of 2,5-dihydroxybenzoquinone and 31.6 g of pyridine in 500 mL of tetrahydrofuran. After stirring the solution at room temperature for 5 hours, the reaction solution was poured into 1 L of water, whereby a slurry was obtained. The slurry was filtered to recover a solid matter, and this was dried and then recrystallized from acetone to thereby obtain 100 g of a compound [H1] represented by the following Formula [H1]:

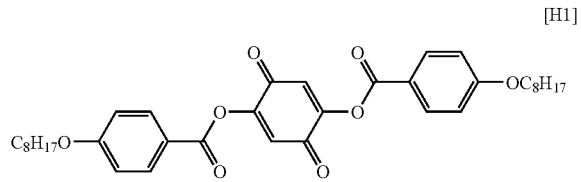

[H1]

(2) Trans-4-hexylcyclohexylcarboxylic acid chloride 150 g was dropwise added to a solution prepared by dissolving 48 g of 2,5-dihydroxybenzoquinone and 53 g of pyridine in 800 mL of tetrahydrofuran. After stirring the solution at room temperature for 5 hours, the reaction solution was poured into 1 L of water, whereby a slurry was obtained. The slurry was filtered to recover a solid matter, and this was dried and then recrystallized from acetone to thereby obtain 140 g of a compound [H2] represented by the following Formula [H2]. The compound [H2] had a phase transition temperature of C161N159I.

[H2]

(3) A solution prepared by dissolving I 0 g of octyloxybenzoyloxybenzoic acid chloride in 50 mL of tetrahydrofuran was dropwise added to a solution prepared by dissolving 1.93 g of 2,5-dihydroxybenzoquinone and 2 g of pyridine in 150 mL of tetrahydrofuran. After stirring the solution at room temperature for 5 hours, the reaction solution was poured into 1 L of water, whereby a slurry was obtained. The slurry was filtered to recover a solid matter, and this was dried and then recrystallized from acetone to thereby obtain 7 g of a compound [H3] represented by the following Formula [H3]. The compound [H3] had a phase transition temperature of C174N260 or more I.

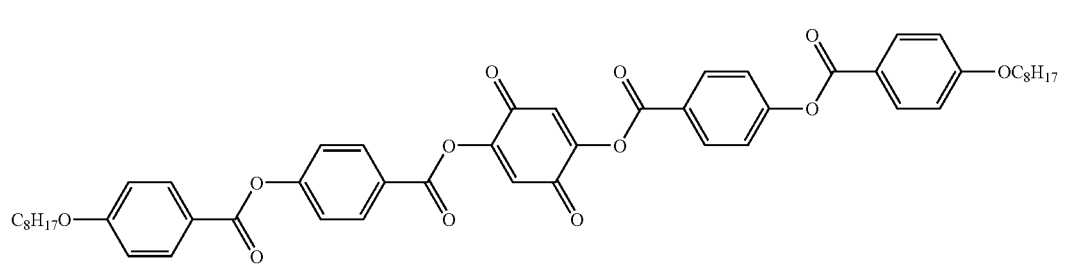
[H3]

Second stage: (1) A solution was prepared by dissolving 100 g of sodium dithionite and 100 g of ammonium chloride in 500 mL of water. This solution was dropwise added in 30 minutes to a solution prepared by adding 500 mL of dioxane to 50 g of the compound [H1], and then the mixture was stirred for 4 hours. The reaction solution was transferred into a separating funnel to separate an organic layer, and the solvent was distilled off, whereby a white crystal was obtained. It was recrystallized from chloroform, whereby 68 g of a compound [DH1] represented by the following Formula [DH1] was obtained. The compound [DH1] had a melting point of 184 to 185° C.

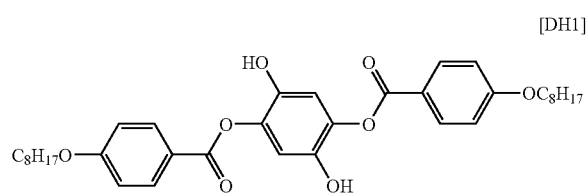
[DH1]

(2) A solution was prepared by dissolving 30 g of sodium dithionite and 30 g of ammonium chloride in 300 mL of water. This solution was dropwise added in 30 minutes to a solution prepared by adding 300 mL of tetrahydrofuran to 20 g of the compound [H2], and then the mixture was stirred for 2 hours. The reaction solution was transferred into a separating funnel to separate an organic layer, and the solvent was distilled off, whereby a white crystal was obtained. It was recrystallized from chloroform, whereby 17 g of a compound [DH2] represented by the following Formula [DH2] was obtained. The compound [DH2] had a melting point of 200 to 203° C.

[DH2]

(3) A solution was prepared by dissolving 55 g of sodium dithionite and 55 g of ammonium chloride in 500 mL of water. This solution was dropwise added in 30 minutes to a solution prepared by adding 500 mL of tetrahydrofuran to 7 g of the compound [H3], and then the mixture was stirred for 2 hours. The reaction solution was transferred into a separating funnel to separate an organic layer, and the solvent was distilled off, whereby a white crystal was obtained. This was washed with chloroform, whereby 7 g of a compound [DH3] represented by the following Formula [DH3] was obtained. The compound [DH3] had a phase transition temperature of C230N250I.

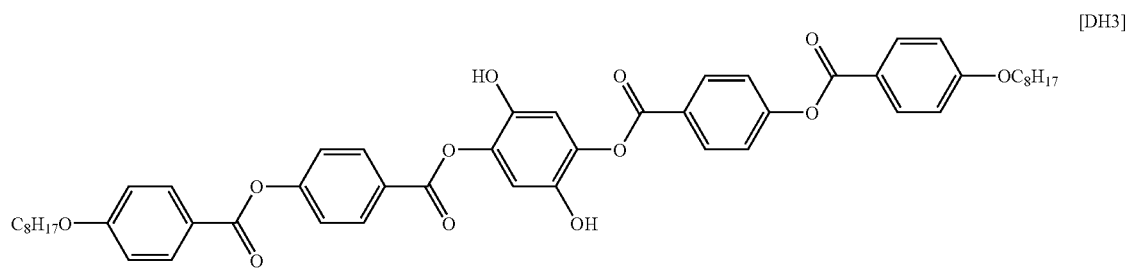
[DH3]

Third stage: (1) 4-(4-Allyloxybutyloxy)benzoic acid chloride 3 g was added to a solution comprising 3.6 g of the compound [DH1], 10 mL of pyridine and 10 mL of tetrahydrofuran, and the mixture was refluxed for 5 hours. Fifty mL of 5% hydrochloric acid was added to the reaction mixture, and the mixture was extracted with ethyl acetate. The extract was washed with 5% hydrochloric acid until the pH became acidic, and then it was washed with a saturated sodium hydrogencarbonate aqueous solution and dried on anhydrous magnesium sulfate. A residue obtained by distilling off the solvent was refined by means of silica gel chromatography (effluent solvent: toluene/ethyl acetate=9/1) to obtain 4.56 g of a compound [J1] represented by the following Formula [J1]. The compound [J1] had a melting point of 97 to 98° C.

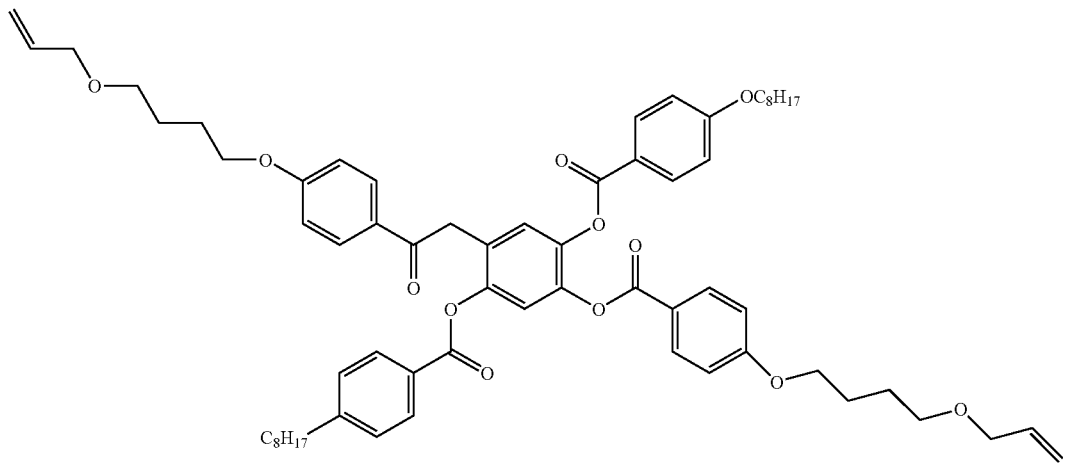

[J1]

(2) 4-(4-Allyloxybutyloxy)benzoic acid chloride 3 g was added to a solution comprising 3.1 g of the compound [DH2], 10 mL of pyridine and 30 mL of tetrahydrofuran, and the mixture was refluxed for 5 hours. Fifty mL of 5% hydrochloric acid was added to the reaction mixture, and the mixture was extracted with ethyl acetate. The extract was washed with 5% hydrochloric acid until the pH became acidic, and then it was washed with a saturated sodium hydrogencarbonate aqueous solution and dried on anhydrous magnesium sulfate. A residue obtained by distilling off the solvent was refined by means of silica gel chromatography (effluent solvent: toluene/ethyl acetate=95/5) to obtain 4.52 g of a compound [J2] represented by the following Formula [J2]. The compound [J2] had a melting point of 105 to 108° C.

(3) 4-(4-Allyloxybutyloxy)benzoic acid chloride 3 g was added to a solution comprising 5 g of the compound [DH3], 20 mL of pyridine and 100 mL of tetrahydrofuran, and the mixture was refluxed for 5 hours. Fifty mL of 5% hydrochloric acid was added to the reaction mixture, and the mixture was extracted with ethyl acetate. The extract was washed with 5% hydrochloric acid until the pH became acid, and then it was washed with a saturated sodium hydrogencarbonate aqueous solution and dried on anhydrous magnesium sulfate. A residue obtained by distilling off the solvent was refined by means of silica gel chromatography (effluent solvent: toluene/ethyl acetate=9/1) to obtain 4.37 g of a compound [J3] represented by the following Formula [J3]. The compound [J3] had a phase transition temperature of C125N224I.

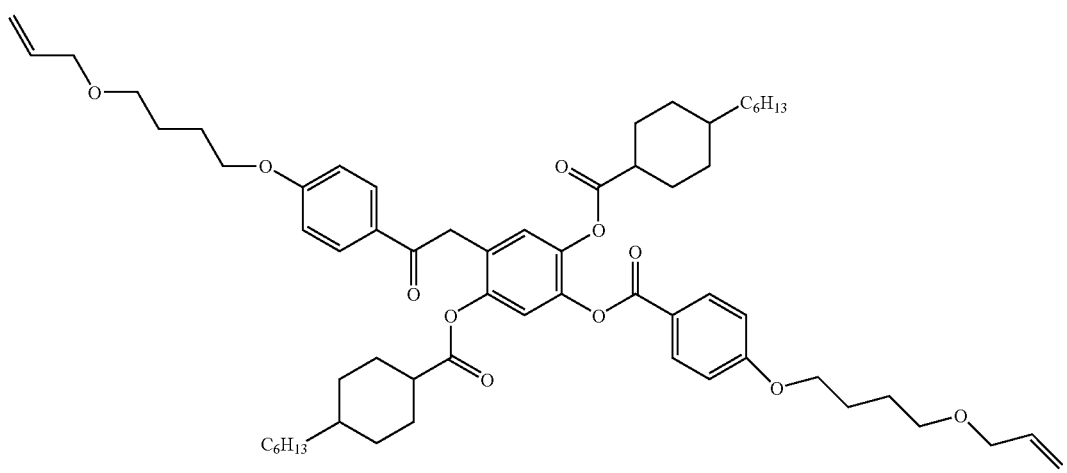

[J2]

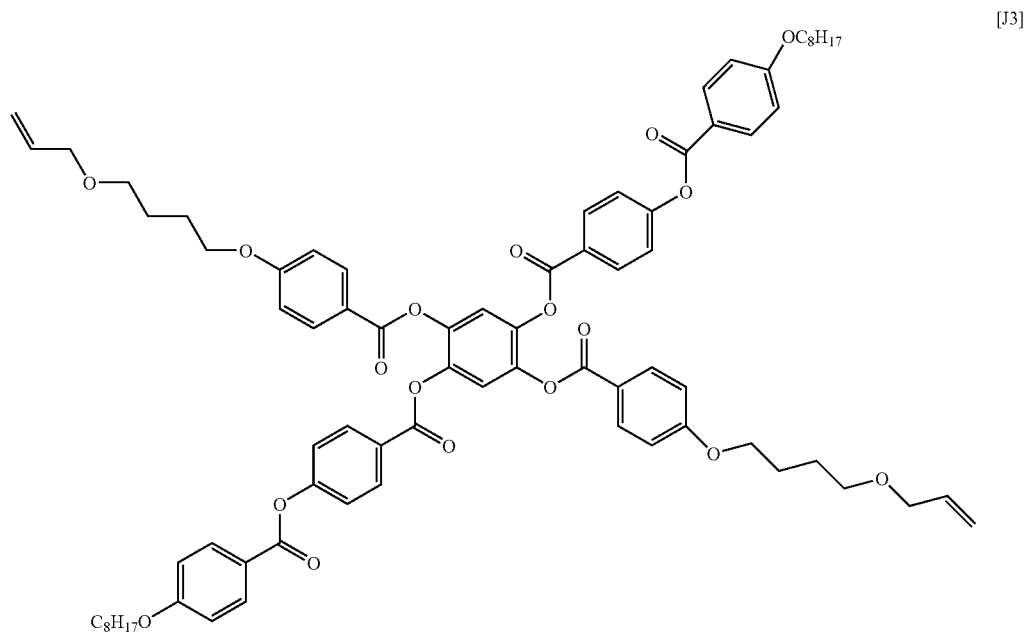

[J3]

Fourth stage: (1) m-Chlorobenzoic acid 3 g was added to a solution prepared by dissolving 4.56 g of the compound [J1] in 100 mL of methylene chloride, and the mixture was stirred at room temperature for a day. The reaction mixture was washed in order of a 5% sodium hydroxide aqueous solution, a sodium hydrogensulfite aqueous solution and a sodium hydrogencarbonate aqueous solution, and then it was dried on anhydrous magnesium sulfate. A residue obtained by distilling off the solvent was refined by means of silica gel chromatography and recrystallized from ethanol to thereby obtain 3 g of a compound (No. 3) represented by the following formula. The compound (No. 3) had a melting point of 110 to 111° C.

The NMR measuring data of the compound (No. 3) is as follows: $^1$H-NMR (CDCl$_3$): δ (Ppm); 0.91 (t, 6H), 1.10 to 2.10 (m, 32H), 2.50 to 2.70 (m, 2H), 2.72 to 2.90 (m, 2H), 3.10 to 4.20 (m, 28H), 6.84 (d, 8H), 7.49 (s, 2H), 8.01 (d, 8H)

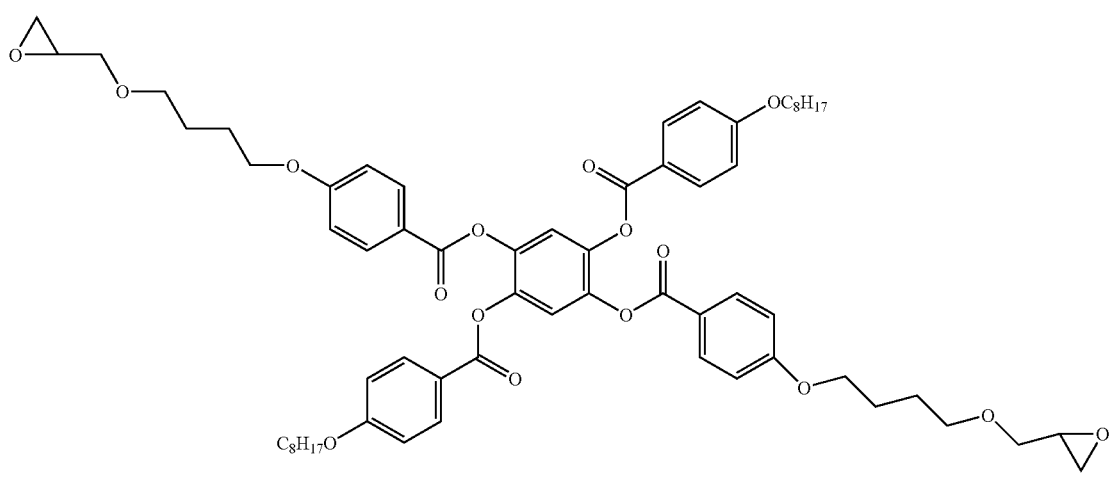

No. 3

(2) m-Chlorobenzoic acid 3 g was added to a solution prepared by dissolving 4.52 g of the compound [J2] in 100 mL of methylene chloride, and the mixture was stirred at room temperature for a day. The reaction mixture was washed in order of a 5% sodium hydroxide aqueous solution, a sodium hydrogensulfite aqueous solution and a sodium hydrogencarbonate aqueous solution, and then it was dried on anhydrous magnesium sulfate. A residue obtained by distilling off the solvent was refined by means of silica gel chromatography and recrystallized from ethanol to thereby obtain 2.4 g of a compound (No. 4) represented by the following formula. The compound (No. 4) had a melting point of 103 to 104° C.

The NMR measuring data of the compound (No. 4) is as follows:. $^1$H-NMR (CDCl$_3$): δ (Ppm); 0.91 (t, 6H), 1.10 to 2.10 (m), 2.50 to 2.70 (m), 2.72 to 2.90 (m, 2H), 3.10 to 4.20 (m, 28H), 6.95 (d, 8H), 7.26 (s, 2H), 8.08 (d, 4H).

mixed solvent of ethanol and ethyl acetate to thereby obtain 3.8 g of a compound (No. 5) represented by the following formula. The compound (No. 5) had a phase transition temperature of C121N221I.

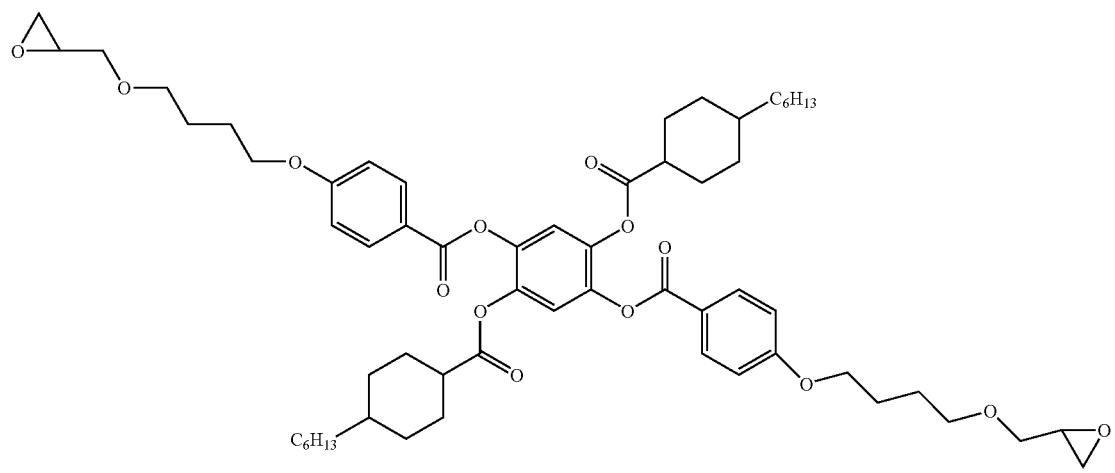

No. 4

(3) m-Chlorobenzoic acid 2 g was added to a solution prepared by dissolving 4.27 g of the compound [J3] in 100 mL of methylene chloride, and the mixture was stirred at room temperature for a day. The reaction mixture was washed in order of a 5% sodium hydroxide aqueous solution, a sodium hydrogensulfite aqueous solution and a sodium hydrogencarbonate aqueous solution, and then it was dried on anhydrous magnesium sulfate. A residue obtained by distilling off the solvent was refined by means of silica gel chromatography and recrystallized from a The NMR measuring data of the compound (No. 5) is as follows: $^1$H-NMR (CDCl$_3$): δ (ppm); 0.87 (t, 6H), 1.10 to 2.10 (m, 32H), 2.50 to 2.70 (m, 2H), 2.72 to 2.90 (m, 2H), 3.10 to 4.20 (m, 28H), 6.81 to 7.02 (m, 8H), 7.21 to 7.30 (m, 4H), 7.54 (s, 2H), 7.97 to 8.20 (m, 12H).

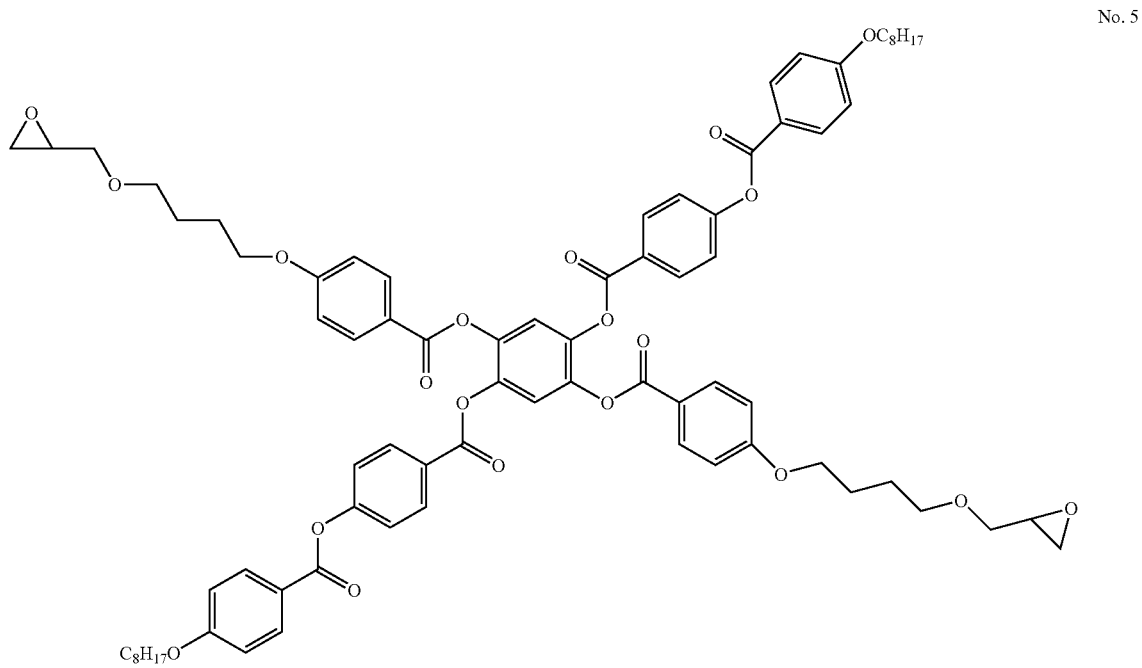

No. 5

Example 2

First stage: A solution prepared by dissolving 500 g of 3-[(6-bromohexyloxy)methyl]-3-ethyloxetane, 297 g of 4-hydoxybenzoic acid and 490 g of potassium carbonate in 3 L of dimethylforamide was stirred at 90° C. for 8 hours. After adding 4 L of water to the reaction mixture, it was extracted with 4 L of toluene. The organic layer was washed with water, and then the solvent was distilled off. Added to the resulting residue were 200 g of sodium hydroxide, 1 L of water and 2.5 L of ethanol, and the mixture was refluxed for 4 hours. Ethanol 1 L was distilled off at an atmospheric pressure, and then the solution was acidified by hydrochloric acid to obtain a slurry. The slurry was filtered and dried to thereby obtain 400 g of 4-[6-(3-ethyloxetane-3-ylmethoxy)hexyloxy]benzoic acid (melting point: 58.5° C.).

Synthesized by the same method were 4-[6-(3-methyloxetane-3-ylmethoxy)hexyloxy]benzoic acid (melting point: 61° C.), 4-[4-(3-ethyloxetane-3-ylmethoxy)butyloxy]benzoic acid (melting point: 75.3 to 77.7° C.), 2-fluoro-4-[4-(3-ethyloxetane-3-ylmethoxy)butyloxy]benzoic acid (melting point: 75 to 80° C.) and 4-(3-ethyloxetane-3-ylmethoxy)benzoic acid (melting point: 127.5° C.).

Second stage: A solution prepared by dissolving 4.5 g of 4-[6-(3-methyloxetane-3-ylmethoxy)hexyloxy]benzoic acid and 4 g of the compound [DH2] in 100 mL of methylene chloride was cooled down to 5° C., and then 0.05 g of dimethylamino pyridine and 3 g of 1-ethyl-3-(3-dimethylaminopropyl)carbodiimide hydrochloride were added thereto and stirred at room temperature for 12 hours. Water (50 mL) was added to the reaction mixture to separate an organic layer, and it was dried on anhydrous magnesium sulfate. A residue obtained by distilling off the solvent was refined by means of silica gel chromatography and further recrystallized from ethanol to thereby obtain 3 g of a compound (No. 24) represented by the following formula. The compound (No. 24) had a melting point of 77° C.

Example 3

Tin 32.8 g was added to a solution prepared by dissolving 32.2 g of 2,5-dihydroxybenzene in 700 mL of hydrochloric acid (37% by weight), and the mixture was stirred at 50° C. for 2 hours and then refluxed for 15 minutes. This solution was cooled down to 0° C., and crystal was deposited. This crystal was filtered and dried, and then it was recrystallized from tetrahydrofuran to obtain 24.6 g of 1,2,4,5-tetrahydroxybenzene.

4-(4-Allyloxybutyloxy)benzoic acid chloride 9.8 g was added to a solution comprising 1.3 g of 1,2,4,5-tetrahydroxybenzene, 10 mL of pyridine and 100 mL of chloroform, and the mixture was refluxed for 5 hours. Fifty mL of 5% hydrochloric acid was added to the reaction mixture, and the mixture was extracted with ethyl acetate. The extract was washed with 5% hydrochloric acid until the pH became acid, and then it was washed with a saturated sodium hydrogencarbonate aqueous solution and dried on anhydrous magnesium sulfate. A residue obtained by distilling off the solvent was refined by means of silica gel chromatography (effluent solvent: toluene/ethyl acetate=9/1) to obtain 4 g of a compound [J4] represented by the following Formula [J4]. The compound [J4] had a melting point of 106 to 107° C.

The NMR measuring data of the compound [J4] is as follows: $^1$H-NMR (CDCl$_3$): δ (ppm); 1.50 to 2.10 (m, 16H), 3.50 (t, 8H), 3.90 to 4.15 (m, 16H), 5.12 to 5.36 (m, 8H), 5.72 to 6.18 (m, 4H), 6.84 (d, 8H), 7.49 (s, 2H), 8.01 (d, 8H).

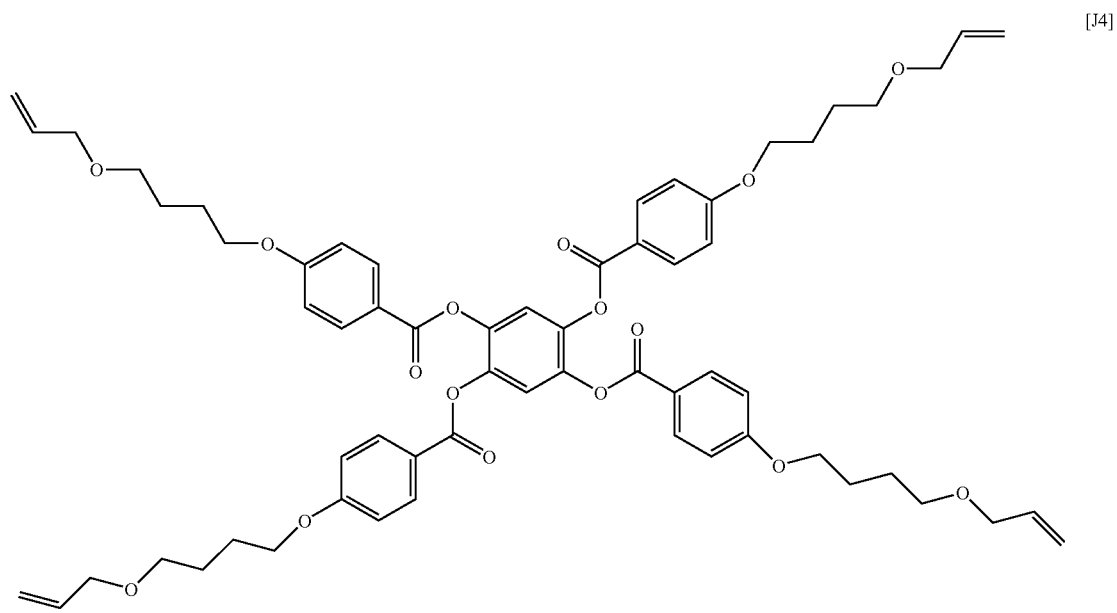

[J4]

Next, 8 g of m-chlorobenzoic acid was added to a solution prepared by dissolving 4 g of the compound [J4] in 80 mL of methylene chloride, and the mixture was stirred at room temperature for a day. The reaction mixture was washed in order of a 5% sodium hydroxide aqueous solution, a sodium hydrogensulfite aqueous solution and a sodium hydrogencarbonate aqueous solution, and then it was dried on anhydrous magnesium sulfate. A residue obtained by distilling off the solvent was refined by means of silica gel chromatography and recrystallized from ethyl acetate to thereby obtain 1.8 g of a compound (No. 13) represented by the following formula. The compound (No. 13) had a melting point of 129 to 130° C.

The NMR measuring data of the compound (No. 13) is as follows: $^1$H-NMR (CDCl$_3$): δ (ppm); 1.50 to 2.10 (m, 16H), 2.50 to 2.70 (m, 4H), 2.72 to 2.90 (m, 4H), 3.10 to 4.20 (m, 28H), 6.84 (d, 8H), 7.49 (s, 2H), 8.01 (d, 8H).

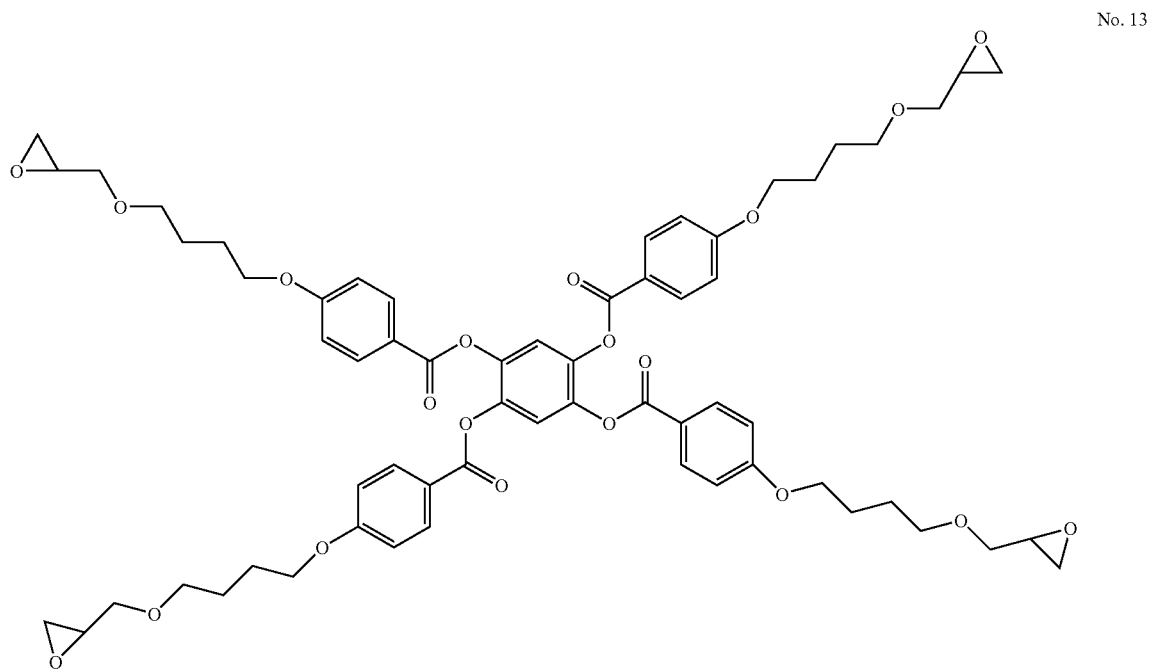

No. 13

Example 4

A composition (CL1) comprising 50% by weight of the compound (No. 3) and 50% by weight of a compound [K1] each shown below was prepared. This composition had a nematic phase at room temperature and an NI point of 135° C. The compound (No.3) had a good compatibility and did not cause phase separation. The composition (CL1) was coated on a TAC film subjected to rubbing treatment to find that it was aligned. The compound [K1] was synthesized according to a method described in a document (Macromolecules, 26, 1244 to 1247 (1993)).

Next, a solution comprising 1 g of the composition (CL1), 0.03 g of a polymerization initiator "DTS-102" manufactured by Midori Kagaku Co., Ltd. and 8 g of cyclopentanone was coated on a film obtained by subjecting a TAC film to saponification treatment and rubbing the surface thereof with a rayon cloth by means of a spin coater. After coating, the film was heated in an oven set at 60° C. for 5 minutes. The solvent was removed by this heat treatment, and the liquid crystal molecules were aligned. The film was irradiated with a UV ray at 60° C. for 10 seconds by means of a ultrahigh pressure mercury lamp (250 W/cm) to obtain a liquid crystal-aligned film (F1). Alignment of the composition was maintained as well by the polymerization. In a Sellotape® peeling test of the above film, no cross-cuts were peeled off.

Example 5

A composition (CL2) comprising 50% by weight of the compound (No. 3) and 50% by weight of a compound [K2] each shown below was prepared. This composition had a nematic phase at room temperature and an NI point of 170° C. The compound (No. 3) had a good compatibility and did not cause phase separation. The composition (CL2) was coated on a TAC film subjected to rubbing treatment to find that it was aligned. The compound [K2] was synthesized according to a method described in Japanese Patent Application Laid-Open No. 238491/2003.

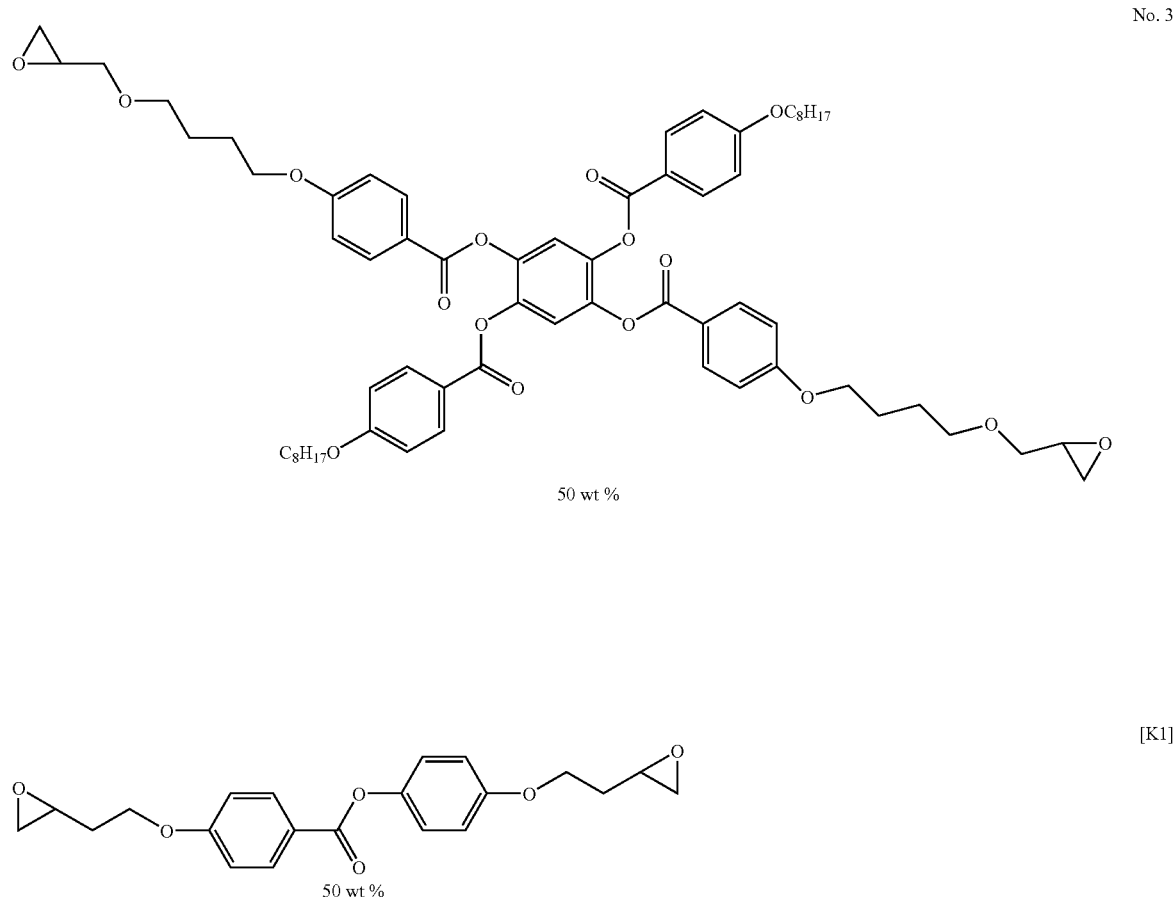

No. 3

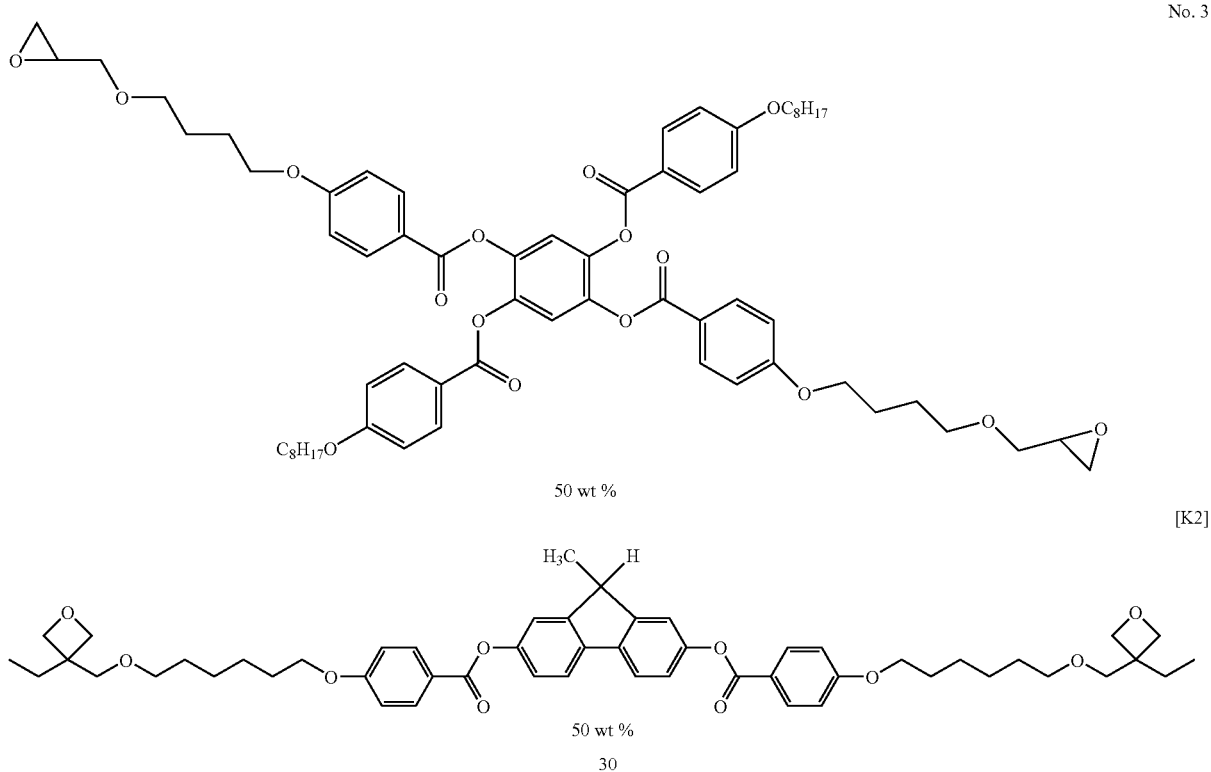

50 wt %

[K2]

50 wt %

30

Next, a solution comprising 1 g of the composition (CL2), 0.03 g of the polymerization initiator "DTS-102" manufactured by Midori Kagaku Co., Ltd. and 8 g of cyclopentanone was coated on a film obtained by subjecting a TAC film to saponification treatment and rubbing the surface thereof with a rayon cloth by means of a spin coater. After coating, the film was heated in an oven set at 60° C. for 5 minutes. The solvent was removed by this heat treatment, and the liquid crystal molecules were aligned. The film was irradiated with a UV ray at 60° C. for 10 seconds by means of a ultrahigh pressure mercury lamp (250 W/cm) to obtain a liquid crystal-aligned film (F2). Hybrid alignment of the composition was maintained as well by the polymerization. In a Sellotape® peeling test of the above film, no cross-cuts were peeled off.

The evaluation results of the films described above are shown in Table 2. It has been found from these results that the polymers of the invention are excellent in an adhesive property to the supporting substrate. That is, it has been confirmed that the compositions containing the compounds of the invention can be coated directly on a TAC film and polymerized and that the resulting polymers (films) are excellent in an adhesive property to the TAC film. Accordingly, a liquid crystal cell can be reduced in a thickness by using an optical film prepared by molding the polymer film of the invention on the TAC film for phase contrast plates and the like in liquid crystal display apparatuses.

TABLE 2

| Film No. | Sellotape ® Peeling Test |
|---|---|
| F1 | 100/100 |
| F2 | 100/100 |

What is claimed is:

1. A compound selected from the groups consisting of Formula (1), (2), (3) and (4):

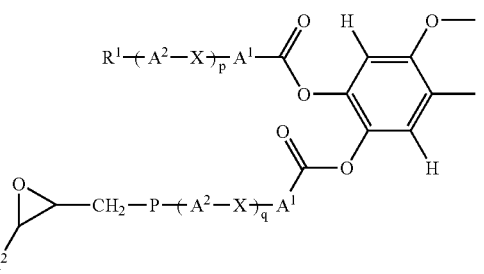

(1)

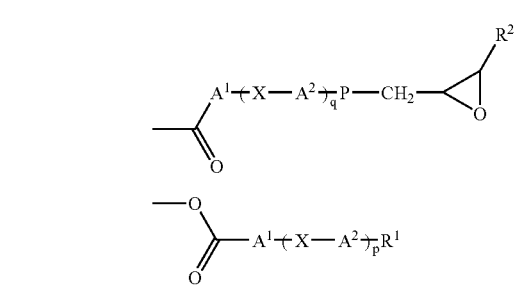

(2)

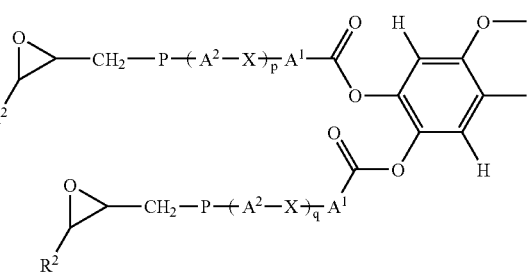

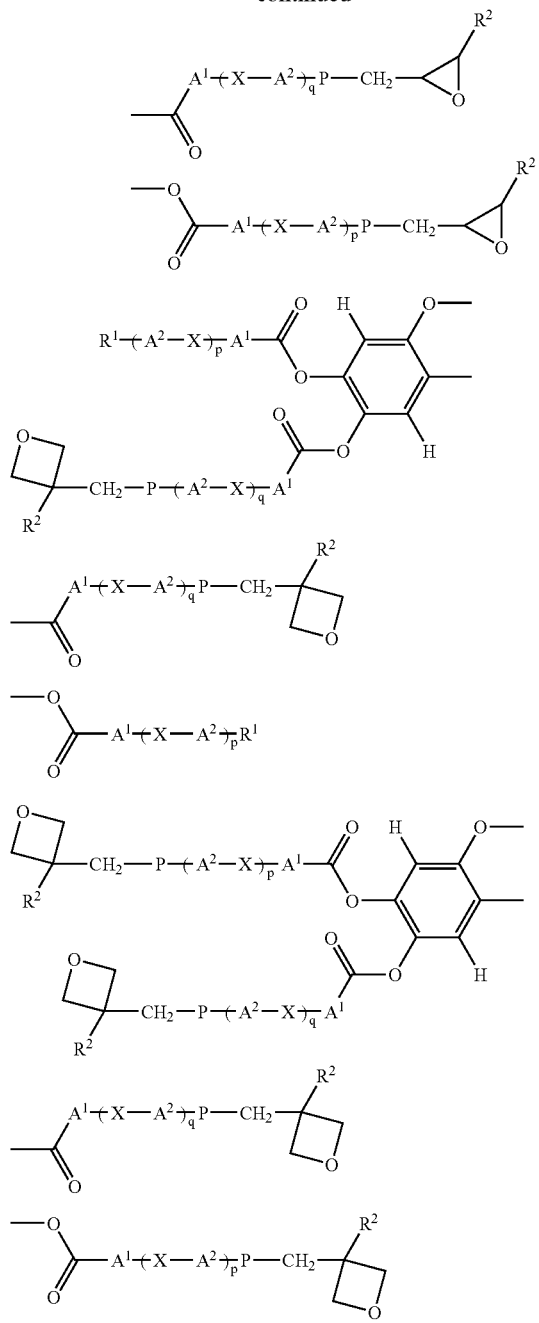

wherein in Formula (1), (2), (3) and (4), $R^1$ is a hydrogen atom, a fluorine atom, a chlorine atom, —CN, —NO$_2$ or an alkyl group having 1 to 20 carbon atoms; in the alkyl group, an optional hydrogen atom may be substituted with a fluorine atom or a chlorine atom, and optional one or two —CH$_2$— may be substituted with —O—, —S—, —COO—, —OCO—, —CO—, —CH=CH— or —C≡C—;

$R^2$ is a hydrogen atom or an alkyl group having 1 to 8 carbon atoms, and an optional hydrogen atom in the alkyl group may be substituted with a fluorine atom or a chlorine atom;

$A^1$ is independently a 1,4-cyclohexylene group, a 1,4-phenylene group, a 4,4'-biphenylene group, a 4,4'-terphenylene group, a pyridine-2,5-diyl group, a naphthalene-2,6-diyl group or a tetrahydronaphthalene-2,6-diyl group; in the 1,4-phenylene group, an optional hydrogen atom may be substituted with a fluorine atom or a chlorine atom, and optional one or two hydrogen atoms may be substituted with cyano, methyl, ethyl, methoxy, acetoxy, acetyl or trifluoromethyl;

$A^2$ is independently a 1,4-cyclohexylene group, a 1,4-phenylene group, a 4,4'-biphenylene group, a 4,4'-terphenylene group, a pyridine-2,5-diyl group, a pyridazine-3,6-diyl group, a pyrimidine-2,5-diyl group, a fluorene-2,7-diyl group, a 9-methylfluorene-2,7-diyl group, a 9,9-dimethylfluorene-2,7-diyl group, a naphthalene-2,6-diyl group or a tetrahydronaphthalene-2,6-diyl group; in the 1,4-phenylene group, an optional hydrogen atom may be substituted with a fluorine atom or a chlorine atom, and optional one or two hydrogen atoms may be substituted with cyano, methyl, ethyl, methoxy, hydroxy, formyl, acetoxy, acetyl or trifluoromethyl;

X is independently a single bond, —(CH$_2$)$_2$—, —CH=CH—, —C≡C—, —CH$_2$O—, —OCH$_2$—, —CF$_2$O—, —OCF$_2$—, —COO—, —OCO—, —CONH—, —NHCO—, —(CH$_2$)$_4$—, —(CH$_2$)$_2$COO—, —OCO(CH$_2$)$_2$—, —CH=CH—COO— or —OCO—CH=CH—;

P is independently an alkylene group having 1 to 20 carbon atoms; in the alkylene group, an optional hydrogen atom may be substituted with a fluorine atom or a chlorine atom, optional —CH$_2$— may be substituted with —O—, optional one or two —CH$_2$— may be substituted with —COO— or —OCO—, and optional one —CH$_2$— may be substituted with —CH=CH— or —C≡C—; and p and q each are independently 0, 1 or 2.

2. The compound of claim 1, wherein in Formula (1), (2), (3) and (4), $R^1$ is a hydrogen atom, a fluorine atom, a chlorine atom, —CN, —NO$_2$, —OCF$_3$, —OCF$_2$H, —OCFH$_2$, —CF$_2$CF$_2$H, —CF$_2$CHFCF$_3$, an alkyl group having 1 to 15 carbon atoms, an alkoxy group having 1 to 15 carbon atoms or an alkoxyalkyl group having 2 to 15 carbon atoms;

$R^2$ is a hydrogen atom or an alkyl group having 1 to 5 carbon atoms;

$A^1$ is independently a 1,4-cyclohexylene group, a 1,4-phenylene group, a 4,4'-biphenylene group or a naphthalene-2,6-diyl group, and optional one or two hydrogen atoms in the 1,4-phenylene group may be substituted with a fluorine atom, a chlorine atom, trifluoromethyl or methyl;

$A^2$ is independently a 1,4-cyclohexylene group, a 1,4-phenylene group, a 4,4'-biphenylene group or a 4,4'-terphenylene group; in the above 1,4-phenylene group, an optional hydrogen atom may be substituted with a fluorine atom, and optional one hydrogen atom may be substituted with methyl, ethyl, methoxy, acetoxy or acetyl;

X is independently a single bond, —(CH$_2$)$_2$—, —C≡C—, —CH$_2$O—, —OCH$_2$—, —(CH$_2$)$_2$COO—, —OCO(CH$_2$)$_2$—, —CH=CH—COO—, —OCO—CH=CH—, —COO—, —OCO— or —(CH$_2$)$_4$—;

P is independently an alkylene group having 1 to 15 carbon atoms; in the alkylene group, optional —CH$_2$— may be substituted with —O—, and optional one —CH$_2$— may be substituted with —COO— or —OCO—; and p and q each are independently 0, 1 or 2.

3. The compound of claim 1, wherein in Formula (1), (2), (3) and (4), P is —O—, —(CH₂)ᵣ—, —O—(CH₂)ᵣ—, —(CH₂)ᵣ—O—, —O—(CH₂)ᵣ—O—, —COO—(CH₂)ᵣ—O—, —O—(CH₂)ᵣ—OCO—, —OCO—(CH₂)ᵣ—O—, —O—(CH₂)ᵣ—COO— or —O—(CH₂CH₂O)ₛ—; r is an integer of 2 to 10, and s is an integer of 2 to 5.

4. A compound comprising Formula (1) and (2):

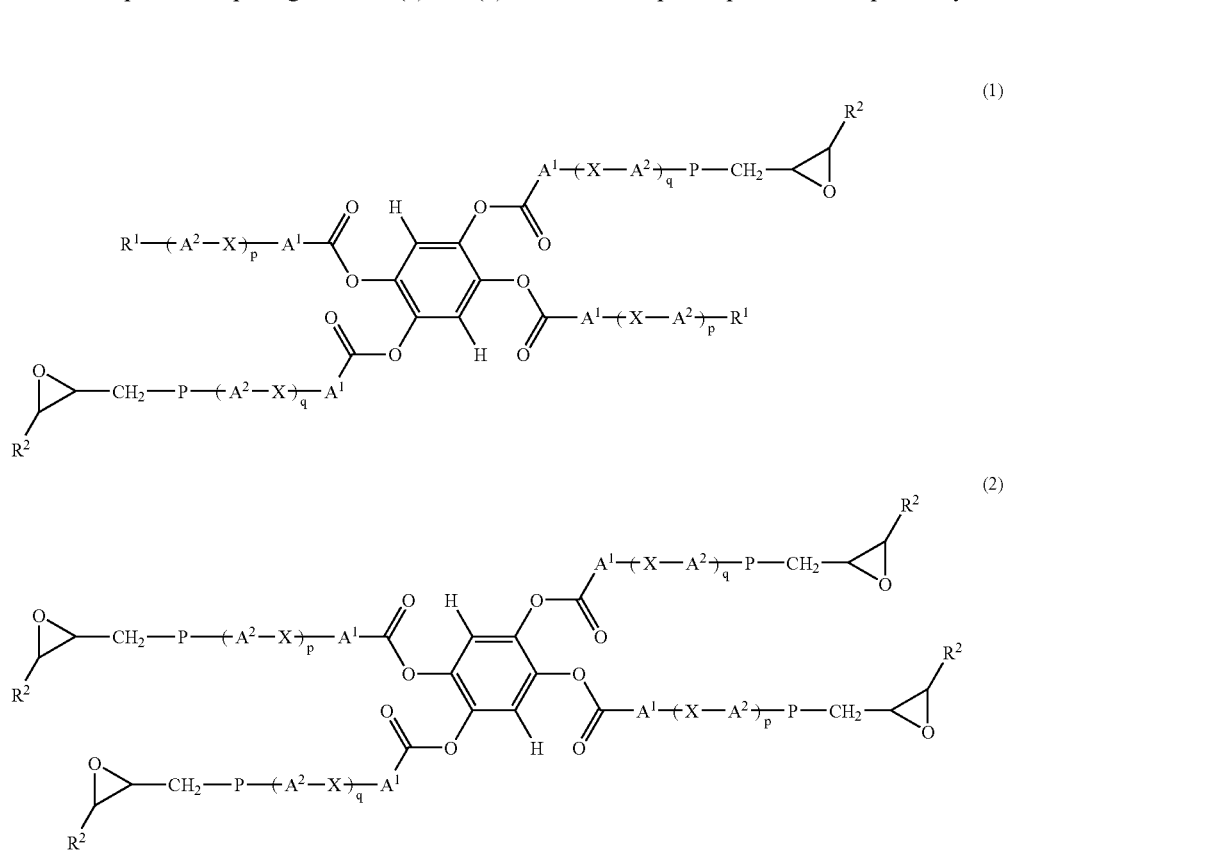

wherein in Formulas (1) and (2), R¹ is a fluorine atom, a chlorine atom, —CN, —OCF₃, an alkyl group having 1 to 15 carbon atoms or an alkoxy group having 1 to 15 carbon atoms;

R is a hydrogen atom, methyl or ethyl;

A¹ is independently a 1,4-cyclohexylene group, a 1,4-phenylene group, a 4,4'-biphenylene group, a 2-fluoro-1,4-phenylene group, a 2-methyl-1,4-phenylene group, a 2-trifluoromethyl-1,4-phenylene group, a 2-chloro-1,4-phenylene group, a 2,3-difluoro-1,4-phenylene group, a 2,5-difluoro-1,4-phenylene group or a 2,6-difluoro-1,4-phenylene group;

A² is independently a 1,4-cyclohexylene group, a 1,4-phenylene group, a 4,4'-biphenylene group, a 4,4'-terphenylene group, a 2-fluoro-1,4-phenylene group, a 2-methyl-1,4-phenylene group, a 2-methoxy-1,4-phenylene group, a 2-trifluoromethyl-1,4-phenylene group, a 2-chloro-1,4-phenylene group, a 2-acetyl-1,4-phenylene group, a 2,3-difluoro-1,4-phenylene group, a 2,5-difluoro-1,4-phenylene group, a 2,6-difluoro-1,4-phenylene group, a 2,3,5-trifluoro-1,4-phenylene group or a 2,3,5,6-tetrafluoro-1,4-phenylene group;

X is independently a single bond, —C≡C—, —COO—, —OCO—, —CH═CH—COO— or —OCO—CH═CH—;

P is independently —O—, —(CH₂)ᵣ—, —O—(CH₂)ᵣ—, —(CH₂)ᵣ—O— or —O—(CH₂)ᵣ—O—, and above r is an integer of 1 to 15; and p and q each are independently 0 or 1.

5. The compound of claim 4, wherein in Formulas (1) and (2), R¹ is an alkyl group having 1 to 15 carbon atoms or an alkoxy group having 1 to 15 carbon atoms;

R² is a hydrogen atom;

A¹ is independently a 1,4-cyclohexylene group, a 1,4-phenylene group, a 2-fluoro-1,4-phenylene group or a 2-methyl-1,4-phenylene group;

A² is independently a 1,4-cyclohexylene group or a 1,4-phenylene group;

X is independently a single bond, —C≡C—, —COO—, —OCO—, —CH═CH—COO— or —OCO—CH═CH—;

P is independently —O—, —(CH₂)ᵣ—, —O—(CH₂)ᵣ—, —(CH₂)ᵣ—O— or —O—(CH₂)ᵣ—O—, and r is an integer of 1 to 10; and p and q each are independently 0 or 1.

6. The compound of claim 4, wherein in Formulas (1) and (2), X is —COO— or —OCO—.

7. The compound of claim 4, wherein in Formulas (1) and (2), p is 0, and q is 0.

8. The compound of claim 4, wherein in Formulas (1) and (2) p is 0, and q is 1.

9. The compound of claim 4, wherein in Formulas (1) and (2), p is 1, and q is 0.

10. The compound of claim 4, wherein in Formulas (1) and (2), p is 1, and q is 1.

11. A compound comprising Formula (3) and (4):

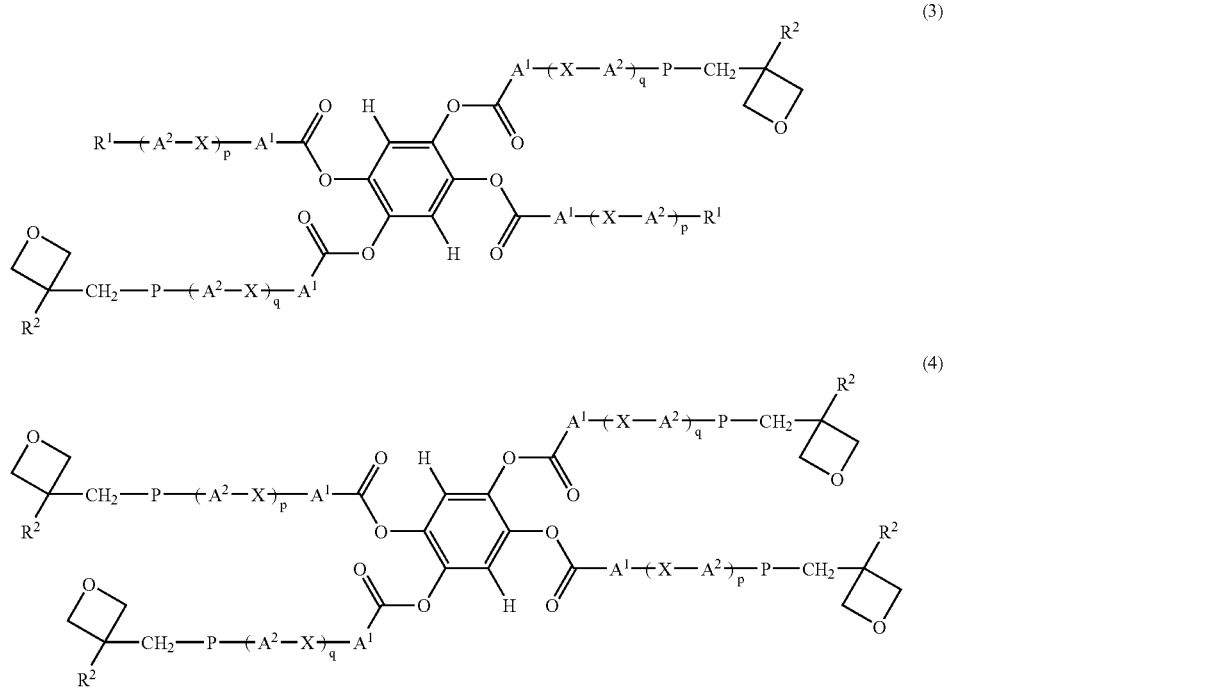

wherein in Formulas (3) and (4), $R^1$ is a fluorine atom, a chlorine atom, —CN, —OCF$_3$, an alkyl group having 1 to 15 carbon atoms or an alkoxy group having 1 to 15 carbon atoms;

$R^2$ is methyl or ethyl;

$A^1$ is independently a 1,4-cyclohexylene group, a 1,4-phenylene group, a 4,4'-biphenylene group, a 2-fluoro-1,4-phenylene group, a 2-methyl-1,4-phenylene group, a 2-trifluoromethyl-1,4-phenylene group, a 2-chloro-1,4-phenylene group, a 2,3-difluoro-1,4-phenylene group, a 2,5-difluoro-1,4-phenylene group or a 2,6-difluoro-1,4-phenylene group;

$A^2$ is independently a 1,4-cyclohexylene group, a 1,4-phenylene group, a 4,4'-biphenylene group, a 4,4'-terphenylene group, a 2-fluoro-1,4-phenylene group, a 2-methyl-1,4-phenylene group, a 2-methoxy-1,4-phenylene group, a 2-trifluoromethyl-1,4-phenylene group, a 2-chloro-1,4-phenylene group, a 2-acetyl-1,4-phenylene group, a 2,3-difluoro-1,4-phenylene group, a 2,5-difluoro-1,4-phenylene group, a 2,6-difluoro-1,4-phenylene group, a 2,3,5-trifluoro-1,4-phenylene group or a 2,3,5,6-tetrafluoro-1,4-phenylene group;

X is independently a single bond, —C≡C—, —COO—, —OCO—, —CH=CH—COO— or —OCO—CH=CH—;

P is independently —O—, —(CH$_2$)$_r$—, —O—(CH$_2$)$_r$—, —(CH$_2$)$_r$—O— or —O—(CH$_2$)$_r$—O—, and r is an integer of 1 to 15; and p and q each are independently 0 or 1.

12. The compound of claim 11, wherein in Formulas (3) and (4), $R^1$ is an alkyl group having 1 to 15 carbon atoms or an alkoxy group having 1 to 15 carbon atoms;

$R^2$ is methyl or ethyl;

$A^1$ is independently a 1,4-cyclohexylene group, a 1,4-phenylene group, a 2-fluoro-1,4-phenylene group or a 2-methyl-1,4-phenylene group;

$A^2$ is independently a 1,4-cyclohexylene group or a 1,4-phenylene group;

X is independently a single bond, —C≡C—, —COO—, —OCO—, —CH=CH—COO— or —OCO—CH=CH—;

P is independently —O—, —(CH$_2$)$_r$—, —O—(CH$_2$)$_r$—, —(CH$_2$)$_r$—O— or —O—(CH$_2$)$_r$—O—, and r is an integer of 1 to 10; and p and q each are independently 0 or 1.

13. The compound of claim 11, wherein in Formulas (3) and (4), X is —COO— or —OCO—.

14. The compound of claim 11, wherein in Formulas (3) and (4), p is 0, and q is 0.

15. The compound of claim 11, wherein in Formulas (3) and (4), p is 0, and q is 1.

16. The compound of claim 11, wherein in Formulas (3) and (4), p is 1, and q is 0.

17. The compound as described in any of claim 11, wherein in Formulas (3) and (4), p is 1, and q is 1.

18. A composition comprising at least one component, wherein the at least one component is at least one of the compound of claim 4.

19. A composition comprising at least one component, wherein the at least one component is at least one of the compound of claim 11.

20. The composition of claim 18, further comprising a polymerizable compound as a second component, wherein said polymerizable compound does not include the compound of formula (1) and (2).

21. The composition as described in claim 20, wherein the second component described above is at least one compound represented by Formulas (M1), (M2), (M3) and (M4):

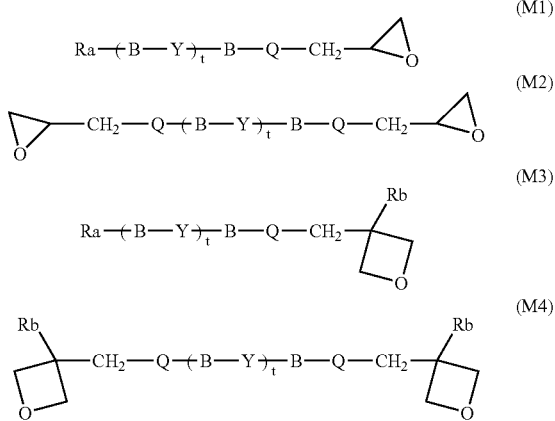

wherein in Formulas (M1) to (M4), Ra is a hydrogen atom, a fluorine atom, a chlorine atom, —CN, —OCF$_3$, an alkyl group having 1 to 20 carbon atoms, an alkoxy group having 1 to 20 carbon atoms, an alkoxyalkyl group having 2 to 20 carbon atoms, an alkenyl group having 2 to 20 carbon atoms or an alkenyloxy group having 2 to 20 carbon atoms;

Rb is a hydrogen atom or an alkyl group having 1 to 5 carbon atoms;

B is independently a 1,4-cyclohexylene group or a 1,4-phenylene group; in the 1,4-phenylene group, an optional hydrogen atom may be substituted with a fluorine atom, and optional one or two hydrogen atoms may be substituted with methyl or trifluoromethyl;

one of B may be a pyridine-2,5-diyl group, a pyrimidine-2,5-diyl group, a naphthalene-2,6-diyl group, a fluorene-2,7-diyl group, a 9-methylfluorene-2,7-diyl group, a 9-ethylfluorene-2,7-diyl group, a 9,9-dimethylfluorene-2,7-diyl group, a 9-chlorofluorene-2,7-diyl group or a 9,9-difluorofluorene-2,7-diyl group;

Y is independently a single bond, —COO—, —OCO—, —(CH$_2$)$_2$— or —C≡C—;

Q is independently a single bond or an alkylene group having 1 to 20 carbon atoms, and one or two —CH$_2$— in the above alkylene group may be substituted with —O—; and t is 1 or 2.

22. The composition of claim 21, wherein in Formulas (M1), (M2), (M3) and (M4), Ra is a fluorine atom, —CN, —OCF$_3$, an alkyl group having 1 to 20 carbon atoms or an alkoxy group having 2 to 20 carbon atoms;

Rb is a hydrogen atom or an alkyl group having a carbon atom number of 1 to 2;

B is independently a 1,4-cyclohexylene group or a 1,4-phenylene group; in the 1,4-phenylene group, an optional hydrogen atom may be substituted with a fluorine atom, and optional one or two hydrogen atoms may be substituted with methyl or trifluoromethyl;

one of B may be a 9-methylfluorene-2,7-diyl group or a 9-ethylfluorene-2,7-diyl group;

Y is independently a single bond, —COO—, —OCO— or —C≡C—;

Q is independently a single bond or an alkylene group having 1 to 10 carbon atoms, and one or two —CH$_2$— in the above alkylene group may be substituted with —O—; and t is 1 or 2.

23. The composition as described in claim 21, wherein the second component is at least one compound of the compounds represented by Formulas (M1) and (M2) or at least one compound of the compounds represented by Formulas (M3) and (M4).

24. The composition of claim 21, wherein the second is at least one compound of the compounds represented by Formulas (M2) or at least one compound of the compounds represented by Formulas (M4).

25. The composition of claim 19, further comprising a polymerizable compound as a second component, wherein said polymerizable compound does not include the compound of formula (3) and (4).

26. The composition as described in claim 25, wherein the second component described above is at least one compound represented by Formulas (M1), (M2), (M3) and (M4):

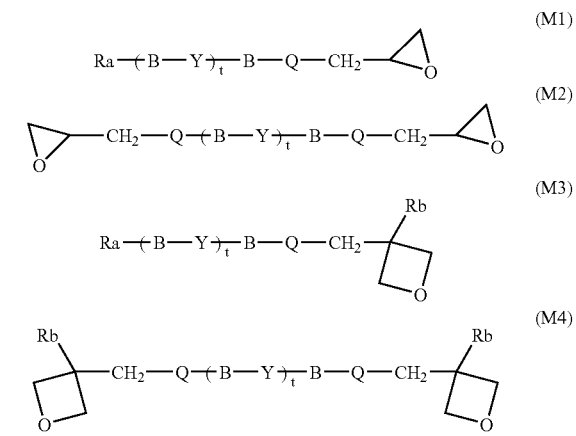

wherein in Formulas (M1) to (M4), Ra is a hydrogen atom, a fluorine atom, a chlorine atom, —CN, —OCF$_3$, an alkyl group having 1 to 20 carbon atoms, an alkoxy group having 1 to 20 carbon atoms, an alkoxyalkyl group having 2 to 20 carbon atoms , an alkenyl group having 2 to 20 carbon atoms or an alkenyloxy group having 2 to 20 carbon atoms;

Rb is a hydrogen atom or an alkyl group having 1 to 5 carbon atoms;

B is independently a 1,4-cyclohexylene group or a 1,4-phenylene group; in the 1,4-phenylene group, an optional hydrogen atom may be substituted with a fluorine atom, and optional one or two hydrogen atoms may be substituted with methyl or trifluoromethyl;

one of B may be a pyridine-2,5-diyl group, a pyrimidine-2,5-diyl group, a naphthalene-2,6-diyl group, a fluorene-2,7-diyl group, a 9-methylfluorene-2,7-diyl group, a 9-ethylfluorene-2,7-diyl group, a 9,9-dimethylfluorene-2,7-diyl group, a 9-chlorofluorene-2,7-diyl group or a 9,9-difluorofluorene-2,7-diyl group;

Y is independently a single bond, —COO—, —OCO—, —(CH$_2$)$_2$— or —C≡C—;

Q is independently a single bond or an alkylene group having 1 to 20 carbon atoms, and one or two —CH$_2$— in the above alkylene group may be substituted with —O—; and t is 1 or 2.

27. The composition of claim 26, wherein in Formulas (M1), (M2), (M3) and (M4), Ra is a fluorine atom, —CN, —OCF$_3$, an alkyl group having 1 to 20 carbon atoms or an alkoxy group having 2 to 20 carbon atoms;

Rb is a hydrogen atom or an alkyl group having a carbon atom number of 1 to 2;

B is independently a 1,4-cyclohexylene group or a 1,4-phenylene group; in the 1,4-phenylene group, an optional hydrogen atom may be substituted with a fluorine atom, and optional one or two hydrogen atoms may be substituted with methyl or trifluoromethyl;

one of B may be a 9-methylfluorene-2,7-diyl group or a 9-ethylfluorene-2,7-diyl group;

Y is independently a single bond, —COO—, —OCO— or —C≡C—;

Q is independently a single bond or an alkylene group having 1 to 10 carbon atoms, and one or two —CH$_2$— in the above alkylene group may be substituted with —O—; and t is 1 or 2.

28. The composition as described in claim 26, wherein the second component is at least one compound of the compounds represented by Formulas (M1) and (M2) or at least one compound of the compounds represented by Formulas (M3) and (M4).

29. The composition of claim 26, wherein the second is at least one compound of the compounds represented by Formulas (M2) or at least one compound of the compounds represented by Formulas (M4).

30. A polymer obtained by polymerizing at least one compound of claim 1.

31. A polymer obtained by polymerizing at least one compound of claim 4.

32. A polymer obtained by polymerizing at least one compound of claim 11.

33. A polymer obtained by polymerizing at least one compound a of claim 18.

34. A polymer obtained by polymerizing at least one compound a of claim 19.

35. A device comprising the polymer of claim 30.

36. A device comprising the polymer of claim 31.

37. A device comprising the polymer of claim 32.

38. A device comprising the polymer of claim 33.

39. A device comprising the polymer of claim 34.

40. An optical film comprising the polymer of claim 30.

41. An optical film comprising the polymer of claim 31.

42. An optical film comprising the polymer of claim 32.

43. An optical film comprising the polymer of claim 33.

44. An optical film comprising the polymer of claim 34.

45. A molded article comprising the polymer of claim 30, wherein the molded article has an optical anisotropy.

46. A molded article comprising the polymer of claim 31, wherein the molded article has an optical anisotropy.

47. A molded article comprising the polymer of claim 32, wherein the molded article has an optical anisotropy.

48. A molded article comprising the polymer of claim 33, wherein the molded article has an optical anisotropy.

49. A molded article comprising the polymer of claim 34, wherein the molded article has an optical anisotropy.

* * * * *